United States Patent Office 2,944,247
Patented July 5, 1960

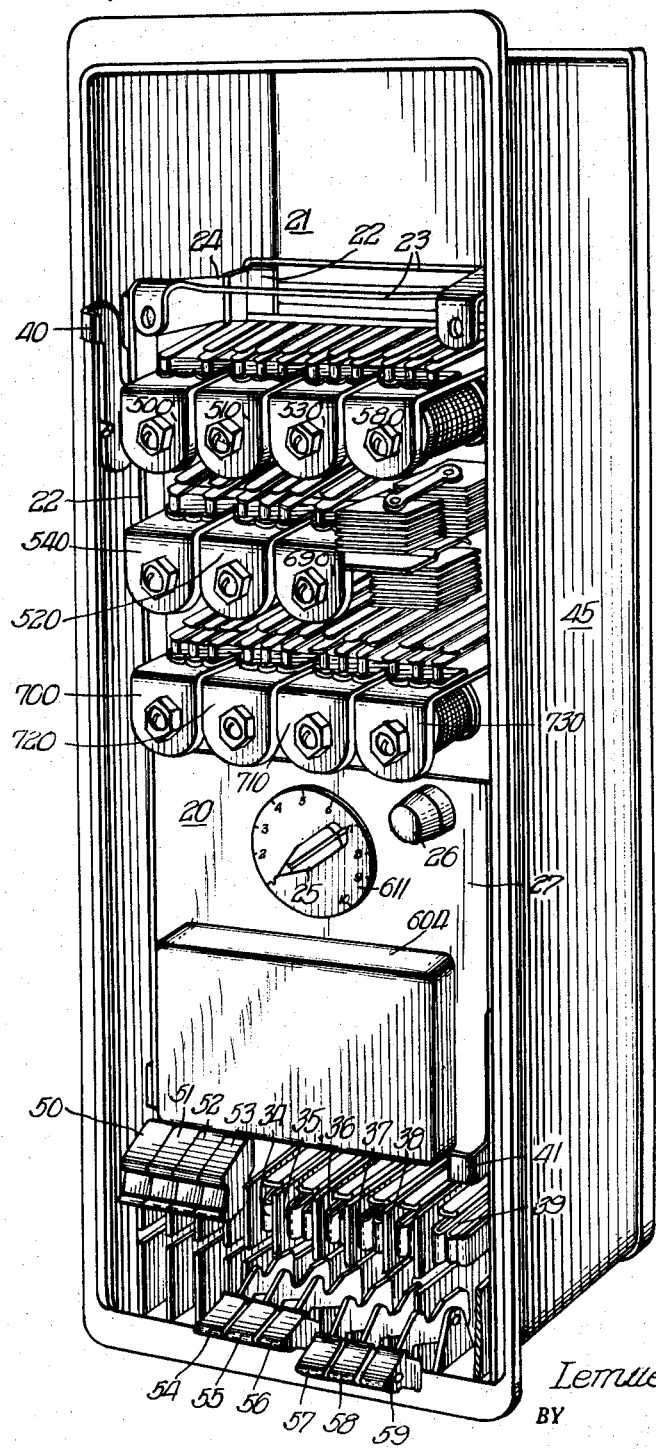

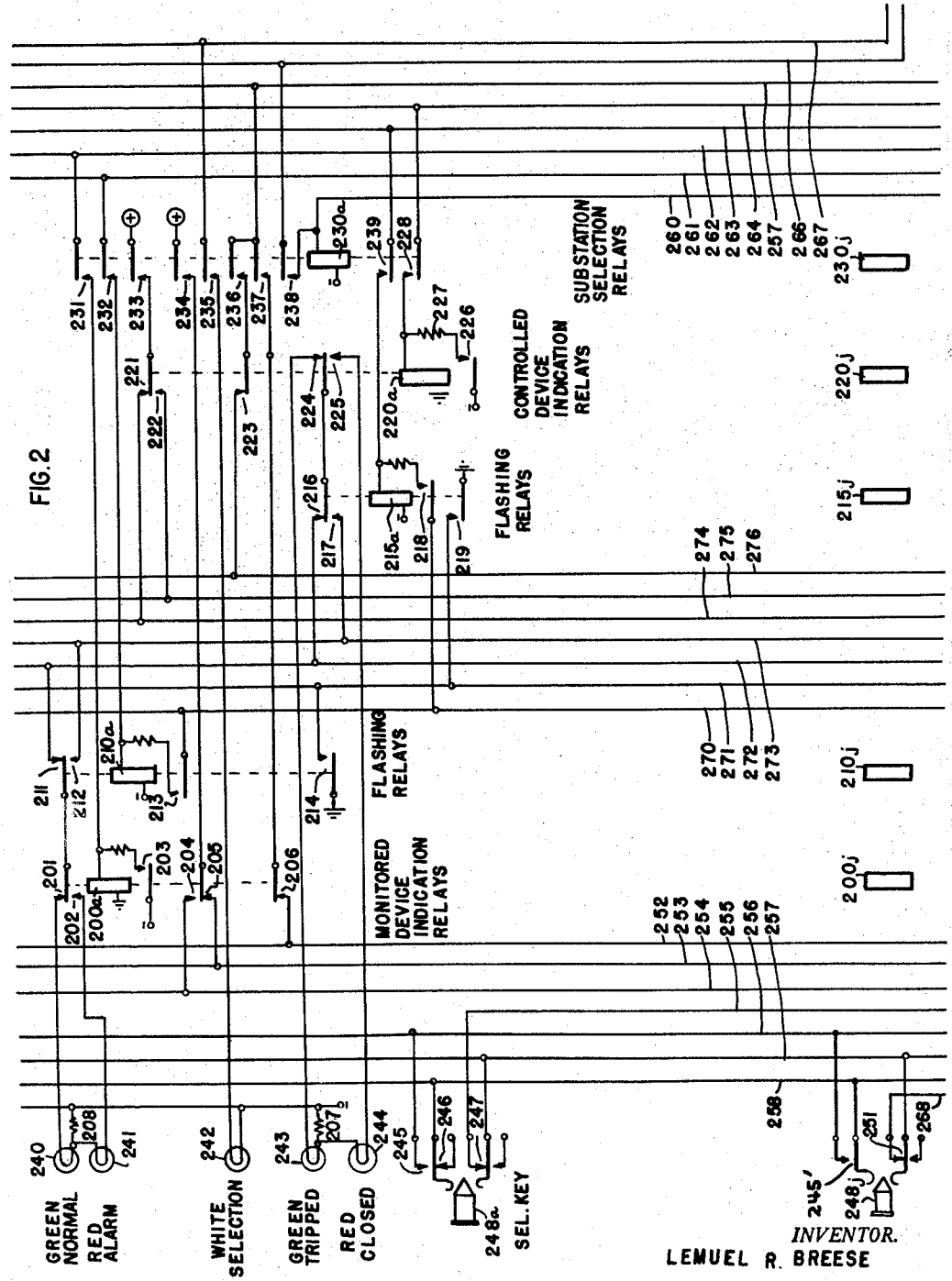

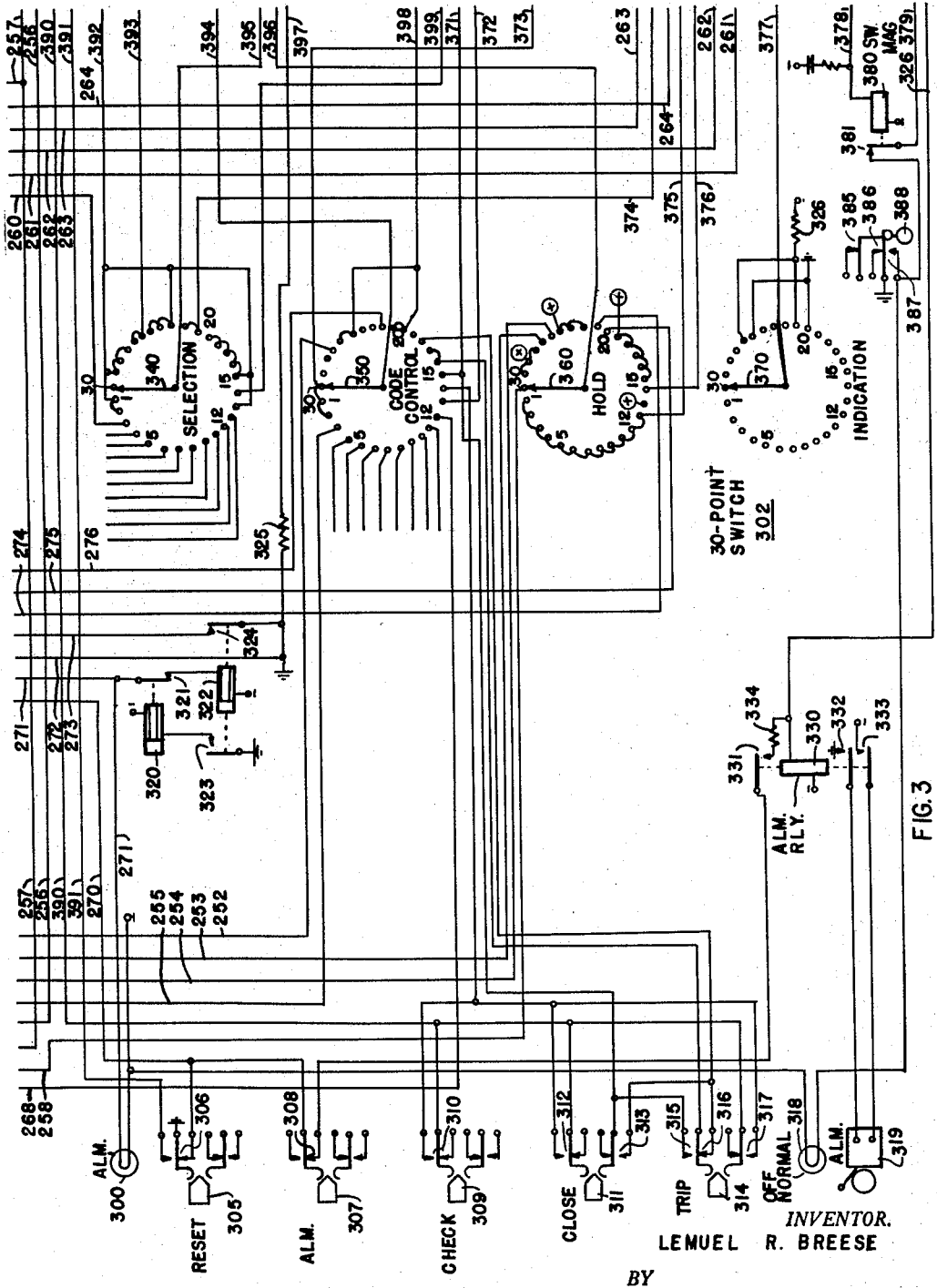

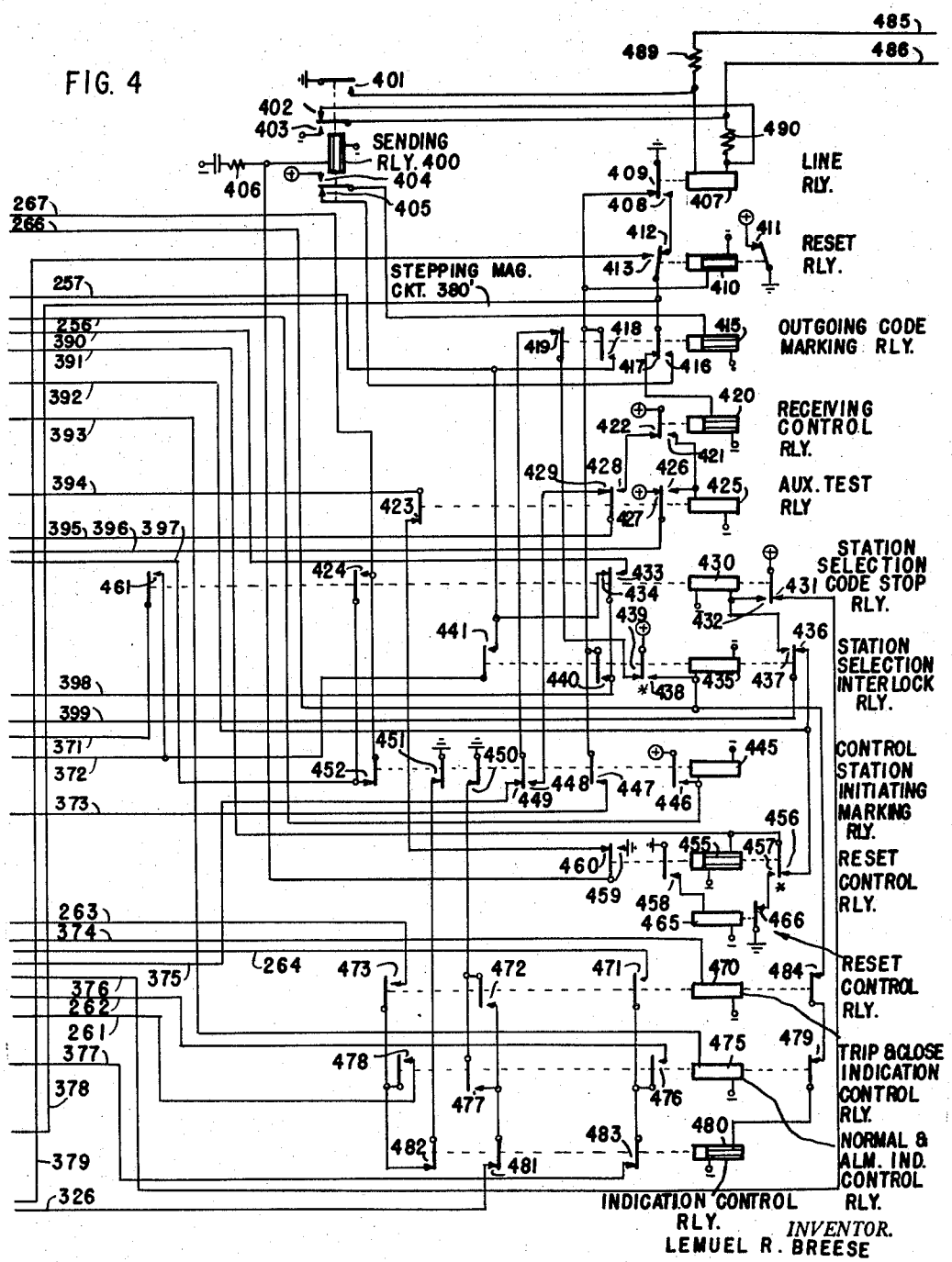

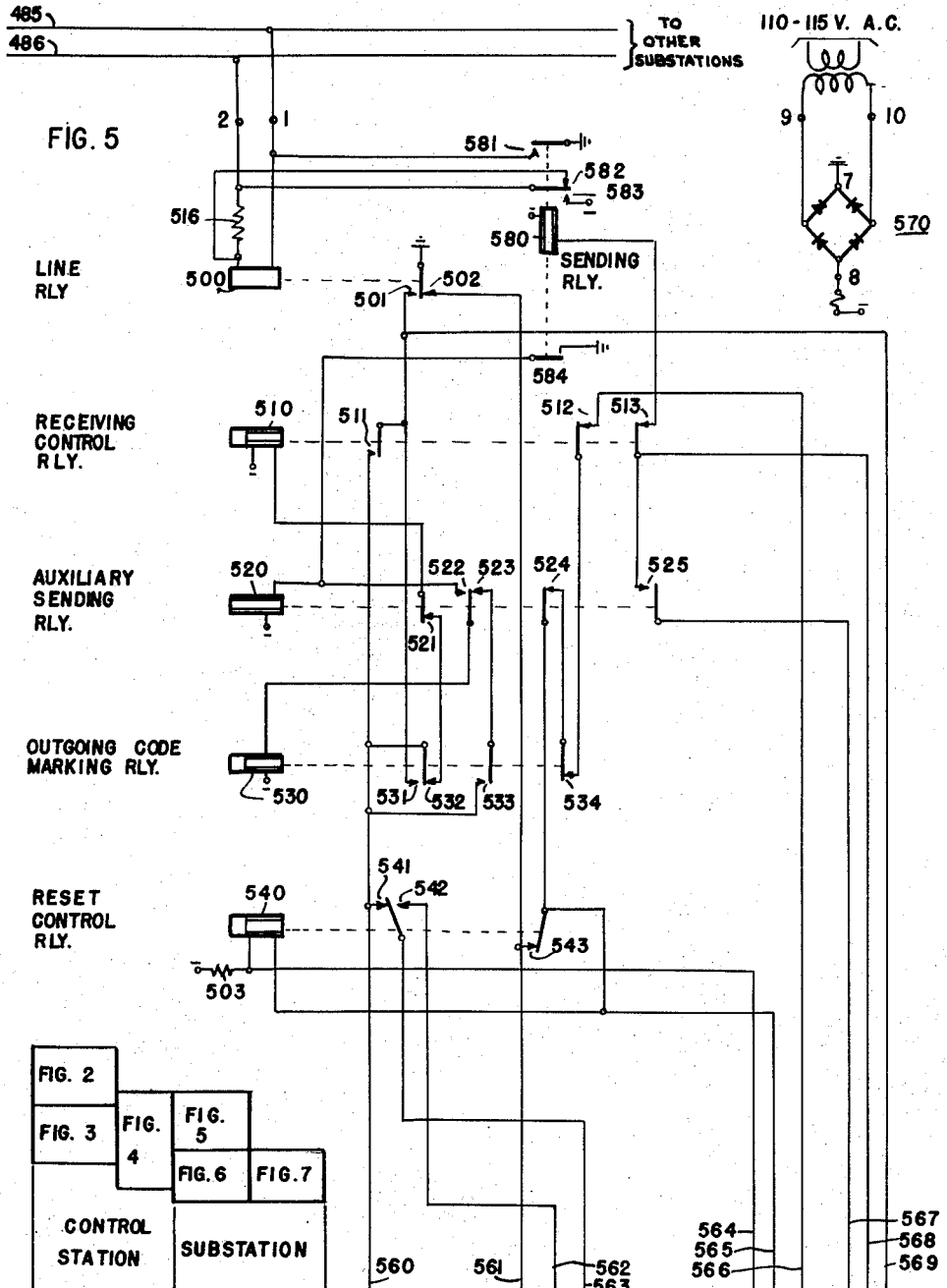

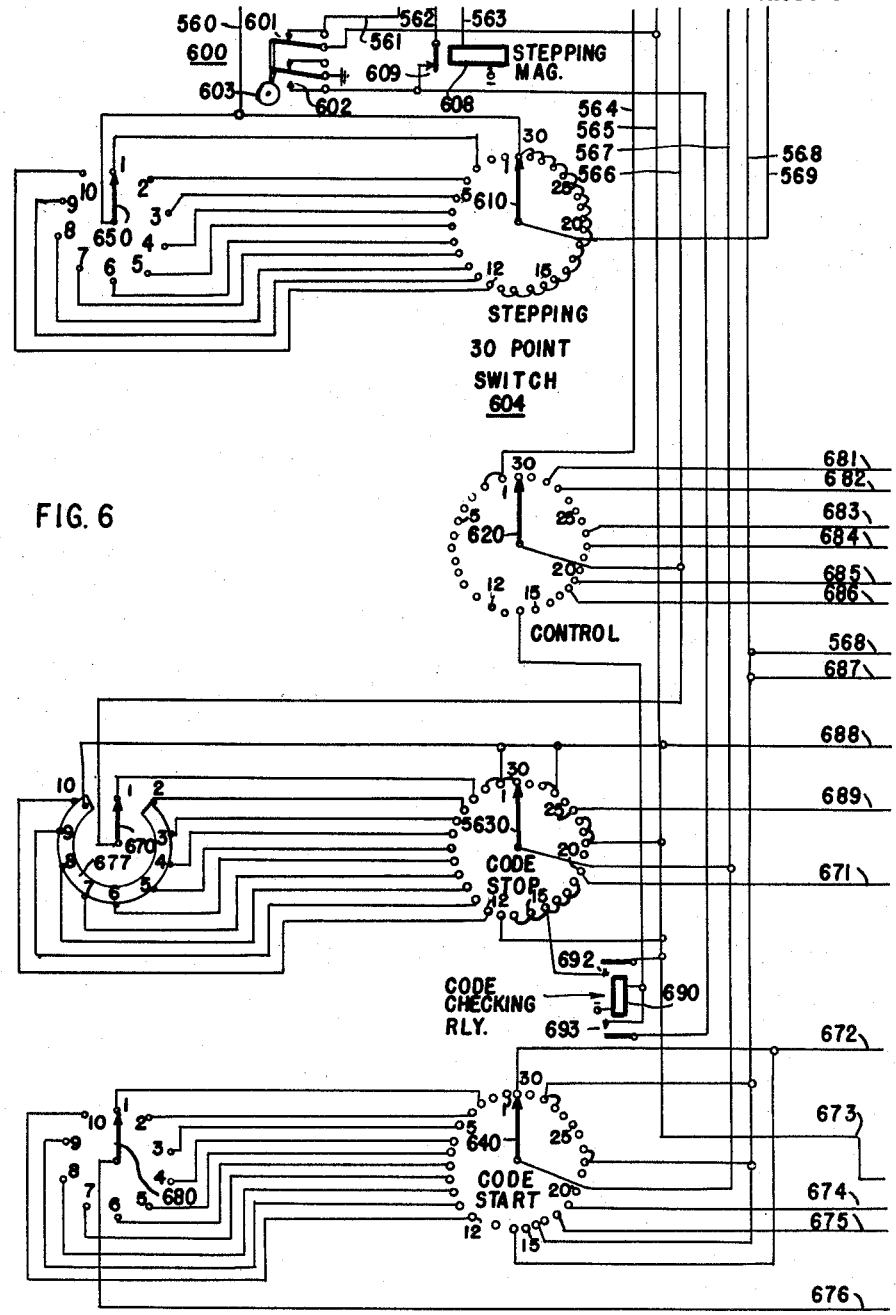

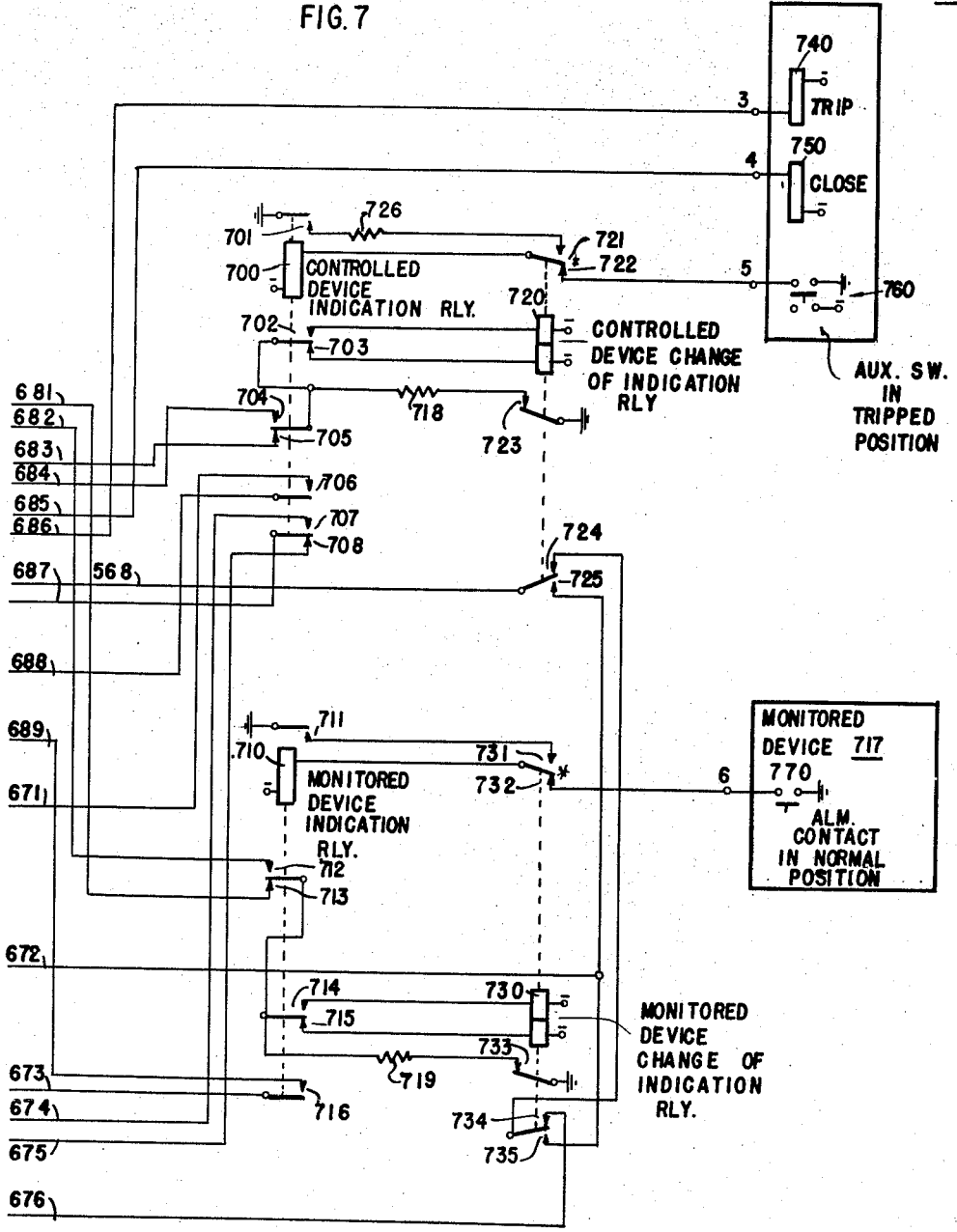

2,944,247

SUPERVISORY CONTROL SYSTEM

Lemuel R. Breese, Galion, Ohio, assignor to North Electric Company, a corporation of Ohio Filed Mar. 23, 1955, Ser. No. 496,158

20 Claims. (Cl. 340—163)

The present invention relates, in general, to automatic signalling equipment which is adapted for supervisory control purposes, and particularly, to automatic supervisory equipment for controlling the operation of switching apparatus located at a series of remote points. The switching apparatus may, in turn, be arranged to control various types of electrical or mechanical units, such as circuit-breaker equipment for power lines, power distribution vaults, flood gates or dam installations, transformer switching distribution systems, automatic substations such as those used in railroading, and mining fields, automatic electrified pumping stations and substation generating installations.

In these industrial fields the operation of switching apparatus at locations separated by long distances and dispersed over an extended geographical area has been simplified and made more reliable by the use of supervisory control systems characterized by a concentration of the control functions and the centralization of information concerning the operating conditions of the equipment at the separate locations. By the use of centralized control equipment, complete supervision of the operation of an extensive and dispersed system of interdependent switching stations may be accomplished with one dispatcher, thus eliminating the need for attendants at each remote location.

In addition, the rapid accumulation of information at a central location permits quick restoration of normal operating conditions on a system of remote substations when an abnormal condition disrupts its normal operation.

In one of the more desirable types of selective control arrangements used in the field, the control station is arranged to transmit certain signals or orders which not only effect selection of the desired substation from the series of substations available to the control station but also effects operation of the switching apparatus at the chosen substation. In turn the chosen substation is arranged to transmit signals to the control station which are indicative of the selection thereof and of the execution of these orders. At the control station, indication lamps common to all substations and other indication lamps individual to each substation indicate to the dispatcher the instantaneous condition of the switching apparatus at all the substations and aid him in choosing the most effective action to be taken to utilize the overall system with its greatest efficiency. In this regard, the indication lamps not only keep the dispatcher informed of the condition of the switching apparatus at each substation, but also inform him of the proper time to change the operating condition of the switching apparatus. Thus each separate control function is completed before another control function is begun. Consequently, the dispatcher has more positive control over the complete system and costly errors in operation are avoided.

As an additional feature of these supervisory control systems, each of the substations is arranged to signal the control station if the switching apparatus at the substation automatically changes its condition because of abnormal operating conditions on the overall system. If, for example, in a power line distribution system, a sudden overload should appear in one part of the system because of an accidental grounding of that part of the system, circuit breakers at various substations may trip to prevent damage to generator units. The tripping of these circuit breakers is automatically indicated to the control station in the form of signals which inform the dispatcher of the identity of each of the affected substations, the operating condition to which each of the circuit breakers has shifted, and whether each of the circuit breakers is in its normally desired or alarm condition as respects the overall operating plan for the system.

One of the major problems prevalent in the use of supervisory control systems of this nature is that of effectively selecting a particular substation and locking-out the non-selected substations so that the latter are unaffected by subsequent signalling. Unless this is done, the switching apparatus at a nonselected station may be adversely operated and further disrupt the operating condition of the overall system. This lockout feature is of importance not only in the operation of the switching equipment at a selected substation by a control station but also in the reporting function of a substation at which the switching apparatus has automatically operated because of an adverse condition in the overall system.

It is an object of the present invention to provide new and improved automatic signalling equipment for use in controlling the operation of a dispersed system of operating units in which the non-selected operating units are locked-out of the system during the control function.

Where there are a number of substations controlled by a single control station, it becomes necessary to insure that the switching equipment of each substation is in perfect operating order since the malfunction of one substation adversely affects the complete system. Consequently, maintenance time must be kept to a minimum, if the full advantage of such a control system is to be realized. In this regard, the maximum amount of usable time is available to the control system if faulty substations can be replaced in their entirety with tested units and the actual repair of the faulty units can be accomplished later without disturbing the system.

In order to facilitate maintenance and afford complete interchangeability of the substation sets, all the substation sets are identical in arrangement and wiring. This latter feature also represents a basic factor in reducing the cost of manufacturing the substations as the wiring and assembly techniques are identical for each substation. The problem of differentiating between each substation on an individual basis remains, but is resolved by utilizing a manual switch having a number of settings equal to the number of substations, each setting providing for particular wiring connections peculiar to one substation which identifies it and differentiates it from each of the other substations. Thus one substation set may be adapted for use at any portion in the system by merely adjusting the setting of the manual switch to the proper setting.

It is a further object, therefore, of the present invention to provide a novel supervisory control system in which the individual substations are identical in wiring and components, and in which the identity of a particular substation may be established by simply presetting a manual switch.

It is yet another object of the present invention to provide a novel supervisory control system in which each substation is readily demountable for rapid replacement if such becomes necessary for maintenance purposes.

In certain prior art supervisory systems indications of the condition of the switching apparatus at each substation are made available at the control station. For example, in an electrical power distribution system the dispatcher can ascertain whether a circuit breaker at a particular substation is closed or tripped by referring to supervisory lamps associated with that substation. As an additional feature of the present invention, however, additional supervisory lamps are associated with each substation to indicate whether or not the circuit breaker is in its normally desired condition for most efficient system operation. Such information becomes important when a circuit breaker trips or closes automatically in response to a change in the condition of the power distribution system. The dispatcher can then decide whether to trip or close a given circuit breaker with greater assurance of non-disruption of service, if he knows the predetermined setting for such circuit breaker. The additional supervision thus provided insures more positive and accurate control over the complete system.

Also in this same regard, provision must be made to safeguard against conditions which might adversely affect equipment at a remote substation. For example, it is desirable to maintain a constant check on the temperature conditions of the bearings in generators controlled by the supervisory system. It is an additional feature of the invention to provide for monitoring a device whereby the occurrence of a dangerous operating condition, such as a rise in the temperature of the generator bearing is reported to the control office by initiating supervisory signals indicative of such condition to inform the control office. Such signals are sent from the substation to the control station to alert the dispatcher to an abnormal or alarm condition in the operation of the equipment at the substation so that he may take appropriate corrective action with a view to preventing serious damage.

The present invention contemplates the use of certain signals to perform certain indication or control functions, and other signals for vertification purposes. As a basic feature thereof the control station and each of the substations operated thereby comprises a thirty-point rotary switch having four banks. Each switch is arranged so that each bank has an individual wiper which makes electrical contact with each of the thirty-points in sequential steps and which is connected to a shaft common to all wipers of a given switch to insure synchronous operation of the wipers of each bank. The wipers of the rotary switch at the control station and the selected substation advance in synchronism in response to the pulsations placed on the line by either the control station or the substation. If for any reason the two rotary switches are not synchronized, the system is arranged to reset automatically or to stall so that the dispatcher becomes aware of the discrepancy and manually resets the equipment. Consequently, the control and indication functions are carried out only when the system is operating in a reliable fashion, and costly errors in operation are avoided.

In the operation of the system a preferential action of the control station with respect to reporting substations is provided. For example, after a reset signal by the control station, the control station can take precedence to perform a control function even though one or more substations is trying to report.

The present arrangement provides an economical arrangement for centrally controlling a plurality of dispersed very small substations, each of which may comprise a controlled device which may or may not be supervised; and which substation may or may not also comprise a monitored device.

The various features recited and others of the invention will become more apparent by reference to the following specification and accompanying drawings wherein a preferred embodiment of the structure is illustrated.

In the drawings:

Figure 1 is a perspective drawing of a typical substation illustrating a preferred arrangement of the components thereof; and Figures 2–7 inclusive, when arranged in the manner of the figure layout set forth in Figure 8 are illustrative of the supervisory control equipment including the novel control station (Figures 2–4) and the switching apparatus (Figures 5–7) disposed at a typical remotely located substation whereat a circuit breaker is to be controlled.

The following outline is indicative of the order in which the specification is written and may serve as a guide thereto.

I. General Description
II. Description of Apparatus
III. Description of Substation Apparatus
IV. Control Operation of Supervisory System
   A. Normal Condition of Equipment
   B. Selection of Substation
     1. Operation at Control Station
       a. First Transient Protection Pulse
       b. Second Transient Protection Pulse
       c. Station Selection Pulse
     2. Concurrent Operation at Selected Substation
       a. First Transient Protection Pulse
       b. Second Transient Protection Pulse
       c. Station Selection Pulse
     3. Station Check Pulses
       a. First Station Check Pulse
       b. Second Station Check Pulse
       c. Third Station Check Pulse
       d. Fourth Through Tenth Station Check Pulses
   C. Selection of Substation Other Than Substation #1
     1. Operation of Control Station
     2. Operation of Substation
   D. Lockout of Other Substations
   E. Concurrent Operations at the Control Station
   F. Reset as Result of Incorrect Stopping of Rotary Switch
   G. Operation to Close Circuit Breaker at Substation #1
     1. Close Control Pulses
       a. First Close Control Pulse
       b. Second Close Control Pulse
       c. Third Close Control Pulse
       d. Fourth Close Control Pulse
       e. Fifth Close Control Pulse
     2. Concurrent Operation at the Selected Substation
     3. Close Supervision
       a. First Close Supervision Pulse
       b. Second Close Supervision Pulse
     4. Concurrent Operation at Control Station
     5. Closed Supervision Check
     6. Concurrent Operation at Selected Substation
       a. Normal Supervision
         1. First Normal Supervision Pulse
         2. Second Normal Supervision Pulse
         3. Third Normal Supervision Pulse
     7. Concurrent Operation at Control Station
       a. Normal Supervision Check
         1. First Normal Supervision Check Pulse
         2. Second Normal Supervision Check Pulse
         3. Third Normal Supervision Check Pulse
     8. Concurrent Operation at Selected Substation
     9. Concurrent Operation at Control Station
     10. Concurrent Operation at the Selected Substation
     11. Concurrent Operation at Other Substations V. Indication of Automatic Trip of a Circuit Breaker
  A. Operation at Substation #2 (Detailed Operation)
    1. Transient Protection and Station Selection Pulses
       a. First Transient Protection Pulse
       b. Second Transient Protection Pulse and First Station Selection Pulse
       c. Second Station Selection Pulse
  B. Concurrent Operation at Control Station
  C. Concurrent Operation at Other Substations
  D. Station Check Pulses
  E. Concurrent Operation at Reporting Substation
    1. Trip Supervision
       a. First Trip Supervision Pulse
  F. Concurrent Operation at Control Station
  G. Trip Supervision Check Pulses
    1. First Trip Supervision Check Pulse
    2. Second Trip Supervision Check Pulse
    3. Third Trip Supervision Check Pulse
  H. Concurrent Operation at Selected Substation
  I. Normal Supervision Pulses
    1. First Normal Supervision Pulse
    2. Second Normal Supervision Pulse
  J. Concurrent Operation at Control Station
  K. Normal Supervision Check Pulses
    1. First Normal Supervision Check Pulse
    2. Second Normal Supervision Check Pulse
    3. Third Normal Supervision Check Pulse
  L. Concurrent Operation at Selected Substation
  M. Concurrent Operation at Control Station (Reset)
  N. Concurrent Operation at the Selected Substation (Reset)
  O. Concurrent Operation at Other Substations (Reset)
VI. Selection of Substation #1 and Check the Indication Thereat
  A. Selection of Substation #1
  B. Checking Initiation at Substation #1
    1. First Check Pulse
    2. Second Check Indication Pulse
  C. Concurrent Operation at Selected Substation
    1. Each Supervision Pulse
  D. Concurrent Operation at Control Station
    1. Close Supervision Check Pulse
VII. Detail Operation of System for Simultaneous Pulsing by Control and Substation
VIII. Operation in Accordance With Switch Bank Function
IX. Conclusion

I. GENERAL DESCRIPTION

For purposes of illustration, the invention is disclosed in an arrangement comprising a dispatch or control office A (Figures 2-4) which is adapted to automatically control equipment disposed at a plurality of remotely located substations, one of which is shown as substation B (Figures 5-7) over a single signalling channel comprising a pair of line conductors 485 and 486. In the embodiment herein described, for purposes of clarity and brevity, only one substation has been shown in detail, although the control station may be used in conjunction with any number of substations each connected in parallel to line conductors 485 and 486. In the present environment there is shown a control station A which may control as many as ten substations, although any number of substations may be utilized if the teachings of the present invention are followed and the control station and substations are modified in an obvious manner to accommodate more than ten substations.

In addition to its control function, the control office A is receptive to signals from each of the remotely located substations which signals are indicative of the operating condition of the equipment controlled by that substation, and which may under appropriate circumstances be initiated by the substation to reflect changes in the operating condition of this equipment. A control panel at the control station enables an attendant thereat to effect independent selective closure and tripping operations of a circuit breaker or like equipment disposed at the remote substation; to instantly determine the operated condition of any one of the circuit breaker units; and to be informed of any change in the operating condition of the circuit breaker at any of the remotely located substations.

The circuit breaker unit 709 at each substation is of the conventional type and may comprise a set of power controlling contacts (not shown), a close coil 750, a trip coil 740, and a set of auxiliary contacts 760. Legend 709 may also refer to a generator which is started by close coil 750; stopped by trip coil 740; and supervised as to some characteristics such as temperature by auxiliary contacts 760. Momentary energization of the close coil effects closing of the breaker, and mechanical means hold the breaker in such position until such time as a momentary energization of the trip coil or occurrence of a line fault effects reopening thereof. Auxiliary switch contacts such as 760 are used to indicate to the equipment at the control office whether the circuit breaker is in its closed or tripped condition. Additionally, a monitored device 717 having contacts 770 is arranged to indicate to the control office a characteristic of said monitored device. The monitored device may be a device entirely dissociated from device 709 or the monitoring may be of an additional characteristic of the device 709 or of an interrelated device. This latter feature is provided through the instrumentality of a monitored device indication relay 710 in a manner to be described in greater detail hereinafter.

The particular control equipment illustrated in the present embodiment which is used to select a particular one of the plurality of substations accessible thereto, and to effect either a closing or tripping operation of a circuit breaker or the control of other type apparatus comprises a four bank rotary magnetically driven switch containing thirty points per bank and off-normal contacts, seventeen common relays, an alarm lamp, an alarm bell, a normal lamp, a reset key, an alarm key, a check key, a close key, and a trip key. It is apparent, of course, that the invention is not limited to such an equipment group. Corresponding to each substation controlled device (circuit breaker) there are two relays and "tripped" and "closed" lamps. Two additional relays and associated lamps correspond to the monitored device of each substation to indicate whether the monitored device is in its "normal" or "alarm" (not normal) condition.

The control panel may include a group of common control units, such as an alarm key, reset key, a trip key, a close key, a check key, an alarm bell, an alarm lamp, and a normal lamp. A further section of the control panel is divided into a series of individual control and indicating panels each of which is correspondingly individual to the substations. Each of the individual panels may comprise an escutcheon plate which mounts an individual selection key for selecting its associated substation, a white selection lamp, a red (closed) indication lamp, a green (tripped) indication lamp, a red (alarm) indication lamp, and a green (normal) indication lamp. The white lamp associated with each of the individual control panels is operated with operation of the selection key and completion of the selection operation and indicates to the operator that a particular substation has been reached. The red (closed) lamp is lighted whenever the circuit breaker at the selected substation is in a closed position, and the green (tripped) lamp is lighted whenever the circuit breaker at the substation is in the tripped or opened position. Likewise the green (normal) lamp is lighted whenever the circuit breaker at the selected substation is in its normal (either tripped or closed) position, and the red (alarm)

lamp is lighted whenever the circuit breaker is not in its normal condition.

Should the controlled device such as a circuit breaker at the selected substation automatically change position in response to the occurrence of a line fault, an alarm bell and alarm lamp at the dispatch office operate to draw the attention of the attendant thereto. The red (closed) lamp is lighted if the circuit breaker is being closed and the green (tripped) lamp is lighted if the circuit breaker is being opened. A green (normal) lamp is lighted if the change of the monitored device brings it to its normal condition, and the red (alarm) lamp is lighted if the change of the monitored device brings it to its non-normal or alarm condition. Provision is made to flash the operated indication lamps by an intermittent interrupting circuit associated therewith. An alarm key at the panel enables the operator to silence the alarm bell, and a reset key enables the operator to extinguish the alarm lamp and stop the flashing of the red and green indicating lamps.

The reset key on the control panel enables the dispatcher to reset the equipment at the substation and the control office in the event of the occurrence of a stalled condition, that is, a condition in which some of the relays are in the operated condition and have failed to restore the equipment to normal.

As may be seen from Figures 5-7, the illustrated substation comprises a four bank rotary magnetically driven switch identical to that of the control station. Throughout the operation of the control and selected substation in response to the impulses transmitted therebetween, the thirty-point rotary switch at control and selected substation are driven in synchronization with each other. As will be discussed in greater detail hereinafter, if one of the thirty-point rotary switches fails to remain in step with the other, the equipment at either the control station or the substation will stall or automatically reset. If the equipment stalls, the dispatcher at the control station is so notified and by operation of the reset key, the equipment at the control station and at the stalled substation is restored to its normal condition.

The selection of a substation in preparation for the closure or tripping of a circuit breaker for example thereat is accomplished by merely operating the selection key at the control office which is individual to the chosen substation. As the key closing operation is performed, the equipment at the control office is automatically effective to condition itself for the transmission of both a pair of transient protection pulses and a station selection pulse (or pulses) sufficient to select the desired substation.

Since the control station and the substations may be located at points greatly separated one from another, it is apparent that transient pulses, caused by adverse effects such as lightning or disruptions in the earth's magnetic field, may from time to time place impulses on the the line conductors, which impulses, if of sufficient amplitude, may operate the line relays at the control station and/or at the substations. In order to prevent the equipment at the control station or at any of the substations from completing a full cycle of operation in which the thirty-point switch operates throughout its complete revolution in response to these transient pulses, connections are made to the first two terminals of the thirty-point switch by which, if the switch is not advanced beyond the first two terminals prior to the expiration of a preset interval, the system is arranged to reset itself and move the wipers of each bank to terminal #30 and place the supervisory control equipment in its normal condition.

Accordingly two transient protection pulses are always sent by the control station prior to station selection pulse or pulses. With receipt of the first transient protection pulse, the equipment at the substation is placed in the receiving condition and this transient pulse is absorbed. A second transient protection pulse is then transmitted by the control station and is absorbed.

Following the transmission of the two transient protection pulses, the control station transmits the pulse or pulses which effect selection of a particular substation. More specifically, the substation equipment is arranged so that each substation is responsive to receipt of a particular number of station selection pulses and upon receipt thereof completes a sending circuit which transmits to the control station a number of pulses sufficient to advance the wipers of the thirty point switches at both the control station and the selected substation to terminal #14. If, for example, substation #1 is desired, the control station transmits three pulses (two transient protection pulses and one station selection pulse). Upon receipt of this code, the line relays at the control station and at each of the substations operate and advance the wipers of the thirty-point switches at each substation to terminal #3. As will be explained later, only the desired substation completes a sending circuit to initiate the transmission of station selection check pulses back to the control station. At all other substations, such sending circuit is not completed and the substation is effectively locked-out of the circuit.

Returning now to the selected substation, such substation transmits to the control station a sufficient number of station check pulses to advance the wipers of the thirty-point switch at the control station and at the selected substation in synchronism to terminal #14. In the selected example, wherein substation #1 is desired, eleven station selection check pulses are transmitted from the substation to the control station.

Upon the receipt of the eleventh or last station selection pulse at the control station, the wipers of its thirty-point switch are advanced to terminal #14 in synchronism with the advancement of the wipers of the thirty-point switch at the substation, and thereat complete a circuit for the operation of the white selection lamp, associated with substation #1.

Thereupon the dispatcher releases the selection key and the equipment at the control office is prepared to transmit a coded signal indicative of the operating condition which the dispatcher desires to accomplish at the substation.

The dispatcher then depresses either the check key, the close key or the trip key in accordance with the nature of the control operation of the equipment at the substation which is to be accomplished. Upon the operation of any of these keys, the equipment at the control station transmits sufficient pulses to the selected substation to advance the wipers of its thirty-point switch to complete a circuit to trip the controlled device, close the controlled device or simply report the condition of the controlled device to the control station. The control station switch operates in synchronism with the thirty-point switch of the substation.

Subsequent to the operation of the equipment at the substation, the substation transmits sufficient pulses to the control station to inform it that the desired operation has taken place, and such information is indicated to the dispatcher by the operation of the appropriate indication lamp. Upon receipt of this latter code, the equipment at the control office sends sufficient pulses to the substation to acknowledge the receipt of the information as to the condiiton of the controlled device.

Upon receipt of this latter code, the substation transmits sufficient pulses to inform the equipment at the control station of the condition of the monitored device. One of two indication lamps is lighted in accordance with the signal received to inform the dispatcher of whether the monitored device is in its normal or non-normal (alarm) condition. The equipment at the control station then acknowledges the receipt of the latter information by transmitting sufficient pulses to advance the wipers of the thirty-point switch at the controlled station to an acknowledgement position.

In these back and forth pulsings the thirty-point switches at main and selected substations have been operating in synchronism.

The equipment at the substation then transmits sufficient pulses to advance the wipers of the switches at the control station and at the substation to complete a circuit for reset. Following the completion of such reset circuit, the control station sends one long reset pulse which effectuates restoration of the equipment at the control station and at all the substations to its normally reset condition in preparation for subsequent signalling.

Inasmuch as the supervisory control system of the present invention contemplates the interaction of a control station and its associated substations the initiation of operation may be under the control of either the control station or one of the substations.

If the operation is initiated from the control station, the dispatcher thereat may perform any one of three functions:

(1) Provide a check at the control station of the conditions of the controlled and monitored devices at a selected substation.

(2) "Trip" a controlled device at a selected substation.

(3) "Close" a controlled device at a selected substation.

The supervisory system is also effective to report an automatic change in the operation of the equipment at the substation and may transmit to the control station information indicative of:

(1) Automatic tripping of a circuit breaker.

(2) Automatic closing of a circuit breaker.

(3) Automatic change in the condition of the monitored device from alarm to normal.

(4) Automatic change in the condition of the monitored device from normal to alarm.

While a more general discussion of the operation of the novel supervisory control system of the present invention has been hereinbefore treated, a more detailed analysis of the overall functions of the system now follows.

If it be assumed that the dispatcher desires to check the conditions of the controlled and monitored devices at a substation selected in accordance with the previous discussion, the dispatcher depresses the non-locking "check" key, whereupon the relay equipment at the control station transmits two pulses driving the thirty-point switches at the control station and at substation #1 from terminal #14 to "indication" point #16. If it be assumed that the controlled device at the selected substation is in the "tripped" condition and that the monitored device is in the "normal" condition, the selected substation in response to the arrival of the wipers of its thirty-point switch on terminal #16, transmits four pulses to the control station. These pulses applied to the line conductors 485 and 486 operate the line relays at both the substation and the control station and advance the wipers of the thirty-point switches to the "trip supervision" terminal #20, thus indicating to the control office that the controlled device is in the tripped condition. The dispatcher at the control office is informed of the condition of the controlled device because the green (tripped) lamp will be lighted and the red (closed) lamp will be extinguished (assuming the latter had been lighted prior thereto).

The control station then transmits three acknowledgement pulses which are applied to the line and advance the wipers of the thirty-point switches at the control station and selected substation to the "trip supervision check point," terminal #23.

Responsive thereto the substation transmits two pulses driving the thirty-point switches to the "normal supervision" point, terminal #25, thus indicating to the control station that the monitored device is in the "normal" condition. This indication is made evident by the lighting of the green (normal) lamp at the control station.

Upon receipt of the last "normal supervision" pulse, the control station transmits three acknowledgement pulses driving the switches to the "normal supervision check" point, terminal #28.

In response thereto, the selected substation transmits one pulse and drives the wipers of the thirty-point switches to the "reset" point, terminal #29, notifying the control office that reset is in order.

In response to the advancement of the wipers of its thirty-point switch to terminal #29, the control office transmits a long reset pulse, driving the thirty-point switches at the control station and at all of the substations to the "normal" point, terminal #30 restoring all of the equipment at the control and substations to its normal condition in standby condition for subsequent control or reporting.

The following chart indicates the manner of operation of the system as initiated at the control station under various conditions. By referring to the above-described operation of the supervisory system, the significance of the following chart becomes apparent.

The terminals indicated at the left in the chart are traversed by the wipers of their advancement throughout the cycle, and the last of a series of numerals indicates the terminal at which the wipers of the thirty-point switches reset as a result of the operation described at the right.

CHART I

INDICATION CHECK WITH CONTROLLED DEVICE—TRIPPED AND MONITORED DEVICE—NORMAL

| Terminals | Description |
| --- | --- |
| 15, 16 | After station selection is effected by control office, control station sends two indication check pulses as a result of the operation of the "Check Key" by the dispatcher. |
| 17, 18, 19, 20 | Substation sends four trip supervision pulses. |
| 21, 22, 23 | Control station sends three trip supervision check pulses. |
| 24, 25 | Substation sends two normal supervision pulses. |
| 26, 27, 28 | Control station sends three normal supervision check pulses. |
| 29 | Substation sends one pulse. |
| 30 | Control station sends long reset pulse. |

INDICATION CHECK WITH CONTROLLED DEVICE—TRIPPED AND MONITORED DEVICE—ALARM

| Terminals | Description |
| --- | --- |
| 15, 16 | Control station sends two indication check pulses. |
| 17, 18, 19, 20 | Substation sends four trip supervision pulses. |
| 21, 22 | Control station sends three trip supervision check pulses. |
| 23, 24, 25 | Substation sends three alarm supervision pulses. |
| 26, 27 | Control station sends one alarm supervision check pulse. |
| 28, 29 | Substation sends two pulses. |
| 30 | Control station sends long reset pulse. |

INDICATION CHECK WITH CONTROLLED DEVICE—CLOSED AND MONITORED DEVICE—NORMAL

| Terminals | Description |
| --- | --- |
| 15, 16, 17 | Control station sends two indication check pulses. |
| 18, 19, 20, 21, 22 | Substation sends five close supervision pulses. |
| 22 | Control station sends one close supervision check pulse. |
| 23, 24, 25 | Substation sends three normal supervision pulses. |
| 26, 27, 28 | Control station sends three normal supervision check pulses. |
| 29 | Substation sends one pulse. |
| 30 | Control station sends long reset pulse. |

CHART I—Continued
INDICATION CHECK WITH CONTROLLED DEVICE—CLOSED AND MONITORED DEVICE—ALARM

| | |
|---|---|
| 15, 16, 17, 18 | Control station sends two indication check pulses. |
| 19, 20, 21 | Substation sends five close supervision pulses. |
| 22, 23 | Control station sends one close supervision check pulse. |
| 24, 25, 26 | Substation sends four alarm supervision pulses. |
| 27 | Control station sends one alarm supervision check pulse. |
| 28, 29 | Substation sends two pulses. |
| 30 | Control station sends long reset pulse. |

TRIP CONTROL WITH MONITORED DEVICE—NORMAL

| | |
|---|---|
| 15, 16, 17, 18 | After station selection is effected by control station, control station sends four trip pulses as a result of the operation of the "Trip Key" by the Dispatcher. |
| 19, 20, 21 | Substation sends two trip supervision pulses. |
| 22, 23 | Control station sends three trip supervision check pulses. |
| 24, 25 | Substation sends two normal supervision pulses. |
| 26, 27, 28 | Control station sends three normal supervision check pulses. |
| 29 | Substation sends one pulse. |
| 30 | Control station sends long reset pulse. |

TRIP CONTROL WITH MONITORED DEVICE—ALARM

| | |
|---|---|
| 15, 16, 17, 18 | Control station sends four trip pulses. |
| 19, 20, 21 | Substation sends two trip supervision pulses. |
| 22, 23 | Control station sends three trip supervision check pulses. |
| 24, 25, 26 | Substation sends three alarm supervision pulses. |
| 27 | Control station sends one alarm supervision check pulse. |
| 28, 29 | Substation sends two pulses. |
| 30 | Control station sends long reset pulse. |

CLOSE CONTROL WITH MONITORED DEVICE—NORMAL

| | |
|---|---|
| 15, 16, 17, 18, 19 | After station selection is effected, by control station, control station sends five close pulses as a result of the operation of the "close key" by the dispatcher. |
| 20, 21 | Substation sends two close supervision pulses. |
| 22 | Control station sends one close supervision check pulse. |
| 23, 24, 25 | Substation sends three normal supervision pulses. |
| 26, 27, 28 | Control station sends three normal supervision check pulses. |
| 29 | Substation sends one pulse. |
| 30 | Control station sends long reset pulse. |

CLOSE CONTROL WITH MONITORED DEVICE—ALARM

| | |
|---|---|
| 15, 16, 17, 18, 19 | Control station sends five close pulses. |
| 20, 21 | Substation sends two close supervision pulses. |
| 22 | Control station sends one close supervision check pulse. |
| 23, 24, 25 | Substation sends four alarm supervision pulses. |
| 26, 27 | Control station sends one alarm supervision check pulse. |
| 28, 29 | Substation sends two pulses. |
| 30 | Control station sends long reset pulse. |

The following chart indicates the manner of operation of the system wherein because of an automatic change in the condition of either the controlled device or the monitored device, a given substation initiates the sending of impulses to inform the equipment at the control station of the change. In the chart, it is assumed that the substation has sent two transient protection pulses and sufficient additional pulses to advance the wipers of the thirty-point switch of the control station to the terminal associated with the substation and that the control station has transmitted sufficient acknowledgement pulses to advance the wipers of the thirty-point switches at the control station and at the substation to terminal #14.

CHART II
INDICATION REPORT: CONTROLLED DEVICE—TRIPPED AND MONITORED DEVICE—NORMAL

| | |
|---|---|
| 15, 16, 17, 18, 19, 20, 21 | Substation sends six trip supervision pulses. |
| 22, 23 | Control station sends three trip supervision check pulses. |
| 24, 25 | Substation sends two normal supervision pulses. |
| 26, 27, 28 | Control station sends three normal supervision check pulses. |
| 29 | Substation sends one pulse. |
| 30 | Control station sends long reset pulse. |

INDICATION REPORT: CONTROLLED DEVICE—TRIPPED AND MONITORED DEVICE—ALARM

| | |
|---|---|
| 15, 16, 17, 18, 19, 20, 21 | Substation sends six trip supervision pulses. |
| 22, 23 | Control station sends three trip supervision check pulses. |
| 24, 25, 26 | Substation sends three alarm supervision pulses. |
| 27 | Control station sends one alarm supervision check pulse. |
| 28, 29 | Substation sends two pulses. |
| 30 | Control station sends long reset pulse. |

INDICATION REPORT: CONTROLLED DEVICE—CLOSED AND MONITORED DEVICE—NORMAL

| | |
|---|---|
| 15, 16, 17, 18, 19, 20, 21 | Substation sends seven close supervision pulses. |
| 22, 23 | Control station sends one close supervision check pulse. |
| 24, 25 | Substation sends three normal supervision pulses. |
| 26, 27, 28 | Control station sends three normal supervision check pulses. |
| 29 | Substation sends one pulse. |
| 30 | Control station sends long reset pulse. |

INDICATION REPORT: CONTROLLED DEVICE—CLOSED AND MONITORED DEVICE—ALARM

| | |
|---|---|
| 15, 16, 17, 18, 19, 20, 21 | Substation sends seven close supervision pulses. |
| 22, 23 | Control station sends one close supervision check pulse. |
| 24, 25, 26 | Substation sends four alarm supervision pulses. |
| 27 | Control station sends one alarm supervision check pulse. |
| 28, 29 | Substation sends two pulses. |
| 30 | Control station sends long reset pulse. |

The following chart is arranged to indicate in condensed form the relationship between the operation desired and the switch contact assignments of the thirty-point rotary switches operative therewith for the various cyclic operations of the supervisory control system. The legends across the top of the page list the various functions which may be performed by the control office or the substation. A function such as the selection of the substation may be initiated by either the control station or the substation. The next group of functions from the "Indication Check: Tripped and Normal" to the "Close Control and Alarm" are initiated by the dispatcher at the control station. The last group of functions "Indication Reports: Tripped and Normal to Closed and Alarm" are initiated by the reporting substation. The column at the left of the page lists the thirty terminals of the thirty-point switches and indicates the function of each terminal. The "x's" throughout the chart are indicative of the terminals of the thirty-point switch on which the wipers arrive responsive to sets of pulses during the cycle of operation of the supervisory system for a given function.

A simple example should suffice to indicate the significance of the chart and its utility. If it be assumed that the circuit breaker of substation #10 is to be tripped and further that the monitored device of substation #10 is in its normal condition, the functions to be performed are:

(1) Selection of substation #10, and
(2) Trip circuit breaker.

Referring now to Chart III the legend across the top of the page entitled "Selection of Station #10" indicated the vertical column to be first considered. It is apparent from the chart that upon the depression of the selection key associated with substation #10, the equipment at the control station transmits twelve pulses (two transient protection pulses and ten station selection pulses) thus advancing the wipers of the thirty-point switches at the control station and at all the substations to terminal #12. As will be explained later all the substations with the exception of the selected substation #10 are placed on lockout. Substation #10 then transmits two pulses to advance the wipers of the thirty-point switches to terminal #14.

Referring now to vertical column entitled "Trip Control and Normal" it may be seen that the wipers of the thirty-point switches at the selected substation and at the control station are advanced to terminal #18 by four trip control pulses transmitted by the control station. A circuit is completed over a terminal #18 of the rotary switch at the substation to energize the trip coil of circuit breaker 709 and effect its operation to the tripped condition. Upon the tripping of the circuit breaker at the selected substation, two pulses are transmitted from the substation to advance the wipers to terminal #20, the trip supervision terminal.

The control station then transmits three pulses to advance the wipers to terminal #23, the trip supervision check terminal. Following this the substation transmits two normal supervision pulses to advance the wipers of the thirty-point switches to terminal #25, the normal supervision terminal. Following this, the control station transmits three normal supervision check pulses to advance the wipers to terminal #28, the normal supervision check terminal. The substation then transmits one pulse to advance the wipers to terminal #29, the reset terminal.

CHART III

| Switch Contact Assignments | Selection of Station #1 | #2 | #3 | #4 | #5 | #6 | #7 | #8 | #9 | #10 | Indication Check: Tripped & Normal | : Tripped & Alarm | : Closed & Normal | : Closed & Alarm | Trip Control & Normal | & Alarm | Close Control & Normal | & Alarm | Indication Reports: Tripped & Normal | : Tripped & Alarm | : Closed & Normal | : Closed & Alarm | Single Transient | Two Transients |
|---|---|---|---|---|---|---|---|---|---|---|---|---|---|---|---|---|---|---|---|---|---|---|---|---|
| 1 Transient Protection | | | | | | | | | | | | | | | | | | | | | | | | x | |
| 2 Transient Protection | | | | | | | | | | | | | | | | | | | | | | | | | x |
| 3 Station #1 | x | | | | | | | | | | | | | | | | | | | | | | | | |
| 4 #2 | | x | | | | | | | | | | | | | | | | | | | | | | | |
| 5 #3 | | | x | | | | | | | | | | | | | | | | | | | | | | |
| 6 #4 | | | | x | | | | | | | | | | | | | | | | | | | | | |
| 7 #5 | | | | | x | | | | | | | | | | | | | | | | | | | | |
| 8 #6 | | | | | | x | | | | | | | | | | | | | | | | | | | |
| 9 #7 | | | | | | | x | | | | | | | | | | | | | | | | | | |
| 10 #8 | | | | | | | | x | | | | | | | | | | | | | | | | | |
| 11 #9 | | | | | | | | | x | | | | | | | | | | | | | | | | |
| 12 #10 | | | | | | | | | | x | | | | | | | | | | | | | | | |
| 13 | | | | | | | | | | | | | | | | | | | | | | | | | |
| 14 Station Check | x | x | x | x | x | x | x | x | x | x | | | | | | | | | | | | | | | |
| 15 | | | | | | | | | | | | | | | | | | | | | | | | | |
| 16 Indication | | | | | | | | | | | x | x | x | x | | | | | | | | | | | |
| 17 | | | | | | | | | | | | | | | | | | | | | | | | | |
| 18 Trip | | | | | | | | | | | | | | | x | x | | | | | | | | | |
| 19 Close | | | | | | | | | | | | | | | | | x | x | | | | | | | |
| 20 Trip Supv. | | | | | | | | | | | x | x | | | x | x | | | x | x | | | | | |
| 21 Close Supv. | | | | | | | | | | | | | x | x | | | x | x | | | x | x | | | |
| 22 Close Supv. Check | | | | | | | | | | | | | x | x | | | x | x | | | x | x | | | |
| 23 Trip Supv. Check | | | | | | | | | | | x | x | | | x | x | | | x | x | | | | | |
| 24 | | | | | | | | | | | | | | | | | | | | | | | | | |
| 25 Normal Supv. | | | | | | | | | | | x | | x | | x | | x | | x | | x | | | | |
| 26 Alarm Supv. | | | | | | | | | | | | x | | x | | x | | x | | x | | x | | | |
| 27 Alarm Supv. Check | | | | | | | | | | | | x | | x | | x | | x | | x | | x | | | |
| 28 Normal Supv. Check | | | | | | | | | | | x | | x | | x | | x | | x | | x | | | | |
| 29 Reset | | | | | | | | | | | x | x | x | x | x | x | x | x | x | x | x | x | | | |
| 30 Normal | | | | | | | | | | | x | x | x | x | x | x | x | x | x | x | x | x | x | x | |

Following this the control station transmits a long reset pulse to restore the thirty-point switches and the equipment at the control station and all of the substations to their normal condition.

DESCRIPTION OF APPARATUS

The arrangement as shown for purposes of illustration comprises a control office A and a substation B which are interconnected by a single signal channel comprising a pair of line conductors 485 and 486. Alternatively the signal channel may comprise with suitable terminations, any type of channel capable of transmitting signals and includes carrier current, radio and micro-wave. Control office A includes a control panel which has been previously described herein, and from which the dispatcher may control the operation of the automatic transmitting and receiving equipment at the control office and at the substation. While only one substation has been illustrated in detail, the supervisory control system of the present invention provides for the use of other substations with the single control station A by merely connecting them in parallel to line conductors 485 and 486.

The transmitting and receiving equipment which is disposed at the substation and the control office have similarities and accordingly it is convenient to indicate general relay functions by means of the chart shown below:

RELAY FUNCTIONS

| Control Station, Figures 2–4, Relay | Substation, Figures 5–7, Relay | Function |
| --- | --- | --- |
| 445 | | Control Station Initiating Marking Relay.—Operates in response to the operation of the station selection key to initiate sending of transient protection and station selection pulses and remains operated until a reset signal is transmitted. |
| 400 | 580 | Sending Relay.—Operates to send impulses over the line by connecting ground and negative battery to the line. |
| 407 | 500 | Line Relay.—Connected to the line wires 485 and 486 in parallel, being normally released but operated in response to pulses placed of the line by the sending relay of the control station or any substation. |
| 415 | | Outgoing Code Marking Relay.—Energizes at the start of the outgoing code signal. Since it is a slow-to-release relay it does not restore during pulses but releases only after a code of impulses have been completed. After the code is completed, it releases to prepare an operating circuit for the receiving control relay. |
| 230 a–j | | Substation Selection Relays.—Operates upon completion of outgoing station selection code to seize the control circuits at the control station corresponding to the selected substation. |
| 435 | | Station Selection Interlock Relay.—Operates in response to operation of the substation selection relay 230 for example to complete a holding circuit for itself and the substation selection relay to hold the seized control circuits of the selected substation and to mark the control station that point selection has been made. It releases upon the 5-second reset pulse to restore the seized circuits to normal. |
| 220 a–j | | Substation Controlled Device Indication Relays.—Operates (if non-operated) to light its associated red (closed) lamp if the controlled device at the associated substation is in the closed condition; restores (if operated) to light its associated green (tripped lamp) if the controlled device in the associated substation is in the tripped condition. |
| 215 a–j | | Controlled Device Lamp Flashing Relays.—Operates to flash either the red (closed) or green (tripped) lamp to indicate a change in the operation of the controlled device at the associated substation from its closed or tripped condition. |
| 470 | | Indication Control Relay.—Operates upon receipt of "trip supervision" signal from the controlled substation to restore the substation controlled device indication relay such as 220a (if operated), resulting in the lighting of the green (tripped) lamp to indicate the tripped condition of the controlled circuit breaker and operates upon receipt of "close supervision" signal from the controlled station to operate the substation controlled device indication relay such as 220a (if unoperated), resulting in the lighting of the red (closed) lamp to indicate the closed condition of the circuit breaker. |

RELAY FUNCTIONS—Continued

| Control Station, Figures 2–4, Relay | Substation, Figures 5–7, Relay | Function |
| --- | --- | --- |
| 475 | | Indication Control Relay.—Operates upon receipt of the "normal supervision" signal from the controlled substation to restore the substation monitored device indication relay such as 200a (if operated), resulting in the lighting of the green (normal) lamp to indicate that the monitored device is in its normal condition and operates upon receipt of the "alarm supervision" signal from the controlled substation to operate the substation monitored device indication relay such as 200a (if unoperated), resulting in the lighting of the red (alarm) lamp to indicate that the monitored device is not in its normal condition. |
| 420 | 510 | Receiving Control Relay.—Energizes upon receipt of first incoming pulse of any code. After receipt of the complete code, releases to terminate the receiving condition. |
| 425 | | Auxiliary Test Relay.—Operates in conjunction with the receiving control relay to prevent operation of the sending relay during a receiving condition. Is held locked over the "Hold." When held, this relay in conjunction with the receiving control relay provide selection ground to the "Selection" bank wiper. This "selection" ground is used to operate appropriate relays via the "Selection" bank terminals. These appropriate relays comprise substation selection relays, reset relay, station selection code stop relay, trip or close indication control relay, normal or alarm indication control relay. |
| 410 | 540 | Reset Control Relay.—Operates upon receipt of long reset pulse to restore the common relays held operated by the auxiliary positive bus and completes a self-stepping circuit for the step magnets which restore the wipers of the thirty point switches to terminal 30 and open the off-normal contacts thereof. |
| 332, 320 | | Flashing Lamp Alarm Relays.—Operate together to provide a cyclically interrupted energizing circuit for the alarm lamp 300. |
| | 530 | Outgoing Code Marking Relay.—Operates at initiation of outgoing code impulse and prepares a point in the operating circuit for the stepping magnet independent of the wipers of the thirty point switch. It also interrupts the energizing circuit for the receiving control relay during the sending period. |
| 430 | | Station Selection Code Stop Relay.—Operates upon receipt of the last station check pulse from the substation to complete a circuit for the energization of the white selection lamp associated with the selected substation and to mark the control station that station check has been completed. |
| 330 | | Alarm Relay.—Operates the alarm bell and alarm lamp. |
| | 700 | Controlled Device Indication Relay.—Operates upon closure of controlled device such as circuit breaker under control of auxiliary switch contacts to indicate the condition of the controlled device. |
| 480 | | Indication Control Relay.—Releases upon operation of indication control relay 470 or 475 to complete operating circuits for the indication and lamp flashing relays associated with monitored device and controlled device of the selected substation. |
| 455 | | Reset Control Relay.—Operates to energize sending relay in initiation of long reset pulse. |
| 465 | | Reset Control Relay.—Requires 5 seconds to operate after energization to establish the long reset interval. |
| 210 a–j | | Monitored Device Lamp Flashing Relays.—Operates to flash the green (normal) or red (alarm) lamp associated with the monitored device of the selected substation to call the attention of the dispatcher to the change of condition there of. |
| 200 a–j | | Monitored Device Indication Relays.—Operates to light either the green (normal) or red (alarm) lamp as determined by the condition of the monitored device at the control station. |
| | 700 | Controlled Device Indication Relay.—Operates in conjunction with the auxiliary switch contacts associated with the controlled device to condition the sending equipment of the substation to send a code indicative of the tripped or closed condition of the controlled device. |
| | 710 | Monitored Device Indication Relay.—Operates in conjunction with the auxiliary switch contacts associated with the monitored device to condition the sending equipment at the substation to send a code indicative of the normal or alarm condition of the controlled device. |
| | 520 | Auxiliary Sending Relay.—Operates with initiation of any sending code to interrupt the operating path for the receiving control relay 510. It also completes an energizing circuit for the outgoing code marking relay 530. |

RELAY FUNCTIONS—Continued

| Control Station, Figures 2-4, Relay | Substation, Figures 5-7, Relay | Function |
|---|---|---|
| 200 a-j | 690 | *Code Check Relay.*—Operates upon arrival of wipers of the thirty point switch of the substation at terminal No. 14 to prepare an energizing circuit for sending relay 580. |
| | 720 | *Controlled Device Change of Indication Relay.*—Releases upon the automatic tripping or closing of the controlled device to initiate the reporting action of the substation upon a change in the operating condition of the controlled device. |
| | 730 | *Monitored Device Change of Indication Relay.*—Releases upon operation or release of the monitored device to initiate the reporting action of the substation upon a change in the monitored condition of the monitored device. |

SUBSTATION APPARATUS

One of the more desirable features of the novel substation apparatus of the present invention is the facility with which the substation equipment can be replaced and interchanged with another unit. A fundamental requisite for quick replacement of defective substation equipment with a tested unit by a simple substitution therefor is a means for connecting a new substation into the circuit without any extensive soldering or other time consuming labor. It is also necessary to differentiate between the positions of the various substations by circuitry individual to each substation and yet provide a means for manufacturing a substation which is universal in that it can be substituted for any defective substation without extensive modifications or rewiring.

In the present invention, the problem of demounting a defective substation and quickly replacing it with a properly functioning one without extensive unsoldering and soldering operations is solved by providing a basic substation set which is wired universally and includes a manual switch whose setting determines the position of the substation in the group of substations accessible to the single control station.

For a more complete description of the novel substation reference may be had to Figure 1 which is a perspective view of the universal substation illustrating the positioning of its components and detecting the means whereby it is simply demountable and the manual switch whose setting determines the position of the substation. The numbered components correspond to those illustrated in substation of Figures 5–7 thereof.

In general the illustrated substation is designated by the numeral 20 and comprises a basic framework 21 of thin strips of sheet stock forming the edges of a rectangular frame having vertical members 22, horizontal cross members 23 extending across the front and rear thereof, and frame members 24 spanning from front to rear and connecting the other vertical and horizontal members of the frame.

Disposed horizontally at various levels of the rectangular framework are the various relays and switches which comprise the electrical components of the substation. To support the electrical components, horizontal frame members (not shown) extend across the rear of the framework and form a structure to which the relays and other components may be attached by bolts or other conventional means.

The uppermost horizontal row contains the line relay 500, the receiving control relay 510, the outgoing code marking relay 530, and the sending relay 580. The second horizontal row contains the reset control relay 540, the auxiliary sending relay 520, and the code check relay 690. Disposed at the right hand end of the second horizontal row is an assembly containing the four selenium rectifiers comprising the rectifier unit 570.

Below this and forming the third or lowermost horizontal row of relays is a group of relays comprising respectively the controlled device indication relay 700, the controlled device change of indication relay 720, the monitored device indication relay 710 and the monitored device change of indication relay 730.

Immediately below this latter horizontal row of relays is located a panel 27 which contains a ten-point manual switch 611 having a knob or pointer 25, a fuse member 26, and a thirty-point rotary switch here shown as a block 604.

Disposed immediately below panel 27 is a series of ten electrically conductive knife-edge receiving contacts 30–39 (only 34–39 are herein shown). The individual contacts comprise two metal straps preferably of copper or other highly conducting material, pressed tightly together so as to form a highly conductive connection when spread apart by a pivoted knife blade which forms the complementary portion of the electrical connector. This arrangement enables facile replacement of the substation equipment in case of failure without any soldering or other time consuming connecting means. These contacts of which 34–39 are shown are connected internally of the substation and correspond to the terminals 1–10 to which circuits external to the substation are connected. With reference to Figures 5–7 it may be seen that over terminals 1 and 2 the line circuit is connected to the substation equipment. The controlled device 709 is connected to the substation equipment over terminals 3, 4 and 5, while the monitored device 717 is connected thereto over terminal 6. Terminals 7 and 8 are reserved for a source of direct current if used instead of the rectifier unit 570; while terminals 7–10 are used if a source of alternating current is available to the subset.

Disposed at either side of the framework 21 are a pair of latches 40 and 41 which engage studs (not shown) that extend interiorly of the case or cabinet 45 and to which the substation is locked by means of these latches. The latches 40 and 41 are centrally pivoted and have a small cut-out section (not shown) in ends extending toward the rear of the subset so as to form a gripping surface for the engagement of the studs. The ends of latches 40 and 41 extending outwardly beyond the face of the subset have a small section bent at right angles to their longitudinal axis to provide an engaging surface for the finger of the operator in locking the substation in its position within case 45, and in unlocking the substation.

To provide a permanently located mounting arrangement for the substation equipment there is provided a case or cabinet 45 of thin sheet steel. Case 45 is made large enough to conveniently enclose the substation equipment and is attached to a wall or other supporting structure by bolts or other suitable means. A cover (not shown) may be attached to the front of case 45 to provide a dust proof and dirt free environment for the substation equipment.

At the lower end of case 45 is disposed a plurality of pivoted knife-blades 50–59 each arranged to engage a respective one of the contacts 30–39 of the substation to complete an electrical connection between the substation equipment and the wiring external to the case such as the line conductors 485 and 486, the controlled device 709, the monitored device 717, and the source of alternating current or direct current available at the substation location. Each knife blade is connected through its pivotal base to a corresponding terminal (not shown) on the rear of the case 45 to which is permanently wired the appropriate external connection.

As a result of the novel equipment arrangement of the present invention, in order to demount one substation and replace it with another, the attendant merely flips open the ten knife blade connections and disengages the two latches 40 and 41. The substation equipment 20 is easily removed and replaced by a different set of equipment after which the two latches 40 and 41 and the ten knife blades 50-59 are quickly and easily moved into place. Maintenance time is reduced to a minimum by this quick interchangeability of equipment.

It will be recalled that one of the features of the present invention was the universal wiring of the substations and the manual switch which permitted the determination of the position of any substation by the setting of its dial to one of ten positions. In this regard switch 611 has a pointer 25 which when moved to any of ten positions alters the wiring interiorly of the subset to differentiate the substations one from another and determine the position of any substation.

As may be seen from Figure 6, the manual switch comprises three banks, each associated with a particular bank of the thirty-point switch 604. As the pointer or dial indicator 25 is rotated from setting to setting, the wipers of the various banks thereof move to contact terminals corresponding to the setting on the face of the dial. Consequently the internal wiring of the substation is altered by the movement of the dial to assume the position of a different substation for each setting thereof.

As a result, the cost of keeping replacement spares for a given supervisory system is kept to an absolute minimum since there need not be a spare substation set for each position, but one spare set may suffice for a complete system.

Additionally, if the necessity of a particular substation is obviated, the substation may be readily removed for use elsewhere thus providing economy and convenience through flexibility.

I. OPERATION OF THE SUPERVISORY CONTROL SYSTEM TO SELECT A SUBSTATION AND ACCOMPLISHING CLOSURE OF A CIRCUIT BREAKER THEREAT

A. *Normal condition of equipment*

In the normal condition of the equipment (i.e. when no controlling or reporting is taking place), all common relays at the control station and at each of the substations are non-operated except the reset control relays (410 at the control station and 540 at the illustrated substation). The wiper of each bank of the thirty-point magnetically operated switches (302 of the control station and 604 of the illustrated substation) is resting on terminal No. 30. If the circuit breaker 709 of substation #1 is in its non-operated or tripped condition, the corresponding controlled device indication relay 220a at the control station is non-operated and its associated green (tripped) lamp 243 is lighted. If the circuit breaker 709 is in its operated or closed condition, the corresponding controlled device indication relay 220a at the control station is operated and its associated red (closed) lamp 244 is lighted. Similarly if the monitored device 717 at the substation is in its normal condition, then monitored device indication relay 200a at the control station is in its non-operated condition and its associated green (normal) lamp 240 is lighted. If, however, the monitored device 717 at the substation is in its alarm condition, then monitored device indication relay 200a is in its operated condition and its associated red (alarm) lamp 241 is lighted.

At the substation, if circuit breaker 709 is in its operated or closed condition, controlled device indication relay 700 is operated from ground through the auxiliary switch contacts 760. If circuit breaker 709 is in its open or tripped condition, controlled device indication relay 700 is non-operated. Likewise the monitored device indication relay 710 is operated from ground through the alarm contacts if the monitored device 717 is not in its desired condition, but non-operated if it is in its desired or normal condition.

At the substation, controlled device change of indication relay 720 and monitored device change of indication relay 730 are normally operated and locked to ground, the energizing circuit for controlled device change of indication relay 720 extending from negative battery, over the lower winding of relay 720, contacts 703, resistor 718, and contacts 723 to ground or from negative battery over the upper winding of relay 720, contacts 702, resistor 718, and contacts 723 to ground, depending upon whether or not controlled device indication relay 700 is operated as controlled by the condition of circuit breaker 709. The energizing circuit for monitored device change of indication relay 730 extends from negative battery over the lower winding of relay 730, contact 715, resistor 719, and contacts 733 to ground or from negative battery, over the upper winding of relay 730, contacts 714, resistor 719, and contacts 733 to ground, depending upon whether or not monitored device indication relay 710 is operated, as controlled by the desired or alarm condition of the monitored device 717.

If a substation has reported an automatic trip or close of circuit breaker 709 due to a fault on the line, the green (tripped) lamp 243 or red (closed) lamp 244 on the associated escutcheon will be flashing. Likewise, the report of a change from normal to alarm or alarm to normal of the monitored device causes the green (normal) lamp 240 or red (alarm) lamp 241 on the associated escutcheon to be flashing.

Since sending relay 400 at the control station and sending relay 580 at the substation are normally de-energized, accordingly the parallel line circuit comprising conductors 485 and 486 is normally de-energized.

With line relay 407 of the control station normally de-energized, relay 407 at its contacts 409 completes an operating circuit for reset control relay 410 from negative battery, over the winding of relay 410, and contacts 409 to grounded positive battery. Reset control relay 410 which is sleeved and slugged to exhibit a slow-to-release characteristic operates and remains operated during the pulsing of line relay 407, but releases on a long reset pulse (5 seconds) which holds line relay 407 energized beyond the slow-to-release time of reset control relay 410. Reset control relay 410 at its contacts 411 extends grounded positive battery to all points in the control station indicated by a plus sign surrounded by a single circle, thus controlling this ground for reset purposes.

Line relay 500 at the illustrated substation is non-operated and at its contacts 502 completes an energizing circuit for reset control relay 540 which extends from negative battery, over resistor 503, the winding of relay 540, conductor 565, the normally-closed off-normal contacts 601, conductor 561 and contacts 502 to grounded positive potential. Operating potential at the substation is supplied by rectifier 570 (Figure 5) which is a conventional full-wave rectifier utilizing four rectifier elements, such as selenium rectifiers, to convert the available 100–115 volt alternating current stepped up to the required potential through a transformer into the requisite direct current.

Alternatively a battery connected to terminals 7 and 8 with grounded positive potential connected to terminal 7 and negative potential connected to terminal 8 can supply current for substation operation.

Relay 540 locks over a circuit extending from negative battery, over resistor 503, the winding of relay 540, contacts 543, and contacts 502 to grounded positive battery.

B. *Selection of a substation*

1. OPERATION AT CONTROL STATION

It should be recalled that any supervisory control system using conductor lines extending between points separated by any substantial distance is subject to the possibility of false operation due to transient pulses which might occur. In order to minimize the possibility of such pulses unduly affecting the operation of the control system of the present invention, the equipment is arranged to reset itself if either one or two such transient pulses are received by either or both the control station or any substation associated therewith. The specific circuitry which performs the reset operation will be described in greater detail hereinafter.

The control station equipment sends two transient protection pulses before sending the requisite pulse or pulses to select a given substation. For example if substation #1 is to be selected, the control station sends three pulses (two transient protection pulses and one station selection pulse), and if substation ten is to be selected, the control station sends twelve pulses (two transient protection pulses and ten station selection pulses).

In order, therefore, to select a substation the operator at the control station depresses the non-locking station selection key 248a corresponding to substation #1 from the group of selection keys 248a–248j individual to each substation and holds it depressed until the associated white selection lamp lights, indicating that the desired substation has been reached. In the assumed example selection key 248a is depressed to effect seizure of substation #1 (the illustrated substation) and after completion of the selection, white selection lamp 242 lights, whereupon the selection key is released.

(a) *First transient protection pulse.*—More specifically, the selection key 248a is depressed and at its contacts 245 completes an operating circuit for the control station initiating marking relay 445, which extends from negative battery, over the winding of relay 445, conductor 256, contacts 245, conductor 258, terminal #30 and wiper 360 of the "hold" bank of switch 302, conductor 396 and contacts 427 to ground.

Control station initiating marking relay 445 operates, and at its contacts 446 completes a self holding circuit to ground, and at its contacts 447 completes an operating circuit for sending relay 400 extending from negative battery, over the winding of relay 400, contacts 460, contacts 423, conductor 394, wiper 350 and terminal #30 of the "code control" bank of switch 302, conductor 373, contacts 447, and contacts 409 to ground.

Sending relay 400 operates and at its contacts 403 connects negative battery to conductor 486 of the outgoing line, and over resistor 490 to the winding of line relay 407, at its contacts 401 connects ground to the other side of the winding of line relay 407 and over resistor 489 to conductor 485 of the outgoing line, and at its contacts 404 completes an energizing circuit for outgoing code marking relay 415 over a circuit extending from negative battery, over the winding of relay 415, and contacts 404 to ground.

The application of battery to one side of the line and ground to the other initiates the first transient protection pulse. The initiation of the first transient protection pulse operates the line relays at each substation and in particular line relay 500 of substation #1 over a circuit extending from negative battery, over contacts 403, conductor 486, resistor 516, the winding of line relay 500, conductor 485, resistor 489, and contacts 401 to ground. Line relay 407 is energized over a circuit extending from negative battery, over contacts 403, resistor 490, the winding of line relay 407, and contacts 401 to ground.

Thus, the line relays at the control station and at all the substations operate in parallel relative to the source of energizing potential over the contacts of the sending relay 400 at the control station. By a similar analysis, it may be shown that the line relays at the control station and at all the substations operate in parallel relative to the energizing potential applied to line conductors 485 and 486 by the contacts of the sending relay at any of the substations.

Although the wipers of the thirty-point switches at the control station and at the selected substation advance in synchronism in response to pulses on line conductors 485 and 486, for purposes of clarity of explanation, a partial cycle of operation will be described first at one location and then at the other in alternating sequential fashion. The concluding part of this portion of the description will be devoted to the operation of equipment at non-selected substations.

Considering now the operation at the control station, it will be recalled that line relay 407 is operated and at its contacts 409 interrupts the operating circuit for sending relay 400; and at its contacts 408 completes an energizing circuit for the step magnet 380 of the four bank rotary switch 302, which extends from negative battery, over the winding of step magnet 380, conductor 378, contacts 412, and contacts 408 to ground. The circuit thus extended will be hereinafter referred to as the stepping magnet circuit and will be designated 380'. Switch step magnet 380 does not, however, step until this circuit is interrupted and hence, at this time the wipers of the switch 302 are not advanced to terminal #1.

Sending relay 400 releases after an interval determined by its slow-to-release characteristics and at its contacts 401 and 403 interrupts the energizing circuits for line relay 407, line relay 500 and the line relays at the other substations connected to lines 485 and 486, thus terminating the first transient protection pulse.

Line relay 407 restores and at its contacts 408 interrupts the energizing circuit for step magnet 380; and at its contacts 409 prepares a circuit for effecting the reoperation of sending relay 400.

Step magnet 380 restores and advances the wiper of each bank of switch 302 one step to terminal #1, and at its off-normal contacts 387 completes an energizing circuit for off-normal lamp 318 which extends from negative battery, over the filament of lamp 318 and contacts 387 to ground. Lamp 318 lights to indicate that the rotary switch has been stepped from its normal rest position and that the control station equipment has begun its selection function.

(b) *Second transient protection pulse.*—As the wiper 350 of the "code control" bank advances to terminal #1, it completes an energizing circuit for sending relay 400 which extends from negative battery, over the winding of sending relay 400, contacts 460, 423, conductor 394, wiper 350 and terminal #1 of the "code control" bank, conductor 373, contacts 447, and contacts 409 to ground.

Sending relay 400 operates and at its contacts 401 and 403 completes the above-described circuit for applying ground and negative battery to the outgoing line for the initiation of the second transient protection pulse, and to the winding of line relay 407 to complete an energizing circuit therefor.

Line relay 407 operates and at its contacts 409 interrupts the operating circuit for sending relay 400 and at its contacts 408 completes an energizing circuit for step magnet 380 which extends over the above-described circuit.

Sending relay 400 restores after an interval determined by its slow-to-release characteristics and at its contacts 401 and 403 interrupts the energizing circuit for line relay 407, line relay 500 and the line relays of the other substations connected to outgoing lines 485 and 486, thus terminating the second transient protection pulse.

Line relay 407 restores and at its contacts 409 prepares a circuit for the reoperation of sending relay 400 and at its contacts 408 interrupts the energizing circuit for step magnet 380.

Step magnet 380 restores and advances the wiper of each bank of switch 302 one step to terminal #2.

(c) *Station selection pulse.*—Following the transmission of the two transient protection pulses, the equipment at the control station prepares to transmit an additional pulse or pulses to effect selection of one of the substations. The number of station selection pulses to be transmitted corresponds to the numerical designation of the substations. That is, one station selection pulse will be transmitted if the first substation is desired; two for the second, and so forth until ten pulses are transmitted to select the tenth substation.

In the assumed example, the illustrated substation is substation #1 and hence, only one station selection pulse is to be transmitted by the control station.

Impulse transmission control at this time is transferred from the "hold" bank to the "code control" bank of the thirty-point switch 302. It will be recalled that at the completion of the second transient protection pulse, the wipers of the banks of switch 302 advance to terminal #2. Accordingly, wiper 350 of the "code control" bank is now engaging terminal #2 and thereat completes a re-energizing circuit for sending relay 400 which extends from negative battery, over the winding of sending relay 400, contacts 423, contacts 460, conductor 394, wiper 350 and terminal #2 of the "code control" bank, conductor 373, contacts 447, and contacts 409 to ground.

Sending relay 400 reoperates, and at its contacts 401 and 403 transmits the first station selection pulse over line conductors 485 and 486. As previously noted, the line relay 407 at the control station and the line relays at the substations, being connected in parallel on the line, are operated in response to the first station selection pulse.

Line relay 407 operates and at its contacts 409 interrupts the operating circuit for sending relay 400, and at its contacts 408 completes the step magnet energizing circuit 380'.

Sending relay 400 releases after an interval established by its slow-to-release characteristics and at its contacts 401 and 403 removes ground and negative battery from the line conductors 485 and 486 to terminate the first station selection pulse and at its contacts 404 interrupts the operating circuit for slow-to-release outgoing code marking relay 415. This removal of energizing potential from the line effects restoration of all the line relays connected in parallel to conductors 485 and 486 including line relay 407.

Line relay 407 restores and at its contacts 409 prepares a point in the energizing circuit for sending relay 400, and at its contacts 408 interrupts the energizing circuit for step magnet 380.

Step magnet 380 restores and advances the wiper of each of the banks of switch 302 another step to terminal #3.

Sending relay 400 is not re-energized inasmuch as selection key 248a is depressed, and at its contacts 247 the only energizing circuit for sending relay 400 over terminal #3 of the code control bank is interrupted, as may be seen by tracing from negative battery, over the winding of sending relay 400, contacts 460, contacts 423, conductor 394, wiper 350 and terminal #3 of the "code control" bank, and conductor 255 to open contacts 247. It will be apparent that each selection key 248a-j, as operated, interrupts the advancing circuit at a correspondingly different contact in the code control bank and in this manner accomplishes the transmission of the number of selection impulses corresponding to the substation represented thereby.

As line relay 400 is restored and contact 402 opened for a predetermined period of time in excess of the release time of outgoing code marking relay 415, relay 415 restores and at its contacts 419 completes an energizing circuit for substation selection relay 230a associated with substation #1 which circuit extends from negative battery, over the winding of substation selection relay 230a, conductor 260, terminal #3 and wiper 340 of the "selection" bank of switch 302, conductor 395, contacts 429, contacts 448, contacts 419, and contacts 439 to ground.

Station selection relay 230a operates and at its contacts 238 completes an energizing circuit for station selector interlock relay 435 and indication control relay 480. The energizing circuit for station selector interlock relay 435 extends from negative battery, over the winding of relay 435, conductor 266, contacts 238, conductor 260, terminal #3 and wiper 340 of the "selection" bank of switch 302, conductor 395, contacts 429, contacts 448, contacts 419, and contacts 439 to ground. The energizing circuit for indication control relay 480 extends from negative battery, over the winding of relay 480, contacts 479, contacts 484, conductor 266, contacts 238, conductor 260, terminal #3 and wiper 340 of the "selection" bank of switch 302, conductor 395, contacts 429, contacts 448, contacts 419, and contacts 439 to ground.

Station selector interlock relay 435 operates and at its make-before-break contacts 438 transfers its operating ground from an operating circuit to a holding circuit for itself, indication control relay 480 and substation selection relay 230a, and at its contacts 439 interrupts the original operating circuits for these relays. Station selection interlock relay 435 holds over an obvious circuit. Indication control relay 480 is held operated over a circuit extending from negative battery, over the winding of relay 480, contacts 479, contacts 484, and contacts 438 to ground. Substation selection relay 230a is held operated over a circuit extending from negative battery, over the winding of relay 230a, contacts 238, conductor 266, and contacts 438 to ground.

Substation selection relay 230a operates and at its contacts 231–238 prepares points in the operating circuits for relays 200a, 210a, 215a and 220a and their associated lamps 240, 241, 242, 243 and 244. In the interest of brevity and clarity further discussion of these circuits will be held in abeyance until the wipers of switch 302 have advanced to the individual terminals which complete these circuits.

2. CONCURRENT OPERATION AT THE SELECTED SUBSTATION

It will be recalled that the line relay at each substation was operated in response to the application of negative battery and ground to line conductors 485 and 486 as a result of the operation of sending relay 400. Concurrently with the stepping of the wipers of switch 302 at the control station, the wipers of the thirty-point switch 604 at the selected substation step in synchronism therewith and in the chosen example, wherein substation #1 is selected, the wipers of the thirty-point switch 604 are advanced to terminal #3.

(a) *First transient protection pulse.*—More specifically, line relay 500 operates in response to the first transient protection pulse, and at its contacts 501 completes operating circuits for the receiving control relay 510 and the step magnet 608 associated with thirty-point switch 604. The energizing circuit for the receiving control relay 510 extends from negative battery, over the winding of relay 510, contacts 521, contacts 532, conductor 560, terminal #30 and wiper 610 of the "stepping" bank of switch 604, conductor 569, and contacts 501 to ground. The energizing circuit for step magnet 608 extends from negative battery, over the winding of step magnet 608, conductor 563, contacts 541, conductor 560, terminal #30 and wiper 610 of the "stepping" bank of switch 604, conductor 569 and contacts 501 to ground.

Receiving control relay 510 operates and at its contacts 511 completes a self holding circuit independent of the "stepping" bank and extending from negative battery, over the winding of relay 510, contacts 521, contacts 532, contacts 511 and contacts 501 to ground and at these same contacts also completes a holding circuit for the stepping magnet 608 extending from negative battery, over the winding of step magnet 608, conductor 563, contacts 541, contacts 511 and contacts 501 to ground. Receiving control relay 510 is of the slow-to-release type and does not release between pulses.

At the conclusion of the first transient protection pulse, line relay 500 restores, and at its contacts 501 interrupts the holding circuit for the step magnet 608 and the holding circuit for the receiving control relay 510; the latter, however, does not restore immediately because of its slow-to-release characteristics.

Step magnet 608 restores and in accordance with its nature advances the four wipers of switch 604 to terminal #1, and at its off-normal contacts 602 prepares a point in the holding circuit for code checking relay 690, and prepares a point in the self-interrupting circuit of switch magnet 608.

(b) *Second transient protection pulse.*—Upon the receipt of the second transient protection pulse, line relay 500 reoperates, and at its contacts 501 completes an energizing circuit for step magnet 608 which extends from negative battery, over the winding of step magnet 608, conductor 563, contacts 541, contacts 511, and contacts 501 to ground.

Step magnet 608 operates and conditions itself for advancing the wipers of the banks of switch 604 upon its de-energization.

Upon the termination of the second transient protection pulse, line relay 500 releases, and at its contacts 501 interrupts the energizing circuit for step relay 608 which restores and advances the wipers of the four banks of switch 604 to terminal #2.

(c) *First station selection pulse.*—Upon the receipt of the first station selection pulse, line relay 500 reoperates and at its contacts 501 recompletes the above-described energizing circuit for step magnet 608.

Upon the termination of the first station selection pulse, line relay 500 restores and at its contacts 501 interrupts the energizing circuit for step magnet 608 and receiving control relay 510, and at its contacts 502 prepares a point in the operating circuit for sending relay 580.

Step magnet 608 restores and advances the wipers of the four banks of switch 604 to terminal #3. At this time, wipers 630 and 640 of the "code stop" bank and "code start" bank respectively are arranged to become effective and as the wipers advance individually to terminal #3 of each bank, points are prepared in an energizing circuit for sending relay 580.

After an interval determined by its slow-to-release characteristics, receiving control relay 510 restores and at its contacts 511 further interrupts its own energizing circuit and the energizing circuit for step magnet 608, and at its contacts 513 completes an energizing circuit for sending relay 580 which extends from negative battery, over the winding of relay 580, contacts 513, conductor 568, contacts 724, contacts 734, conductor 676, wiper 680 and terminal #1 of manual switch 611, terminal #3 and wiper 640 of the "code start" bank of switch 604, wiper 630 and terminal #3 of the "code stop" bank of switch 604, terminal #1 and wiper 670 of manual switch 611, conductor 566, contacts 512, contacts 534, contacts 524, contacts 543, and contacts 502 to ground.

3. STATION CHECK PULSES

It will be recalled that upon the termination of the substation selection pulses, the selected substation is conditioned to transmit to the control station sufficient station check pulses to advance the wipers of the thirty-point switches at the control station and the substation to terminal #14. In the case where substation #1 is selected, eleven additional station check pulses are transmitted. Where substation #5, for example, is selected, the substation equipment transmits seven additional pulses over the line conductors to advance the wipers of the thirty-point switch 302 to terminal #14. In like manner the number of station check pulses may be easily calculated for the case of any other selected substation. Stated in another manner the total value of the impulses transmitted and the impulses returned in the station selection operation is a fixed value independent of the station selected. In the embodiment illustrated, the fixed value is fourteen.

In order to condition the equipment at the selected substation to transmit the appropriate number of station check pulses to advance the wipers of the thirty-point switches at the control and selected substations to terminal #14, the wiper 670 of the bank of the ten point manual switch 611 associated with the "code stop" bank of the thirty-point switch 604 is made adjustable in discrete steps to selectively connect the terminals 3–12 of the associated "code stop" bank into the operating circuit of sending relay 580, for completing such start circuits at the selected substation. Additionally the slip ring 677 of manual switch 611 is manually stepped simultaneously with the stepping of wiper 670 so that all terminals of switch 611 except that terminal to which wiper 670 is stepped and the associated terminals of the code stop bank are connected in a circuit for sending relay 580 to keep sending relay 580 pulsing to apply the complementary number of station check pulses to line conductors 485 and 486.

For example, at substation #2, the wiper 670 of the bank of the manual switch 611 associated with the "code stop" bank of switch 604 is stepped to terminal #2 thereof to complete circuits to terminals #4 of the "code stop" bank of switch 604. The metallic slip ring 677 of the bank of switch 611 associated with the "code stop" bank of switch 604 is stepped to terminal #3 and connects to conductor 565 all the terminals #3–#10 of that bank of the manual switch 611 and the respectively associated terminals #5–#12 of the associated "code stop" bank of switch 604 to complete the "keep pulsing" circuit which operates sending relay 580 in transmitting station check pulses necessary to advance the wipers of the rotary switches to terminal #14.

The wipers 650 and 680 of the two remaining banks of manual switch 611 are mechanically coupled to a shaft common to wiper 670 and slip ring 677 to step in unison therewith to terminals #2 of their respective banks. In this way circuits are completed over terminals #2 of the manual switch 611 and terminals #4 of the "code start" and "stepping" banks of switch 604 to determine the position of this substation in the series of substations available to the control station. The simple manual operation of the switch 611 and the completion of the circuits determinative and individual to a given substation thereby permit the interchange of substation equipment without costly and time consuming strapping and soldering operations for adapting the substation to assume any position in the system of the ten positions of substation accessible to the control station.

(a) *First station check pulse.*—With the advancement of the wipers of the substation thirty-point switch to terminal #3, at substation #1, the above-described energizing circuit for sending relay 580 was completed. Sending relay 580 operates, and at its contacts 581 and 583 applies ground and negative battery to line conductors 485 and 486, and completes a parallel operating circuit for line relays 407 and 500 and at its contacts 584 completes an obvious energizing circuit for the auxiliary sending relay 520. The operating circuit for line relay 407 extends from negative battery, over contacts 583, line conductor 486, contacts 402, the winding of line relay 407, resistor 489, line conductor 485, and contacts 581 to ground. The energizing circuit for line relay 500 extends from negative battery, over contacts 583, over resistor 516, the winding of line relay 500, and contacts 581 to ground.

Line relay 500 operates and at its contacts 501 completes an operating circuit for the step magnet 608 extending from negative battery, over the winding of step magnet 608, conductor 563, contacts 541, conductor 560, wiper 650 and terminal #1 of the ten-point manual switch 611, terminal #3 and wiper 610 of the "stepping" bank of switch 604, conductor 569, and contacts 501 to ground, and at its contacts 502 interrupts the operating circuit for sending relay 580.

Step magnet 608 operates and prepares to advance the wipers of switch 604 to terminal #4.

Auxiliary sending relay 520 operates, and at its contacts 521 holds open the energizing circuit for receiving control relay 510, and at its contacts 522 completes an operating circuit for the outgoing code marking relay 530 extending from negative battery, over the winding of relay 530, contacts 522, and contacts 584 to ground. Auxiliary sending relay 520 is of the slow-to-release type and does not restore between pulses.

Outgoing code marking relay 530 operates and at its contacts 531 completes a holding circuit for step magnet 608 independent of the stepping bank of switch 604 and extending from negative battery, over the winding of step magnet 608, conductor 563, contacts 541, contacts 531, and contacts 501 to ground. Relay 530 is of the sleeved and slugged slow-to-release type and does not release between pulses.

It will be recalled that upon the operation of line relay 500, the operating circuit for sending relay 580 was interrupted to effect restoration of sending relay 580 after an interval determined by its slow-to-release characteristics (relay 580 being sleeved) to terminate the first station check pulse. Consequently, sending relay 580 restores, and at its contacts 581 and 583 is effective to interrupt the application of ground and negative battery to line conductors 485 and 486 to terminate the first station check pulse and release line relay 500.

Line relay 500 restores, and at its contacts 501 interrupts the holding circuit for step magnet 608, and at its contacts 502 prepares a point in the operating circuit for sending relay 580.

Step magnet 608 restores and advances the wipers of switch 604 to terminal #4.

Upon advancing to terminal #4 the wiper 630 of the "code stop" bank completes an operating circuit for sending relay 580 which extends from negative battery, over the winding of relay 580, contacts 513, contacts 525, conductor 567, wiper 630 and terminal #4 of the "code stop" bank of switch 604, terminal #2 and the conductive slip ring 677 of manual switch 611, conductor 565, contacts 543, and contacts 502 to ground.

(b) *Second station check pulse.*—Sending relay 580 reoperates, and at its contacts 581 and 583 initiates the second station selection pulse by applying ground and negative battery to line conductors 485 and 486 in the manner previously discussed to effect reoperation of line relays 407 and 500.

Line relay 500 operates, and at its contacts 501 completes the operating circuit for step magnet 608, extending from negative battery, over the winding of relay 608, conductor 563, contacts 541, contacts 511 and contacts 501 to ground, and at its contacts 502 interrupts the energizing circuit for sending relay 580.

Step magnet 608 operates and prepares itself for advancing the wipers of switch 604 to terminal #5 thereof.

Sending relay 580 releases, and at its contacts 581 and 583 interrupts the energizing circuit for line relay 500.

Line relay 500 restores, and at its contacts 501 interrupts the operating circuit for step magnet 608 which restores and advances the wiper of switch 604 to terminals #5 thereof. Line relay 500 at its contacts 502 prepares a point in the operating circuit for sending relay 580.

Upon the stepping of the wipers of switch 604 to terminal #5, wiper 630 completes an operating circuit for sending relay 580, which circuit extends from negative battery, over the winding of relay 580, contacts 513, contacts 525, conductor 567, wiper 630 and terminal #5 of the "code stop" bank of switch 604, terminal #3 and the conductive slip ring 677 of manual switch 611, conductor 565, contacts 543, and contacts 502 to ground.

(c) *Third station check pulse.*—Sending relay 580 reoperates, and at its contacts 581 and 583 initiates the third station check pulse and completes operating circuits for line relays 407 and 500 in the above discussed manner.

Line relay 500 reoperates, and at its contacts 501 recompletes the energizing circuit for step magnet 608 which operates to prepare itself for advancing the wipers of switch 604 to terminals #6 thereof. Line relay 500 at its contacts 502 interrupts the operating circuit for sending relay 580.

Sending relay 580 restores, and at its contacts 581 and 583 interrupts the energizing circuit for line relays 407 and 500 to terminate the third station check pulse.

Line relay 500 restores and at its contacts 501 interrupts the energizing circuit for step magnet 608, and at its contacts 502 prepares a point in the re-energizing circuit for sending relay 580.

Step magnet 608 restores and advances the wipers of switch 604 to terminal #6 thereof.

Upon the stepping of the wipers of switch 604 to terminal #6, the wiper 630 of the "code stop" bank completes an operating circuit for sending relay 580 extending from negative battery, over the winding of relay 580, contacts 513, contacts 525, conductor 567, wiper 630 and terminal #6 of the "code stop" bank of switch 604, terminal #4 and the conductive slip ring 677 of switch 611, conductor 565, contacts 543, and contacts 502 to ground.

(d) *Fourth through tenth station check pulse.*—Sending relay 580 reoperates to continue the cyclic operation of the substation equipment in the manner described. Alternately line relay 500 and sending relay 580 operate to produce additional station check pulses and advance the wipers of switch 604 to terminal #13 thereof with the tenth pulse. In each case the circuit for operating sending relay 580 is completed over wiper 630 of the "code stop" bank and the appropriate terminal thereof.

Upon the completion of the tenth pulse, and the restoration of line relay 500, step magnet 608 releases to advance wiper 630 of the "code stop" bank of switch 604 to terminal #13 thereof. Wiper 630 completes an operating circuit for sending relay 580 to initiate the eleventh station check pulse, which circuit extends from negative battery, over the winding of relay 580, contacts 513, contacts 525, conductor 567, wiper 630 and terminal #13 of the code stop bank, conductor 565, contacts 543, and contacts 502 to ground.

Sending relay 580 reoperates and transmits the eleventh station check pulse to re-energize line relay 500.

Line relay 500 operates, and at its contacts 501 completes the operating circuit for step magnet 608, and at its contacts 502 interrupts the energizing circuit for sending relay 580.

Step magnet 608 operates and prepares itself for advancing the wipers of switch 604 to terminal #14.

Sending relay 580 restores, and at its contacts 581 and 583 interrupts the operating circuit for line relay 500 and terminates the eleventh station check pulse, and at its contacts 584 interrupts the operating circuit for auxiliary sending relay 520 and outgoing code marking relay 530.

Line relay 500 restores and at its contacts 501 interrupts the operating circuit for step magnet 608, which releases and advances the wipers of switch 604 to terminal #14 thereof.

As there is no energizing circuit completed for sending relay 580 over the "code stop" bank or over the "code start" bank of switch 604, it does not reoperate upon the stepping of the wipers of switch 604 to terminal #14. Wiper 620 of the "control" bank of switch 604 advances to terminal #14 thereof and prepares a point in the energizing circuit for code checking relay 690.

Auxiliary sending relay 520 restores after an interval determined by its sleeved slow-to-release characteristics and at its contacts 524 prepares a point in the operating circuit for code checking relay 690.

Outgoing code marking relay 530 releases after a succeeding interval established by its sleeve and slugged slow-to-release characteristics, and at its contacts 534 completes an operating circuit for the code checking relay 690, which circuit extends from negative battery, over the winding of code checking relay 690, terminal #14, and wiper 620 of the "control" bank of switch 604, conductor 566, contacts 512, contacts 534, contacts 524, contacts 543 and contacts 502 to ground.

Code checking relay 690 operates; at its contacts 693 completes its own locking circuit extending from negative battery, over the winding of relay 690, contacts 693, and contacts 602 to ground; and at its contacts 692 prepares a point in the pulsing circuit over terminals #15–#19 of the "code stop" bank of switch 604.

C. *Selection of and station check pulses from substations other than substation #1*

For convenience of explaining the manner of selection of substations other than substation #1, consideration will be given to substation #2, which differs from the illustrated substation in that the ten-point manual switch 611 thereat is preset at position 2 (whereby the wipers are advanced one step clockwise from that illustrated in Figure 6). Thus wipers 650, 670 and 680 are connected to terminal #2 of their respective banks, and slip ring 677 of the bank of switch 611 associated with the "code stop" bank of switch 604 being rotated clockwise one step, electrically connects together terminals 1 and 3–10 of this bank.

1. OPERATION AT CONTROL STATION

Referring now to the operation at the control station the attendant depresses the station selection key (not shown) associated with substation #2. The control station equipment is energized to transmit two transient protection pulses and two substation selection pulses. The transmission of the two transient protection pulses in the case of the selection of substation #2 is identical to that of substation #1. In the previous example given with respect to substation #1, it will be recalled that since the contacts 247 of selection key 248a were open upon its depression, only one station selection pulse was transmitted in that sending relay 400 was not re-energized thereafter, thus terminating the number of station selection pulses. Inasmuch as selection key 248a is not depressed when substation #2 is desired, an additional or second station selection pulse is generated by the subsequent operation of sending relay 400 over the path extending from negative battery, over the winding of relay 400, contacts 460, contacts 423, conductor 394, wiper 350 and terminal #3 of the "code control" bank of switch 302, conductor 255, contacts 247, conductor 257, contacts 418 and contacts 409 to ground.

Sending relay 400 operates, and at its contacts 401 and 403 applies ground and negative battery to line conductors 485 and 486 to initiate the second station selection pulse and operate line relays 407 and 500 in the manner described.

Line relay 407 operates and at its contacts 409 interrupts the energizing circuit for sending relay 400 and at its contacts 408 completes an energizing circuit for step magnet 380 which operates and prepares to advance the wipers of switch 302 to terminal #4.

Sending relay 400 restores, and at its contacts 401 and 403 interrupts the application of negative battery and ground to line conductors 485 and 486 to terminate the second station selection pulse and interrupt the energizing circuit for line relay 407.

Line relay 407 restores, and at its contacts 408 interrupts the operating circuit for step magnet 380 which upon its release advances the wipers of switch 302 to terminal #4. Line relay 407 at its contacts 409 prepares a point in the energizing circuit for sending relay 400.

Inasmuch as the selection key for substation #2 has been depressed, its contacts (not shown) are open and a re-energizing circuit for sending relay 400 is not established.

A similar analysis will show that station selection pulses necessary to select any other substation are generated in an analogous manner and that the number of station selection pulses so generated correspond to the number of the desired substation. The selection key corresponding to the desired substation is depressed and at its open contacts interrupts an energizing circuit for the sending relay to terminate the station selection code after the appropriate number of station selection pulses have been transmitted.

2. OPERATION AT SUBSTATION

Referring now to the concurrent operation of the equipment at substation #2, the operation of line relay 500 in response to the receipt of the additional substation selection pulse advances the wipers of switch 604 to terminal #4.

When the equipment of substation #2 responds and transmits station check pulses, the number of such pulses will be one less than the number transmitted by substation #1 in order to advance the wipers of switch 604 to terminal #14. Likewise the number of station check pulses transmitted by any other substation will be fourteen minus the sum of the number of station selection pulses transmitted by the control station and the two transient protection pulses. (14—(number of station selection pulses+2)). In the case of substation #2, therefore, ten station check pulses are transmitted by the substation equipment.

D. *Lockout of other substations*

It is necessary to lockout all the substations except the substation which is reporting a change in the condition of its controlled or monitored device, or the substation which is being selected by the dispatcher at the control office. Unless this is done, operation of the controlled device may take place at an undesirable point in the system and may seriously disrupt the complete supervisory system.

To understand the nature of the lockout feature, it will be recalled that the position of the manually settable switch at each substation identifies the number of the substation, and establishes circuit conditions which differentiate it from every other substation. In particular the wiper of each bank of the manual switch is connected to a different terminal thereof for each substation. For example, wiper 650 of the bank of the manual switch 611 associated with the "stepping" bank of switch 604 is connected to terminal #1 of that bank of the manual switch at substation #1. Further the wipers of the banks of the manual switch at substation #2 are connected to terminal #2 thereof. This is likewise true for every other wiper and its associated bank. This same plan follows throughout the remainder of the substations with substation #10 having the wipers of the manual switch set on terminal #10.

There are two possible relationships which any one substation may have with the selected substation. First it may have a lower numerical designation in which case the wipers of its manual switch are connected to lower numbered terminals than are the wipers of the selected substation. Conversely the non-selected substation may have a higher numerical designation in which case the wipers of its manual switch are connected to higher numbered terminals than are the wipers of the selected substation.

For purposes of illustrating the lockout feature of the present invention, substations #1 and #2 will be assumed to be the only substations involved. Although any other substation may be so considered, the discussion of the lockout feature with respect to the two selected substations reveals the manner in which any other substation not selected will be locked out.

Let it first be assumed that substation #1 is to be selected or is reporting and that substation #2 is to be locked out.

The line relay of substation #2 pulses in response to the two transient protection pulses and the one station selection pulse transmitted over the line conductors by either the control station or substation #1. In response thereto, the receiving control relay 510 operates and remains operated during pulsing and does not release until the end of this first series of pulses. Additionally, the stepping magnet of substation #2 advances the wipers of its thirty-point switch to terminal #3. Inasmuch as terminal #3 of each bank of the thirty-point switch at substation #2 is connected to an open circuit at terminal #1 of the manually operative switch, no operating circuit can be found for the sending relay 580 of substation #2 and there is no advancing of the wipers by the stepping magnet.

On further pulsing of the line relay at each non-selected substation in response to station selection check pulses, no energizing circuits for the step magnet and relay 510 are completed inasmuch as open circuits for relay 510 and the switch magnet 608 will be encountered as follows: negative battery, winding of relay 510, contacts 521, 532, conductor 560, wiper 650 and terminals of the stepping bank for substation #2 for example, to open circuit; negative battery, contacts 541, conductor 560, wiper 650 and terminal #4 of the stepping bank for substation #2 for example, to open circuit. The thirty-point switch is, therefore, insensitive to further pulsing of the line relay at each non-selected substation, such as substation #2, and this substation is, therefore, locked out until a reset signal is applied thereto.

If, on the other hand, the selected substation was substation #2 and the locked out substation was substation #1, then the wipers of the thirty-point rotary switch at substation #1 are advanced to terminal #4 thereof in response to the two transient protection pulses and the two station selection pulses on the line. Inasmuch as the wiper of the manual switch is connected to terminal #1 thereof and this terminal is wired directly to terminal #3 of the thirty-point switch at substation #1, the wipers at this substation are on an open circuit when they arrive at terminal #4 thereof. As a result of this open circuit condition, no operating circuit will be found for the sending relay at substation #1 and there will be no further advancement of the wipers of the thirty-point switch thereat.

In addition, when further pulsing continues to reoperate the line relay at substation #1, no reoperating circuit for the step magnet is completed and the thirty-point switch is not operative in response to further pulses appearing on the line. Thus substation #1 is effectively locked out upon the selection of substation #2.

In summary, the non-selected substations are effectively locked out of the system and are unresponsive to further impulses until reset because the wipers of the manual switches at these substations are not set to complete an energizing circuit for the stepping magnet or the sending relay upon the completion of the station selection code. The circuits which operate relay 510 and switch magnet 608 are interrupted at the "stepping" bank of switch 604 and hence the switch magnet 608 and relay 510 are non-responsive to impulses on the line. Additionally, the start circuit of sending relay 580 is interrupted at the "code start" bank of switch 604 to prevent sending relay 580 from operating at the non-selected substation. However, the line relay at each non-selected substation follows the subsequent pulses on the line conductors to hold the reset control relay operated until the long reset signal is received from the control station. Accordingly, the selecting circuit, the control circuit and the supervisory circuit are held in abeyance until the receipt of the long reset pulse restores them to their non-locked out condition.

E. *Concurrent operation at the control station*

Referring now to the control station equipment illustrated in Figures 2-4, it will be recalled that line relay 407 operated in response to the receipt of the first station check pulse from substation #1.

Line relay 407 operates and at its contacts 408 is effective to complete an operating circuit for receiving control relay 420 which circuit extends from negative battery, over the winding of relay 420, contacts 417, contacts 412, and contacts 408 to ground.

Receiving control relay 420 operates, and at its contacts 421 completes an obvious energizing circuit for auxiliary test relay 425. Inasmuch as receiving control relay 420 is of the slow-to-release type it remains operated during the remainder of the station check pulses, and at its contacts 421 holds auxiliary test relay 425 operated.

Line relay 407 operates and releases in response to the individual station check pulses, and at its contacts 408 completes and interrupts energizing circuit 380' for switch magnet 380 eleven times in response to the eleven station check pulses. Step magnet 380, in response to the eleven station check pulses, advances the wipers of switch 302 to terminal #14 from terminal #3 (its position after the completion of the transient protection pulses and the single station selection pulse). Upon the advancement of wiper 360 of the "hold" bank of switch 302 to terminal #14, it is effective at this terminal to complete a holding circuit for the auxiliary test relay 425, extending from negative battery, over the winding of relay 425, contacts 426, conductor 396, wiper 360 and terminal #14 of the "hold" bank of switch 302, conductor 376 and contacts 431 to ground. Auxiliary test relay 425 holds, and at its contacts 428 prepares a point in the operating circuit for the station selection code stop relay 430.

Upon the receipt of the open period following the last station check pulse, line relay 407 restores, and at its contacts 408 interrupts the operating circuit for the receiving control relay 420 which restores after an interval determined by its slow-to-release characteristics, resulting from its slugged and sleeved condition.

Receiving control relay 420 is effective at its contacts 421 to interrupt the original energizing circuit for the auxiliary test relay 425, and at its contacts 422 to complete the operating circuit for the station selection code stop relay 430, which circuit extends from negative battery, over the winding of relay 430, contacts 437, conductor 399, terminal #14 and wiper 340 of the "station selection" bank of switch 302, conductor 395, contacts 428 and contacts 422 to ground.

Station selection code stop relay 430 operates, and at its contacts 431 interrupts the holding circuit for auxiliary test relay 425 which restores; at its contacts 432 locks itself to ground, and at its contacts 424 completes an energizing circuit for the white station selection lamp 242 associated with the escutcheon of substation #1. It will be recalled that the first substation selection relay 230a was operated earlier as a result of the depression of key 248a associated with the first station to prepare a circuit for the indicating lamp. Such circuit is accomplished at this time by the code stop relay 430, the circuits extending from negative battery, over the filament of lamp 242, contacts 235, conductor 267, contacts 424, conductor 397, and resistor 325 to ground.

Lamp 242 lights and indicates to the dispatcher at the control station that substation #1 has been selected and is prepared for further pulsing in accordance with the desired operation. The dispatcher releases selection key 248a and the system rests with the wipers of the thirty-point switches 302 and 604 at the control and substation respectively engaging terminals #14. The other substations #2-#10 are locked out and the wipers of their thirty-point switches rest on terminals #3.

F. Reset as result of incorrect stopping of rotary switch

If for any reason the rotary switch 302 of the control station had not advanced to terminal #14, but had stopped on one of the terminals #4–#12, the wiper 340 of the "selection" bank will not complete an operating circuit for the station selection code stop relay 430. It will be recalled that in the previous case, station selection code stop relay 430 operated over a circuit including terminal #14 of the "selection" bank and in this case such terminal is not reached to complete this circuit. Also, upon the release of the receiving control relay 420, no holding circuit exists for relay 425 which at its contacts 428 withholds operating ground from the energizing circuit for relay 430. In this case, the system would have stalled and selection lamp 242 would not have lighted. In order to restore the equipment to its normal operating condition if the system had stalled in this manner the manual reset key 305 must be depressed by the dispatcher.

In addition had the wipers of switch 302 overstepped or understepped terminal #14 by one pulse, thus advancing the wiper to either terminal #13 or #15, the auxiliary test relay 425 would have been held operated over a circuit extending from negative battery, over the winding of relay 425, conductor 396, the wiper 360 of the "hold" bank of switch 302 and to ground over either terminals #13 or #15 thereof.

The auxiliary test relay 425 in its operated condition, at its contacts 428 prepares a point in the operating circuit for reset control relay 455, and since it is held operated, it is apparent that this reset circuit is always prepared for operation via these terminals.

As receiving control relay 420 releases after an interval determined by its slow-to-release characteristics following the last station check pulse, it is effective at its contacts 422 to complete the prepared circuit for reset control relay 455 extending from negative battery, over the winding of relay 455, contacts 456, conductor 392, terminals #13 or #15 and wiper 340 of the "selection" bank of switch 302, conductor 395, contacts 428 and contacts 422 to ground.

Reset control relay 455 operates and in a manner to be described in greater detail hereinafter restores the equipment at the control station and at all the substations to its normal condition.

In reviewing the condition of the equipment at the control station and substation #1, it will be recalled that if the proper substation had been seized the wipers of the thirty-point rotary switch at the selected substation and control station rest on terminal #14. At the control station the white selection lamp 242 associated with substation #1 is lighted, and the non-locking selection key has been released.

G. Operation to close a circuit breaker at substation #1

1. CLOSE CONTROL PULSES

To effect closure of the circuit breaker 709 at substation #1, the dispatcher depresses the non-locking close key 311 at the control station and holds it depressed until the red (closed) lamp lights and the green (trip) lamp extinguishes, indicating the performance of the closing operation. The control station equipment is effective to transmit five close control pulses to advance the wipers of the thirty-point switches 302 and 604 at the control station and the selected substation to terminal #19. The operation of the equipment at the control station will be first described followed by an explanation of the operation concurrently effected at the selected substation.

(a) *First close control pulse.*—Upon depression of the close key 311 by the dispatcher it is effective at its contacts 312 to complete an energizing circuit for sending relay 400, which circuit extends from negative battery, over the winding of the sending relay 400, contacts 460, contacts 423, conductor 394, wiper 350 and terminal #14 of the "code control" bank of switch 302, contacts 312, conductor 390, contacts 433, contacts 440, and contacts 409 to ground.

Sending relay 400 operates, and at its contacts 401 and 403 applies ground and negative battery to line conductors 485 and 486 to initiate the first close control pulse and at its contacts 404 completes an obvious operating circuit for the outgoing code marking relay 415.

Outgoing code marking relay 415 operates, and at its contacts 418 prepares a point in the reoperating circuit of sending relay 400.

The line relays at the control station and at all the substations operate in response to the initiation of the first close control pulse. Control station line relay 407 operates, and at its contacts 409 interrupts the operating circuit for sending relay 400, and at its contacts 408 completes the stepping magnet operating circuit 380' which prepares itself to advance the wipers of switch 302 to terminal #15.

Sending relay 400 releases, and at its contacts 401 and 403 interrupts the energizing circuit for line relay 407.

Line relay 407 restores, and at its contacts 408 interrupts the operating circuit for step magnet 380 which advances the wipers of switch 302 to terminal #15, and at its contacts 409 completes a reoperating circuit for sending relay 400 extending from negative battery, over the winding of relay 400, contacts 460, contacts 423, conductor 394, wiper 350 and terminal #15 of the "code control" bank, conductor 371, contacts 461, contacts 441, contacts 418 and contacts 409 to ground.

(b) *Second close control pulse.*—Sending relay 400 operates and initiates the second close control pulse. Line relay 407 operates in response to the second close control pulse and operates stepping magnet 380 and interrupts the operating circuit for sending relay 400.

Sending relay 400 restores, and at its contacts 401 and 403 interrupts the energizing circuit for line relay 407 and terminates the second close control pulse. Line relay 407 releases, and at its contacts 408 interrupts the energizing circuit for step magnet 380 which restores and advances the wipers of the switch 302 to terminal #16, and at its contacts 409 completes an energizing circuit for sending relay 400 which extends from negative battery, over the winding of relay 400, contacts 460, contacts 423, conductor 394, wiper 350 and terminal #16 of the "code control" bank of switch 302, contacts 316, contacts 313, conductor 371, contacts 461, contacts 441, contacts 418 and contacts 409 to ground.

(c) *Third close control pulse.*—Sending relay 400 operates to initiate the third close control pulse and line relay 407 operates in response thereto to energize stepping magnet 380 and to release sending relay 400. Sending relay 400 restores and releases line relay 407 which in turn releases stepping magnet 380 to advance the wipers of the switch 302 to terminal #17. Line relay 407 at its contacts 409 is effective to complete an energizing circuit for sending relay 400 extending from negative battery, over the winding of relay 400, contacts 460, contacts 423, conductor 394, wiper 350 and terminal #17 of the "code control" bank of switch 302, the strapping to terminal #16 thereof, contacts 316, contacts 313, conductor 371, contacts 461, contacts 441, contacts 418 and contacts 409 to ground.

(d) *Fourth close control pulse.*—Sending relay 400 reoperates and initiates the fourth close control pulse. Line relay 407 operates in response thereto to energize step magnet 380 and release sending relay 400.

Sending relay 400 restores to release line relay 407 which at its contacts 409 prepares a point in the operating circuit for sending relay 400 and at its contacts 408 interrupts the energizing circuit for step magnet 380 which releases and steps the wipers of switch 302 to terminal #18.

Upon reaching terminal #18, the wiper 350 of the

"code control" bank of switch 302 completes a reoperating circuit for sending relay 400 which circuit extends from negative battery, over the winding of relay 400, contacts 460, contacts 423, conductor 394, wiper 350 and terminal #18 of the "code control" bank of switch 302, contacts 313, conductor 371, contacts 461, contacts 441, contacts 418, and contacts 409 to ground.

(e) *Fifth close control pulse.*—Sending relay 400 operates and initiates the fifth close control pulse to energize line relay 407 which in turn completes an operating circuit for step magnet 380 and interrupts the energizing circuit for sending relay 400.

Sending relay 400 restores, and terminates the fifth close control pulse which action releases line relay 407 and stepping magnet 380. Stepping magnet 380 restores and advances the wipers of switch 302 to terminal #19. Inasmuch as terminal #19 of the "code control" bank of switch 302 is terminated in an open circuit, there is no reoperating circuit completed for sending relay 400 and it remains in its unoperated condition.

Sending relay 400 in its restored condition is effective at its contacts 404 to interrupt the energizing circuit for the sleeved and slugged outgoing code marking relay 415 which releases after an interval determined by its slow-to-release characteristics to terminate the outgoing code marking condition. The control station has at this point transmitted five control impulses to the selected substation #1 and is in an off-normal condition awaiting the receipt of check signals from the substation.

2. CONCURRENT OPERATION AT THE SELECTED SUBSTATION

Concurrently with the advancing of the wipers of switch 302 at the control station to terminals #19, the wipers of switch 604 at the selected substation are advanced to terminals #19 thereof.

Specifically, at substation #1, line relay 500 pulses in response to the five close control pulses applied to line conductors 485 and 486 by sending relay 400 of the control station. Line relay 500 at its contacts 501 is effective to operate the receiving control relay 510 which because of its slow-to-release characteristic remains operated during the pulsing period and to complete an energizing circuit for switch magnet 608 which extends from negative battery, over the winding of relay 608, conductor 563, contacts 541, conductor 560, terminal #30 of the stepping bank of switch 604, the strapping connected therewith, wiper 610 thereof, conductor 569 and contacts 501 to ground.

Receiving control relay 510 operates and at its contacts 511 is effective to complete a parallel energizing circuit for itself and step magnet 608 which step magnet in response to the opening and closing of contacts 501 operates and restores to advance the wipers of switch 604 to terminal #19.

Upon the cessation of the fifth close control pulse, receiving control relay 510 releases, after an interval determined by its slow-to-release characteristics, and at its contacts 513 prepares a point in the energizing circuit for sending relay 580, and at its contacts 512 completes an energizing circuit for the close coil 750 associated with circuit breaker 709, which circuit extends from negative battery, over the winding of close coil 750, 685, terminal #19 and wiper 620 of the control bank associated with switch 604, conductor 566, contacts 512, contacts 534, contacts 524, contacts 543, and contacts 502 to ground.

Close coil 750 is energized, and causes closure of the power contacts (not shown) of the controlled circuit breaker 709 of substation #1, and at its contacts 760 completes an obvious operating circuit for the controlled device indication relay 700.

The circuit breaker 709 closes its power contacts to effect the desired change in the operating condition of the generator or electrical load distribution system.

Controlled device indication relay 700 operates and at its contacts 701 prepares a point in its holding circuit; at its contacts 703 interrupts the obvious energizing circuit for the lower winding of the controlled device change of indication relay 720, and at its contacts 707 completes an energizing circuit for sending relay 580, which circuit extends from negative battery, over the winding of relay 580, contacts 513, conductor 568, conductor 687, contacts 707, conductor 674, terminal #19 and wiper 640 of the "code start" bank of switch 604, wiper 630 and terminal #19 of the "code stop" bank of switch 604, contacts 692, conductor 565, contacts 543, and contacts 502 to ground.

Controlled device change of indication relay 720 releases, and at its contacts 721 completes the holding circuit for controlled device indication relay 700 which circuit extends from negative battery, over the winding of relay 700, make-before-break contacts 721, resistor 726 and contacts 701 to ground, and at its contacts 723 further interrupts its own holding circuit.

3. CLOSE SUPERVISION (a) *First close supervision pulse.*—The selected substation transmits sufficient supervision pulses to inform the equipment at the control station that the desired operation has been performed by the equipment at the substation. In this case two close supervision pulses are sent by the substation to advance the wipers of the thirty-point switches to terminal #21, whereat a circuit is completed at the control station to light a lamp indicative of the performed operation.

Sending relay 580 operates and at its contacts 584 completes an obvious operating circuit for the auxiliary sending relay 520 and at its contacts 581 and 583 applies ground and negative battery to line conductors 485 and 486 to initiate the first close supervision pulse and energize line relay 500.

Auxiliary sending relay 520 operates and at its contacts 522 completes an operating circuit for the outgoing code marking relay 530.

Line relay 500 operates and at its contacts 502 interrupts the operating circuit for the close coil 750 of circuit breaker 709, which, however, remains in its closed condition by mechanical means (not shown) and also interrupts the operating circuit for sending relay 580. Line relay 500 at its contacts 501 completes the energizing circuit for step magnet 608 which operates and prepares to advance the wipers of switch 604 to terminal #20.

Sending relay 580 releases and at its contacts 581 and 583 interrupts the circuit for the first close supervision pulse and effects the release of line relay 500.

Line relay 500 restores and at its contacts 501 interrupts the operating circuit for step magnet 608, which restores and advances the wipers of switch 604 to terminal #20, and at its contacts 502 prepares a point in the operating circuit for sending relay 580.

Inasmuch as the controlled device indication relay 700 is operated as a result of the closure of contacts 760, it is effective at its contacts 706 to prepare a point in the energizing circuit for sending relay 580.

(b) *Second close supervision pulse.*—Upon the arrival of wiper 630 of the "code stop" bank at terminal #20, it is effective thereat to complete an energizing circuit for sending relay 580 which extends from negative battery, over the winding of relay 580, contacts 513, contacts 525, conductor 567, wiper 630 and terminal #20 of the "code stop" bank of switch 604, conductor 671, contacts 706, conductor 688, conductor 565, contacts 543, and contacts 502 to ground.

Sending relay 580 operates and at its contacts 581 and 583 connects ground and negative battery to line conductors 485 and 486, initiating the second close supervision pulse and completing an operating circuit for line relay 500.

Line relay 500 operates and completes the energizing circuit for step magnet 608 and interrupts the energizing circuit for sending relay 580.

Sending relay 580 releases and terminates the second close supervision pulse which releases line relay 500.

Line relay 500 restores and at its contacts 501 interrupts the operating circuit for step magnet 608 which restores to advance the wipers of switch 604 to terminal #21.

From the foregoing discussion it may be seen that the operating circuit for sending relay 580 is completed over terminals of the "code stop" bank of switch 604. As terminal #21 of this bank is open, sending relay 580 is not re-energized upon the advancement of the wipers of switch 604 thereto and remains in its unoperated position until pulses are received from the control station.

Upon the release of sending relay 580, it is effective at its contacts 584 to interrupt the operating circuit for the auxiliary sending relay 520 and the outgoing code marking relay 530.

The auxiliary sending relay 520 and the outgoing code marking relay 530 release in that order as the restoration time for relay 530 is set to be greater than the restoration time for relay 520.

The sending condition for substation #1 is thus terminated.

4. CONCURRENT OPERATION AT THE CONTROL STATION

At the control station, line relay 407 follows the close supervision pulses transmitted from the substation, and by closing and interrupting the stepping magnet operating circuit 380' controls stepping magnet 380 to advance the wipers of switch 302 to terminal #21.

Briefly, line relay 407 operates in response to the receipt of the first close supervision pulse, and at its contacts 408 completes an energizing circuit for the receiving control relay 420, which circuit extends from negative battery, over the winding of relay 420, contacts 412, contacts 408 to ground.

Receiving control relay 420 operates and at its contacts 421 completes an obvious operating circuit for the auxiliary test relay 425. Auxiliary test relay 425 operates, and at its contacts 426 prepares a point in its own holding circuit.

Upon the advancement of the wipers of switch 302 to terminal #21 in response to the operation of step magnet 380, wiper 360 of the "hold" bank of switch 302 completes at terminal #21 thereof a holding circuit for the auxiliary test relay 425, which circuit extends from negative battery, over the winding of relay 425, contacts 426, conductor 396, wiper 360 and terminal #21 of the "hold" bank of switch 302, conductor 274, contacts 221, and contacts 233 to ground.

When line relay 407 releases at the end of the second close supervision pulse received at the control station, it is effective at its contacts 408 to interrupt the operating circuit for the receiving control relay 420.

Receiving control relay 420 releases and at its contacts 421 interrupts the original energizing circuit for the auxiliary test relay 425, which, however, holds over the above described holding circuit. Receiving control relay 420 at its contacts 422 completes an energizing circuit for the indication control relay 470, which circuit extends from negative battery, over the winding of relay 470, conductor 374, terminal #21 and wiper 340 of the "selection" bank of switch 302, conductor 395, contacts 428, and contacts 422 to ground.

Indication control relay 470 operates, and at its contacts 484 interrupts the energizing circuit for the indication control relay 480, and at its contacts 471 prepares a point in the operating circuit for controlled device indication relay 220a associated with substation #1.

Slugged and sleeved indication control 480 restores after an interval determined by its slow-to-release characteristics, and at its contacts 483 completes an operating circuit for the controlled device indicating relay 220a, which circuit extends from ground, over the winding of relay 220a, contacts 228, conductor 264, contacts 471, contacts 483, conductor 377, wiper 370 and terminal #21 of the "indication" bank of switch 302, and resistor 326 to negative battery.

The controlled device indicating relay 220a operates and at its contacts 226 completes its own holding circuit, at its contacts 221 interrupts the holding circuit for the auxiliary test relay 425; at its contacts 224 interrupts the operating circuit for the green (tripped) lamp 243, and at its contacts 225 completes an operating circuit for the red (closed) lamp 244, which circuit extends from negative battery, over resistor 207, the filament of lamp 244, contacts 225, contacts 216, and conductor 272 to ground.

As a result of the operation of the controlled device indicating relay 220a, the green (tripped) lamp is extinguished and the red (closed) lamp 244 is lighted. This latter change of indication informs the dispatcher that the desired operation of closing the circuit breaker at substation #1 has been properly executed.

Upon the restoration of the auxiliary test relay 425, it is effective at its contacts 428 to interrupt the operating circuit for indication control relay 470, and at its contacts 423 to complete an energizing circuit for sending relay 400, which circuit extends from negative battery, over the winding of relay 400, contacts 460, contacts 423, conductor 394, wiper 350 and terminal #21 of the "code control" bank of switch 302, conductor 398, contacts 440, and contacts 409 to ground.

Indication control relay 470 restores and at its contacts 484 recompletes the energizing circuit for indication control relay 480 which operates.

5. CLOSED SUPERVISION CHECK

Continuing now with the operation of the supervisory control system at the control station following the completion of the closing of the circuit breaker and the verification thereof, it will be recalled that sending relay 400 operates, and at its contacts 401 and 403 applies ground and negative battery to line conductors 485 and 486 to initiate the first close supervision check pulse, and at its contacts 404 completes an obvious energizing circuit for the outgoing code marking relay 415.

Line relay 407 operates in the manner previously described, and at its contacts 408 completes the above described energizing circuit 380' for step magnet 380, and at its contacts 409 interrupts the energizing circuit for sending relay 400. Step magnet 380 operates, and prepares itself to advance the wipers of switch 302 to terminal #22.

Sending relay 400 releases after an interval determined by its slow-to-release characteristics, and at its contacts 401 and 403 interrupts the application of ground and negative battery to line terminals 485 and 486, this terminating the first close supervision check pulse and interrupting the operating circuit for line relay 407.

Line relay 407 restores and at its contacts 408 interrupts the energizing circuit for step magnet 380, which restores and advances the wipers of the four banks of switch 302 to terminal #22. Line relay 407 at its contacts 409 prepares a point in the operating circuit for sending relay 400, which circuit however is held open at contacts 223 of the controlled device indicating relay 220.

On the other hand, had the circuit breaker at the substation been tripped instead of closed then the controlled device indication relay 220 would have been released instead of operated and at its contacts 223 would complete the re-energizing path for sending relay 400. Upon such circuit completion, sending relay 400 would have operated and by the application of an additional pulse to line conductors 485 and 486 have advanced the wipers of switch 302 another step to terminal #23, the trip supervision check terminal. Upon its release the controlled device indication relay 220 would have completed an energizing circuit for the green (tripped) lamp which would have illuminated instead of the red (closed) lamp. Thus the wipers of the thirty-point switches are advanced to the appropriate terminals as the operating and checking signals are transmitted over the line conductors in response to the operating conditions of the system.

Returning now to the condition whereat the last closed supervision check pulse has been transmitted, sending relay 400 does not reoperate and at its contacts 404 interrupts the energizing circuit for the outgoing code marking relay 415 which after an interval determined by its slow-to-release characteristics releases, thus terminating the outgoing code condition.

6. CONCURRENT OPERATION THE SELECTED SUBSTATION

Referring now to the illustrated substation, upon the initiation of the first close supervision pulse, line relay 500 operates in response thereto and at its contacts 501 completes an energizing circuit for stepping magnet 608, and completes the previously described energizing circuit for the receiving control relay 510, which operates to place the substation in the signal receiving condition.

At the end of the first close supervision pulse, line relay 500 restores in the manner previously discussed, and at its contacts 501 interrupts the energizing circuit for step magnet 608 and receiving control relay 510, and at its contacts 502 prepares a point in the operating circuit for sending relay 580 in preparation for the transmission of the first normal supervision pulse. As will be explained in greater detail hereafter, the selected substation transmits supervision pulses indicative of the condition of the monitored device following the receipt of the close supervision check pulses from the control station. Stepping magnet 608 releases and advances the wipers of switch 604 to terminal #22.

Wipers 630 and 640 of the "code stop" and "code start" banks of switch 604 at terminal #22 prepare points in the operating circuit for sending relay 580.

Receiving control relay 510 restores and at its contacts 513 completes an energizing circuit for sending relay 580, which circuit extends from negative battery over the winding of relay 580, contacts 513, conductor 568, terminal #22 and wiper 640 of the "code start" bank of switch 604, wiper 630 and terminal #22 of the "code stop" bank of switch 604, conductor 565, contacts 543, and contacts 502 to ground.

(a) *Normal supervision.*—If it be assumed that the monitored device 717 at substation #1 is in its normal condtition, the monitored device indication relay 710 is not operated due to the open contacts 770 and three normal supervision pulses must be transmitted by the substation to advance the wipers of the switches at the control station and the selected substation to terminal #25 (the normal supervision terminal which indicates a normal condition for the monitored device).

The release of relay 510 reoperates relay 720 over the following circuit: negative battery, the uper winding of relay 720, contacts 702, 704, conductor 684, terminal #22 and wiper 620 of the code control bank, conductor 566, contacts 512, 534, 524, 543, and 502 to ground.

1. FIRST NORMAL SUPERVISION PULSE

Sending relay 580 operates and at its contacts 581 and 583 applies ground and negative battery to line conductors 485 and 486 to initiate the transmission of the first normal supervision pulse and at its contacts 584 completes an obvious operating circuit for the auxiliary sending relay 520. Auxiliary sending relay 520 operates and at its contacts 522 completes an operating circuit for the outgoing code marking relay 530 which circuit extends from negative battery, over the winding of relay 530, over contacts 522, and contacts 584 to ground.

Outgoing code marking relay 530 operates and at its contacts 531 prepares a point in the operating circuit for the stepping magnet 608.

Line relay 500 operates in response to the receipt of the first normal supervision pulse and at its contacts 501 completes the energizing circuit for the step magnet 608, and at its contacts 502 interrupts the operating circuit for sending relay 580.

Sending relay 580 releases and at its contacts 581 and 583 interrupts the application of negative battery and ground to line conductors 485 and 486, thus terminating the first normal supervision pulse.

As a result of the termination of this pulse, line relay 500 releases, and at its contacts 501 interrupts the operating circuit for step magnet 608, and at its contacts 502 prepares a point in the energizing circuit for sending relay 580.

Step magnet 608 restores and in accordance with its nature advances the wiper of switch 604 to terminal #23. Upon the advancement of the wiper 630 of the code stop bank of switch 604 to terminal #23, it thereat completes the energizing circuit for sending relay 580, which circuit extends from negative battery, over the winding of relay 580, over contacts 513, contacts 525, over conductor 567, over wiper 630 and terminal #23 of the "code stop" bank, the strapping between terminals #23 and #22 of this bank, conductor 565, contacts 543, and contacts 502 to ground.

2. SECOND NORMAL SUPERVISION PULSE

Sending relay 580 operates and places the second normal supervision pulse on the line conductors 485 and 486 to operate line relay 500. Again line relay 500 operates to energize step magnet 608, and to interrupt the operating circuit for sending relay 580.

Sending relay 580 releases and at its contacts 581 and 583 removes ground and negative battery from line conductors 485 and 486 to terminate the second normal supervision pulse, and to interrupt the operating path for line relay 500.

Line relay 500 releases and at its contacts 501 interrupts the operating circuit for the step magnet 608 and at its contacts 502 prepares a point in the operating circuit for sending relay 580.

Stepping magnet 608 restores and advances the wipers of switch 604 to terminal #24.

Wiper 630 of the "code stop" bank of switch 604 advances to terminal #24 and thereat completes an operating circuit for sending relay 580, which circuit extends from negative battery, over the winding of relay 580, contacts 513, contacts 525, conductor 567, wiper 630 and terminal #24 of the "code stop" bank of switch 604, strapping between terminal #24 and terminal #23, strapping between terminal #23 and terminal #22, conductor 565, contacts 543, and contacts 502 to ground.

3. THIRD NORMAL SUPERVISION PULSE

Sending relay 580 operates and in the manner previously discussed initiates a pulse on line conductors 485 and 486 which operates line relay 500. Line relay 500 is effective at its contacts 501 to complete an energizing circuit for step magnet 608 which prepares to advance the wipers of switch 604 to terminal #25. Line relay 500 at its contacts 502 is effective to interrupt the energizing circuit for sending relay 580.

Sending relay 580 restores and at its contacts 581 and 583 is effective to terminate the third normal supervision pulse and in the manner described to interrupt the operating circuit for line relay 500.

Line relay 500 restores and at its contacts 501 interrupts the energizing circuit for step magnet 608 and at its contacts 502 prepares a point in the operating circuit for sending relay 580.

Stepping relay 608 restores and advances the wipers of switch 604 to terminal #25.

It will be recalled that the monitored device is in its normal position, and that as a result monitored device indication relay 710 is not energized due to open contacts 770. Inasmuch as the wipers of the banks of switch 604 have advanced to terminal #25, the usual energizing circuit for sending relay 580 which extends over the terminal of the "code stop" bank of switch 604 will be found interrupted at contacts 716 of the monitored device indication relay 710.

In this case sending relay 580 does not reoperate and at its contacts 584 interrupts the operating circuit for the auxiliary sending relay 520 and the outgoing code marking relay 530 both of which are released, with the auxiliary sending relay 520 releasing first and relay 530 releasing an interval thereafter.

7. CONCURRENT OPERATION AT CONTROL STATION

At the control station line relay 407 operates in response to the three normal supervision pulses placed on line conductors 485 and 486 by the sending relay 580 of substation #1. Line relay 407 at contacts 408, pulses the switch magnet 380 and in accordance with the nature of switch magnet 380, it advances the wipers of the four banks of switch 302 by three steps to terminal #25.

In response to the first normal supervision pulse, line relay 407 operates and at its contacts 403 completes an operating circuit for the receiving control relay 420 which circuit extends from negative battery, over the winding of relay 420, contacts 417, contacts 412, and contacts 408 to ground.

The receiving control relay 420 operates and as it is of the slow-to-release type it does not release during the normal supervision pulses transmitted by the substation.

Receiving control relay 420 at its contacts 421 is effective to complete an energizing circuit for the auxiliary test relay 425 over an obvious circuit.

Auxiliary test relay 425 operates and at its contacts 426 attempts to complete a self holding circuit and at its contacts 428 prepares a point in the energizing circuit for the indication control relay 475.

Upon the cessation of the third normal supervision pulse, line relay 407 releases, and at its contacts 408 interrupts the energizing circuit for receiving control relay 420.

Receiving control relay 420 after an interval determined by its slow-to-release characteristics restores and at its contacts 421 interrupts the operating circuit for auxiliary test relay 425.

In the chosen example, the monitored device indication relay 200a has been assumed to be in its non-operated condition and the green (normal) lamp is lighted over a circuit extending from negative battery, over resistor 208, the filament of lamp 240, contacts 201, contacts 211, conductor 272 and thence to ground. Under these circumstances the holding circuit for the auxiliary test relay 425 is interrupted at contact 204 of the monitored device indication relay 200a.

Auxiliary test relay 425 releases and at its contacts 423 completes an energizing circuit for sending relay 400, which circuit extends from negative battery, over the winding of relay 400, contacts 460, contacts 423, conductor 394, wiper 350 and terminal #25 of the "code control" bank of switch 302, conductor 398, contacts 440, and contacts 409 to ground.

If, on the other hand, the monitored device indication relay 200a had been operated and the red (alarm) lamp had been lighted, relay 200a at its contacts 204 would have completed a holding circuit for the auxiliary test relay, which circuit extends from negative battery, over the winding of relay 425, over contacts 426, over conductor 396, over wiper 360 and terminal #25 of the "hold" bank of switch 302, over conductor 254, contacts 204, and contacts 234 to ground. Auxiliary test relay 425 is then held operated and at its contacts 428 completes an energizing circuit for indication control relay 475, which circuit extends from negative battery, over the winding of relay 475, conductor 393, terminal #25 and wiper 340 of the "selection" bank of switch 302, conductor 395, contacts 428, and contacts 422 to ground.

Indication control relay 475 operates and at its contacts 476 prepares a point in a shunting circuit for the monitored device indication relay 200a, and at its contacts 479 interrupts the operating circuits of indication control relay 480.

Indication control relay 480 releases and at its contacts 483 completes a shunting circuit for monitored device indication relay 200a, which circuit extends from ground over the winding of relay 200a, contacts 231, conductor 262, contacts 476, contacts 483, conductor 377, wiper 370 and terminal #25 of the "indication" bank of switch 302 and thence to ground. The shunting circuit by which ground is applied to both sides of monitored device indication relay 200a shunts its own holding circuit.

Monitored device indication relay 200a releases and at its contacts 201 completes an operating circuit for the green (normal) lamp and at its contacts 202 interrupts the operating circuit for the red (alarm) lamp.

As a result of whether or not the monitored device indication relay 200a had been operated prior to the advancement of the wiper of switch 302 to terminal #25, it is now released and the green (normal) lamp is lighted indicating to the dispatcher that the circuit breaker is in its normally desired condition.

Upon the release of the monitored device indication relay 200a, it is effective at its contacts 204 to interrupt the holding circuit for the auxiliary test relay 425.

Auxiliary test relay 425 releases and at its contacts 423 completes an energizing circuit for sending relay 400, which circuit extends from negative battery, over the winding of relay 400, contacts 460, contacts 423, conductor 394, wiper 350 and terminal #25 of the "code control" bank of switch 302, conductor 398, contacts 440, and contacts 409 to ground.

The foregoing description illustrates that the auxiliary test relay 425 is held operated upon disagreement between the monitored condition and the position of relay 200a.

(a) *Normal supervision check.*—(1) First Normal supervision Check Pulse: Continuing now with the operation at the control station, following restoration of the auxiliary test relay 425, sending relay 400 operates and in the manner previously described initiates a pulse on line conductors 485 and 486 which operates line relay 407. In addition sending relay 400 at its contacts 404 is effective to complete an operating circuit for the outgoing code marking relay 415 which operates to place the control station in the sending condition.

Line relay 407 operates and at its contacts 403 completes an operating circuit for step magnet 608, and at its contacts 409 interrupts the operating circuit for sending relay 400. Sending relay 400 releases and at its contacts 401 and 403 terminates the first normal supervision check pulse and interrupts the operating circuit for line relay 407.

Line relay 407 releases and at its contacts 408 interrupts the operating circuit for stepping magnet 608 which releases and advances the wipers of switch 302 to terminal #26.

Upon the stepping of the wipers of switch 302 to terminal #26, wiper 350 of the "code control" bank thereof completes an operating circuit at contacts #26 for sending relay 400, which circuit extends from negative battery, over the winding of sending relay 400, over contacts 460, contacts 423, conductor 394, wiper 350 and terminal #26 of the "code control" bank of switch 302, the strapping between terminal #26 and terminal #25, conductor 398, contacts 440 and contacts 409 to ground.

2. THE SECOND NORMAL SUPERVISION CHECK PULSE

Sending relay 400 operates and in the above-described manner places a second normal supervision check pulse on line conductor 485 and 486 which results in the operation of line relay 407.

Line relay 407 operates and at its contacts 408 completes an operating circuit for step magnet 380 which operates to prepare itself for the advancement of the wipers of switch 302 to terminal #27, and at its contacts 409 interrupts the energizing circuit for sending relay 400.

Sending relay 400 releases and terminates the second normal supervision check pulse on line conductors 485 and 486, and thus interrupts the operating circuit for line relay 407.

Line relay 407 releases and at its contacts 409 interrupts the energizing circuit for stepping magnet 380 which then advances the wipers of switch 302 to terminal #27.

It will be recalled that since the monitored device indication relay 710 of the substation is in its non-energized condition indicating that the monitored device 717 is in its normal condition, the corresponding monitored device indication relay 200a at the control station is also in its non-operated condition. In this case monitored device indication relay 200a, at its contacts 206 completes an operating circuit for sending relay 400, which circuit extends from negative battery, over the winding of sending relay 400, over contacts 460, contacts 423, conductor 394, wiper 350 and terminal #27 of the "code control" bank of switch 302, conductor 252, contacts 206, contacts 237, conductor 257, contacts 418 and contacts 409 to ground.

3. THIRD NORMAL SUPERVISION CHECK PULSE

Sending relay 400 operates and initiates the third normal supervision check pulse on line conductors 485 and 486 and energizes line relay 407.

Line relay 407 operates and at its contacts 408 completes the energizing circuit for stepping magnet 380, and at its contacts 409 opens the energizing circuit for sending relay 400.

Sending relay 400 releases and terminates the third normal supervision check pulse which interrupts the energizing circuit for line relay 407. Line relay 407 releases and at its contacts 408 opens the energizing circuit for step magnet 380, and at its contacts 409 prepares a point in an operating circuit for sending relay 400. Stepping magnet 380 releases and in accordance with its nature advances the wipers of switch 302 to terminal #28. An energizing circuit for sending relay 400 is not available inasmuch as terminal #28 of the "code control" bank of switch 302 is open.

When sending relay 400 released after a period determined by its slow-to-release characteristics, at its contacts 404 it interrupted the energizing circuit for the outgoing code marking relay 415.

Outgoing code marking relay 415 releases after an interval as determined by its slow-to-release characteristics and terminates the outgoing code sending condition for the control station.

8. CONCURRENT OPERATION AT THE SELECTED SUBSTATION

At the illustrated substation, line relay 500 follows the pulsing of the three normal supervision check pulses and in the manner previously described energizes and releases the circuit of the energizing circuit of stepping magnet 608 so that the wipers of switch 604 are advanced to terminals #28.

Upon the receipt of the first normal supervision check pulse from the control station, line relay 500 operates and at its contacts 501 prepares the above-described operating circuits for the receiving control relay 510 and step magnet 608.

The receiving control relay 510 operates and at its contacts 511 completes an alternate energizing path for itself and step magnet 608.

Following the termination of the third normal supervision check pulse, relay 500 releases in turn de-energizing the step magnet 608 which releases advancing the switch 604 to terminals #28; an interval thereafter relay 510 releases.

The following energizing circuit for sending relay 580 is then effective, which circuit extends from negative battery over the winding of relay 580, contacts 513, conductor 568, terminal #28 and wiper 640 of the "code start" bank of switch 604, wiper 630 and terminal #28 of the "code stop" bank of switch 604, the strapping between terminal #28 and terminal #27 thereof, conductor 565, contacts 543, and contacts 502 to ground.

Sending relay 580 operates and at its contacts 581 and 583 initiates a pulse on line conductors 485 and 486, which pulse completes the energizing circuit for line relay 500. Sending relay 580 at its contacts 584 is effective to complete the energizing circuit for the auxiliary sending relay 520 and the outgoing code marking relay 530 in the manner described to place the substation in the transmitting condition.

Outgoing code marking relay 530 operates and at its contacts 531 completes an energizing circuit for the stepping magnet 608, which circuit extends from negative battery, over the winding of relay 608, conductor 563, contacts 541, contacts 531, and contacts 501 to ground.

Stepping relay 608 is energized and prepares itself to advance the wipers of switch 604 to terminal #29.

Upon its operation line relay 500 at its contacts 502 is effective to interrupt the operating circuit for the sending relay 580, which restores and terminates the pulse applied to line conductor 485 and 486, resulting in the release of line relay 500.

Line relay 500 releases and at its contacts 501 interrupts the energizing circuit for stepping magnet 608 which restores and in accordance with its nature steps the wipers of switch 604 to terminal #29.

Inasmuch as terminal #29 of the "code start" and "code stop" banks of switch 604 are blank, no re-energizing circuit for sending relay 580 will be found and the substation will stop pulsing.

Upon its release, sending relay 580 at its contacts 584 interrupts the operating circuits for the auxiliary sending relay 520 and the outgoing code marking relay 530 which release in that order in accordance with their slow-to-release characteristics.

9. CONCURRENT OPERATION AT THE CONTROL STATION

Returning now to the control station, it is seen that in response to the pulse placed upon line conductors 485 and 486 by sending relay 580, line relay 407 of the control station is energized and at its contacts 408 completes an energizing circuit for stepping magnet 380, and at its contacts 408 also completes an energizing circuit for the receiving control relay 420.

Receiving control relay 420 operates and at its contacts 421 completes an obvious energizing circuit for the auxiliary test relay 425.

Auxiliary test relay 425 operates and at its contacts 426 prepares a point in its self holding circuit. The control station is now in the receiving condition.

Upon the termination of the pulse sent from the selected substation, line relay 407 at the control station releases and at its contacts 408 interrupts the operating circuit for stepping magnet 380 which releases and advances the wipers of switch 302 to terminal #29, and interrupts the operating circuit for the receiving control relay 420.

Upon the arrival of wiper 360 of the "hold" bank of switch 302 at terminal #29, it completes a holding circuit for the auxiliary test relay 425, which circuit extends from negative battery, over the winding of relay 425, contacts 426, conductor 396, wiper 360 and terminal #29 of the "hold" bank of switch 302, the strapping between terminal #29 and #28, and thence to ground.

Relay 425 holds and at its contacts 428 prepares a point in the operating circuit for reset control relay 455.

After an interval determined by its slow-to-release characteristics, receiving control relay 420 releases, and at its contacts 422 completes an energizing circuit for the reset control relay 455, which circuit extends from negative battery, over the winding of relay 455, contacts 456, conductor 392, terminal #29 and wiper 340 of the "selection" bank of switch 302, conductor 395, contacts 428, and contacts 422 to ground.

Reset control relay 455 operates and at its contacts 457 completes an obvious holding circuit through contacts 466 to ground, at its contacts 458 completes an obvious energizing circuit for reset control relay 465, and at its contacts 459 completes an obvious energizing circuit for sending relay 400.

Reset control relay 465 is chosen to have a delay period of five seconds between the energization of its coil and the time it operates to open its contacts 466. The five second period is longer than the slow-to-release time of the reset control relay at the tubstation and at the control station. Consequently, these latter relays release and restore the equipment at substations and the control station to its normal condition awaiting the initiating of another cycle of operation.

During this five second interval sending relay 400 operates over a circuit extending from negative battery, over the winding of sending relay 400, and over contacts 459 to ground.

Sending relay 400 operates at its contacts 401 and 403 initiates the reset pulse on line conductors 485 and 486, and at its contacts 404 completes an energizing circuit for the outgoing code marking relay 415.

In response to the application of the reset pulse, line relay 407 at the control station and the line relays at all the substations including line relay 500 at substation #1 are energized.

Line relay 407 operates and at its contacts 408 completes the above described energizing circuit for stepping magnet 380 which prepares itself to advance the wipers of switch 302 to terminal 30, and at its contacts 409 interrupts the energizing circuit for the reset control relay 410.

Inasmuch as the release interval of reset control relay 410 is shorter than the five second operating time required for the operation of reset control relay 465, reset control relay 410 releases and at its contacts 411 interrupts the ground supply indicated thus ⊗ for the control station and thus the energizing circuit for the following relays: auxiliary test relay 425, station selection code stop relay 430, station selection interlock relay 435, control station initiating marking relay 445, the substation selection relay 230a, the indication control relay 475 (when operated), outgoing code marking relay 415 and relay 480.

Reset control relay 410 at its contacts 412 is effective to interrupt the energizing circuit for stepping magnet 380, which in accordance with its nature advances the wipers of switch 302 to terminal #30.

Substation selection relay 230a releases and at its contacts 235 interrupts the energizing circuit for the white selection lamp 242 which is then extinguished.

After an interval relays 415 and 480 release.

After the five second period has elapsed following the energization of reset control relay 465, this relay operates and at its contacts 466 interrupts the holding circuit for the reset control relay 455.

Reset control relay 455 releases and at its contacts 458 interrupts the energizing circuit for reset control relay 465, and at its contacts 459 interrupts the energizing circuit for sending relay 400.

Reset control relay 465 restores and at its contacts 466 prepares a point in the holding circuit for reset control relay 455 which circuit is not completed until the next cycle of operation.

Sending relay 400 releases and at its contacts 401 and 403 interrupts the energizing circuit for line relay 407 and removes the reset pulse from line conductors 485 and 486.

Line relay 407 releases and at its contacts 409, completes an energizing circuit for reset control relay 410 which reoperates.

As a result, the substation is returned to its normal condition with reset control relay 410 being operated, and with the wipers of switch 302 at its four banks now resting on terminal #30. Controlled device indication relay 220a is in the operated position to complete the energizing circuit for the red (closed) lamp indicating that the circuit breaker at substation #1 has been closed. In addition the monitored device indication relay 200a is in the released position and an energizing circuit is completed for the green (normal) lamp 240 to indicate that the monitored device is in its normal condition.

10. CONCURRENT OPERATION AT THE SELECTED SUBSTATION

It will be recalled that a long reset pulse was placed on line conductors 485 and 486 by sending relay 400 of the control station and this pulse energizes line relay 500 at substation #1 (the selected substation).

Line relay 500 operates and at its contacts 501 completes an energizing circuit for the step magnet 608, which circuit extends from negative battery, over the winding of relay 608, conductor 563, contacts 541, conductor 560, terminal #30 of the "stepping" bank of switch 604, strapping between terminal #30 and terminal #29 thereof, wiper 610 thereof, conductor 569, and contacts 501 to ground. Line relay 500 at its contacts 501 is also effective to complete an energizing circuit for receiving control relay 510, which circuit extends from negative battery, over the winding of relay 510, contacts 521, contacts 532, conductor 560, terminal #30 of the "stepping" bank of switch 604, strapping between terminals #30 and #29 thereof, wiper 610 thereof, conductor 569, and contacts 501 to ground.

Receiving control relay 510 operates and at its contacts 511 completes an alternate circuit for stepping magnet 608 extending from negative battery, over the winding of stepping magnet 608, conductor 563, contacts 541, contacts 511, and contacts 501 to ground. Relay 510 also provides a holding circuit for itself as follows: negative battery, winding of relay 510, contacts 521, 532, 511 and 501 to ground. Line relay 500 at its contacts 502 interrupts the holding circuit for reset control relay 540 for a period equal to the five second reset pulse placed on conductors 485 and 486.

This interval during which the energizing circiut for reset control relay 540 is interrupted exceeds the interval during which its slow-to-release characteristic prevents its release, and reset control relay 540 releases.

Reset control relay 540 restores and at its contacts 541 interrupts the energizing circuit for stepping relay 608 which releases and in accordance with its nature advances the wipers of switch 604 to terminal #30. In addition to the advancement of the wipers, stepping magnet 608 also advances the off-normal cam 603 which operates the off-normal switch 600. Off-normal switch 600 operates and at its contacts 602 interrupts the energizing circuit for the code checking relay 690, and at its contacts 601 prepares a point in the re-energizing circuit for reset control relay 540. At the termination of the reset pulse line relay 500 restores and at its contacts 501 completes a re-energizing circuit for reset control relay 540, which circuit extends from negative battery, over resistor 503, the winding of relay 540, conductor 565, contacts 601, conductor 561, and contacts 502 to ground.

Reset control relay 540 operates and at its contacts 541 prepares a point in the energizing circuit for stepping magnet 608, and at its contacts 543 completes its own holding circuit. The restoration of line relay 500 also releases relay 510.

Thus, as a result of the five second reset pulse applied to line conductors 485 and 486 by sending relay 400 of the control station the selected substation is reset and is prepared for either the receipt of further pulses from the control station in a subsequent selection or for the initiation of its own pulses in response to an automatic change in the operation of the circuit breaker, or for the receipt of further pulses from another substation to effect lockout.

11. CONCURRENT OPERATION AT OTHER SUBSTATIONS

For convenience in explaining the concurrent operation at the other substations the illustrated substation may be considered to be one of the locked-out substations. Although the setting of the ten point manual switch varies for each substation, such change does not offset the following discussion as will be apparent therefrom. It will be recalled that the wipers of the thirty-point switch 604 at the lock-out substations rested on terminal #3 and only the line relays at the locked-out substation responded to the pulsations placed on line conductors 485 and 486.

In this manner the line relay at the illustrated locked-out substation responds to the long reset pulse applied to line conductors 485 and 486 by the sending relay 400 of the control station.

The line relay of the locked-out substation operates, and at its contacts 502 interrupts the holding circuit for the reset control relay 540. Since the five second reset pulse exceeds in time the slow-to-release interval of the reset control relay 540, reset control relay 540 releases, and at its contacts 542 completes a point in the self-interrupting circuit for stepping magnet 608 extending from negative battery, over the winding of relay 608, conductor 563, contacts 542, conductor 562, contacts 609, and contacts 602 to ground.

Stepping magnet 608 is energized and at its contacts 609 interrupts its own energizing circuit. In this fashion stepping magnet 608 is released and re-energized a sufficient number of times over this local circuit to advance the wipers of switch 604 to terminal #30.

Upon reaching terminal #30, the off-normal cam 603 operates the contacts of off-normal switch 600 and at contacts 602 interrupts the stepping circuit for step magnet 608. Step magnet 608 is no longer energized and the wipers of switch 604 remain on terminal #30.

Upon the subsequent termination of the five second reset signal, line relay 500 releases and at its contacts 502 completes an energizing circuit for reset control relay 540, which circuit extends from negative battery, over resistor 503, the winding of reset control relay 540, conductor 565, contacts 601, conductor 561, and contacts 502 to ground.

The reset control relay 540 operates and at its contacts 541 prepares an energizing circuit for the subsequent re-energization of stepping relay 608 and at its contacts 543 completes its own holding circuit.

Consequently, at each of the substations including the selected substation, the five second reset pulse is effective to restore each of the substations to its normal condition without, however, affecting the controlled device indication relays or the monitored device indication relays. Those substations which were not selected have not been affected by the pulsations of the control or selected substation and their circuit breakers remain in the condition in which they were prior to the initiation of the pulses.

V. INDICATION OF AUTOMATIC TRIP OF A CIRCUIT BREAKER

A. Operation at substation #2

In addition to the use of the disclosed supervisory control system for the purpose of closing or tripping circuit breakers at one or more substations, the equipment at both the substations and the control station is arranged so that if the circuit breaker (in this case 709) at any of the substations automatically trips because of a line fault or other disruption, the equipment at the control station is so informed by the substation equipment. Likewise if such circuit breaker is automatically closed a similar change of operating condition indication is transmitted to the control station.

In general, the affected substation sends two transient protection pulses and a number of station selection pulses corresponding to its designated number to the control station, these pulses effecting advance of the wipers of the thirty-point switch 302 and the thirty-point switch 604 at each substation to the terminal corresponding to the substation at which the circuit breaker has tripped. At the control station a circuit will be found over the terminal to which the wipers of the thirty-point switch have advanced to energize the substation selection relay associated with that substation. Following the operation of the substation selection relay thus energized, the control station transmits sufficient station selection pulses to advance the wipers of the thirty-point switches at the control station and at the reporting substation terminal #14 as in the previously described example.

At the reporting substation, the sending relay is energized repeatedly to send six trip supervision pulses (assuming the circuit breaker has automatically tripped) over the line conductors 485 and 486 to the control equipment which operates to step the wipers of its thirty-point switch to terminal #20. The switch 604 at the reporting substation also advances to terminal #20.

As the wiper of the thirty-point switch at the control station advances to terminal #20, an alarm relay 330 is operated and locks through the break contacts of an alarm key 307 and a reset key 305. Alarm relay 330 at its contacts 331 and 332 completes an energizing circuit to sound the alarm bell 319 until such time as the alarm key or reset key is operated to release the alarm relay and silence the bell.

In addition the controlled device indication relay is released and extinguishes the red (closed) lamp and lights the green (tripped) lamp. Additionally, the controlled device lamp flashing relay operates and at its contacts causes the green (tripped) lamp to flash through a self-interrupting circuits comprising flashing lamp alarm relays 322 and 320.

After the wipers of the thirty-point switch 302 at the control station have advanced to terminal #20, the sending relay 400 is energized to transmit three trip supervision check pulses which advance the wipers of the thirty-point switches at the control station and at the substation to terminal #23.

Upon the arrival of the wipers of the thirty-point switch 604 at the substation at terminal #23, the sending relay 580 is energized and transmits two normal supervision pulses to the control station to advance the wipers of the thirty-point switch 302 to terminal #25. This results in the control station being notified that the monitored device is in the normal condition.

Upon the arrival of the wipers of switch 302 at terminal #25 of the control station, the equipment thereat transmits three normal supervision check pulses over line conductors 485 and 486 to advance the wipers of the substation and the control station to terminals #28.

Upon the receipt of the three normal supervision check pulses and the advancement of the wipers of the thirty-point switch 604 to terminal #28, the substation equipment effects transmission of an additional pulse over line conductors 485 and 486 to advance the wipers of the substation and the control station switches to terminal #29.

Upon the advancement of the wipers of the thirty-point switch 302 of the control station to terminal #29, the equipment thereat is effective to place a five second reset pulse on line conductors 485 and 486 to effect the restoration of the relays and the thirty-point switches at all of the substations to their normal condition in preparation for a subsequent pulsing cycle.

*Detailed operation*

In considering in a detailed fashion the operation of the supervisory control system of the present invention in its response to the automatic tripping of a circuit breaker at one of the substations, it will be assumed that the substation illustrated in Figures 5, 6 and 7 is substation #2. In this regard this substation differs from substation #1 only in that the shaft of the three-bank manual switch 611 is rotated one step clockwise so that the wipers of each of the banks are connected to terminal #2 thereof and the slip ring 677 of the bank of the manual switch associated with the code stop bank of switch 604, is advanced one step so that its upper right hand edge terminates at terminal #3 rather than at the presently shown terminal #2.

The above alteration necessary to change substation #1 into substation #2 is simply accomplished by advancing the pointer associated with the three banks of the manual switch from terminal #1 to terminal #2. There is, of course, no other change necessary since the remaining circuitry is identical for all of the substations.

In our example it shall be assumed that the controlled device such as circuit breaker 709 is in the closed position and that the controlled device indication relay 700 is operated and locked to ground over a circuit extending from negative battery, over the winding of relay 700, over contacts 722, and contacts 760 to ground. In addition it shall be assumed that the monitored device 717, is in its normal condition with contacts 770 open. The controlled device change of indication relay 720 and the monitored device change of indication relay 730 are assumed to be operated and have completed their self-holding circuits.

In addition, the reset control relay 540 is operated, and locked at contacts 543 to ground through contacts 502; and at its contacts 541 prepares a point in the energizing circuit for stepping relay 608.

It may be assumed that the circuit breaker 709 automatically trips because of a change in the external operating conditions such as an overload through the circuit breaker. Upon the tripping of circuit breaker 709, contacts 760 are opened and interrupt the energizing circuit for the controlled device indication relay 700.

Control device indication relay 700 releases and at its contacts 702 interrupts the energizing circuit for the controlled device change of indication relay 720.

Controlled device change of indication relay 720 releases and at its contacts 725 completes an operating circuit for sending relay 580, which circuit extends from negative battery, over the winding of sending relay 580, over contacts 513, over conductor 568, contacts 725, conductor 672, terminal #30 and wiper 640 of the "code start" bank of switch 604, wiper 630 and terminal #30 of the "code stop" bank of switch 604, the strapping between terminal #30 and terminal #1 thereof, conductor 565, contacts 543, and contacts 502 to ground.

It should be noted that a change of condition of the monitored device either operates or releases monitored device indication relay 710 and that operation or release of relay 710 disrupts the holding circuit of monitored device change of indication relay 730 at contacts 714 or 715. The release of relay 730 establishes the following circuit for sending relay 580: negative battery, winding of relay 580, contacts 513, conductor 568, contacts 724, 735, conductor 672, and the remainder of the circuits previously traced.

1. TRANSIENT PROTECTION AND STATION SELECTION PULSES (a) *First transient protection pulse.*—Sending relay 580 operates and in the manner previously described initiates a pulse on line conductors 485 and 486, this pulse being the first transient protection pulse. Sending relay 580 at its contacts 584 is effective to complete an energizing circuit for the auxiliary sending relay 520.

Auxiliary sending relay 520 operates and at its contacts 522 completes an energizing circuit for the outgoing code marking relay 530, which circuit extends from negative battery, over the winding of relay 530, contacts 522, and contacts 584 to ground. The outgoing code marking relay 530 operates and at its contacts 531 prepares a point in the energizing circuit for stepping relay 608.

Line relay 500 operates in response to the initiation of the first transient protection pulse as transmitted by sending relay 580, and at its contacts 501 completes an energizing circuit for the stepping magnet 608, which circuit extends from negative battery, over the winding of relay 608, conductor 563, contacts 541, conductor 560, terminal #30 of the stepping bank, conductor 569, and contacts 501 to ground. After relay 530 operates a parallel circuit is completed over contacts 531, and contacts 501 to ground. At its contacts 502 relay 500 interrupts the energizing circuit for sending relay 580. Stepping magnet 608 operates and prepares itself to advance the wipers of thirty-point switch 604 to terminal #1.

Sending relay 580 restores and terminates the first transient protection pulse by removing negative battery and ground by interrupting the application of negative battery and ground to line conductors 485 and 486.

The termination of the first transient protection pulse results in the release of line relay 500 which at its contacts 501 interrupts the operating circuit for stepping relay 608 which releases, stepping switch 604 to terminals #1. At its contacts 502 relay 500 completes an energizing circuit for sending relay 580, which circuit extends from negative battery, over the winding of relay 580, contacts 513, contacts 525, conductor 567, wiper 630 and terminal #1 of the "code stop" bank of switch 604, conductor 565, contacts 543, and contacts 502 to ground.

(b) *Second transient protection pulse and first station selection pulse.*—In order to avoid unduly complicating the description of the operation of substation #2, reference may be had to the detailed explanation of the response of substation #1 in the previous example wherein a circuit breaker was closed. Inasmuch as the line relay 500 is responsive to the second transient protection pulse and the first station selection pulse following the first transient protection pulse, it is effective at its contacts 501 to complete and interrupt the energizing circuit for stepping magnet 608, and at its contacts 502 to complete and interrupt the energizing circuit for the sending relay 580.

As a result the stepping magnet operates and advances the wipers of switch 604 to terminal #3 whereat an energizing circuit for sending relay 580 is completed over the wiper and terminal #3 of the "code stop" bank, which circuit extends from negative battery, over the winding of relay 580, contacts 513, contacts 525, conductor 567, wiper 630 and terminal #3 of the "code stop" bank, slip ring 677 of manual switch 611, conductor 565, contacts 543, and contacts 502 to ground.

(c) *Second station selection pulse.*—Sending relay 580 operates and initiates the second station selection pulse on line conductors 485 and 486. As a result line relay 501 operates and at its contacts 501 completes an energizing circuit for step magnet 608, and at its contacts 502 interrupts the operating circuit for sending relay 580. Sending relay 580 restores and in the manner previously described terminates the second station selection pulse, thus releasing line relay 500. Line relay 500 restores, and at its contacts 501 interrupts the energizing circuit for stepping magnet 608, and at its contacts 502 prepares the energizing circuit for sending relay 580.

Stepping magnet 608 releases and in accordance with its nature steps the wipers of switch 604 to terminal #4.

It will be recalled that the outgoing code marking relay 530 was operated and at its contacts 534 prevents the completion of the operating circuit for sending relay 580 over terminal #4 of the code stop bank of switch 604. Consequently, sending relay 580 does not reoperate. Sending relay 580 at its contacts 584 is effective to interrupt the energizing circuit for the auxiliary sending relay 520 and the outgoing code marking relay 530. After intervals corresponding to their slow-to-release characteristics, auxiliary sending relay 520 and the outgoing code marking relay 530 restore in that order and terminate the sending condition of the substation.

B. *Concurrent operation at the control station*

At the control station, reset control relay 410 is normally operated and at its contacts 411 provides grounded battery to operate and hold the various relays of the control station by connecting grounded battery to the points indicated by symbol ⊕.

In addition it will be assumed that prior to the tripping of the circuit breaker 709 at substation #2, that circuit breaker was in its closed condition and that the controlled device indication relay 220b (between 220a and 220j) corresponding to circuit breaker 709 (in this case the relays and lamps associated with substation #2 appear in the second escutcheon of the control panel at the control station) is operated. In addition, the red (closed) lamp 244 is lighted to indicate that the circuit breaker is in its closed condition.

Upon the receipt of the four pulses (two transient protection pulses and two station selection pulses) from substation #2, line relay 407 operates and follows these pulses. In accordance with the previous explanation, the switch magnet 380 is energized and de-energized for four times to advance the wipers of switch 302 to terminal #4. Likewise the receiving control relay 420 and the auxiliary test relay 425 were operated in the manner previously described and are held operated throughout the pulsing interval.

Upon the cessation of the pulsing, line relay 407 restores and at its contacts 408 is effective to interrupt the energizing circuit for the receiving control relay 420, which after an interval determined by its slow-to-release characteristics restores. Receiving control relay 420 restores, and at its contacts 422 completes an operating circuit for the substation selection relay corresponding to substation #2. In this case a portion of energizing circuit for the substation selection relay extends over terminal #4 and wiper 340 of the "selection" bank of switch 302, conductor 395, contacts 428, and contacts 422 to ground.

It will be realized that in a manner similar to that explained in the previous example, the substation selection relay at its own contacts extends its operating ground to the station selector interlock relay 435 and indication control relay 480.

Station selector interlock relay 435 operates, and at its contacts 438 completes a self-holding circuit and a holding circuit for the substation selection relay associated with substation #2, and the indication control relay 480. Station selector interlock relay 435 remains operated, and at its contacts 439 interrupts the operating circuit for auxiliary test relay 425.

Auxiliary test relay 425 restores, and at its contacts 423 completes an energizing circuit for sending relay 400, which circuit extends from negative battery, over the winding of sending relay 400, contacts 460, contacts 423, conductor 394, wiper 350 and terminal #4 of the "code control" bank of switch 302, over the contacts (not shown) of the selection key for substation #2, conductor 257, contacts 434, contacts 440 and contacts 409 to ground.

C. *Concurrent operations at other substations*

Before considering the pulses transmitted by the control station in response to the selection pulses transmitted by the reporting substation, the operation at other substations in response to these pulses will be considered.

In response to the four pulses placed on the line (two transient protection pulses and two station selection pulses) by the reporting substation, the line relays at the other substations pulse in response thereto and energize their respective step magnets to advance the wipers of their thirty-point switches to terminal #4. In addition the receiving control relays at the substations are operated in response to the operation of their respective line relays to interrupt the operating circuit for the sending relay at each of the substations.

Upon the cessation of pulsing, each line relay restores and interrupts the energizing circuit for the receiving control relay which itself restores.

The wipers of the thirty-point switch rest on terminal #4 thereof, which is electrically connected to terminal #2 of the manual switch. Inasmuch as the wipers of the manual switch associated with the thirty-point switch at each of the substations other than substation #2 is not connected to terminal #2 of the manual switch, an energizing circuit will not be completed for the sending relay at any substation other than substation #2.

It should be noted that at any substation other than substation #2 the wiper of the three bank manual switch associated with the "code start" bank of the thirty-point switch will not be connected to terminal #2 of the manual switch. It will be recalled that the energizing circuit for the sending relay where the substation initiates sending is completed over a terminal of the "code start" bank of the thirty-point switch. Since this is true, it is evident that at substations other than substation #2 there can be no energizing circuit for the sending relay since at these other stations terminal #4 of the code start bank is connected to an open circuit at terminal #2 of the manual switch. Accordingly the sending relay does not operate.

Furthermore, the energizing circuit for the stepping magnet at each of the substations other than substation #2 is held open because the wiper 650 thereat is not on terminal #2 of the bank of the three bank manual switch associated with the "stepping" bank of the thirty-point switch. Under these circumstances the stepping magnet does not operate in response to any further pulsations on the line conductors 485 and 486 and the substations other than substation #2 are locked-out until a reset pulse which, as will be explained hereinafter, is of a five second duration, energizes the equipment at the locked-out substations in order to reset that equipment.

D. *Station check pulses*

Returning now to the operation at the control station, it will be recalled that sending relay 400 operates and at its contacts 401 and 403 initiates the first station check pulse which is applied to line conductors 485 and 486 to complete an energizing circuit for the line relays at the control station and at all the substations; and at its contacts 404 completes an operating circuit for slow-to-release outgoing code marking relay 415.

Outgoing code marking relay 415 operates and at its contacts 408 prepares a point in the operating circuit for the sending relay 400.

Line relay 407 operates and at its contacts 408 completes an energizing circuit for stepping magnet 380 which prepares to advance the wipers of the thirty-point switch 302 to terminal #5. Line relay 407 at its contacts 409 interrupts the energizing circuit for sending relay 400.

Sending relay 400 releases and at its contacts 401 and 403 terminates the station check pulse and interrupts the operating circuit for line relay 407.

Line relay 407 releases and at its contacts 408 interrupts the energizing circuit for stepping magnet 380 which advances the wipers of the thirty-point switch 302 to terminal #5.

Line relay 407 at its contacts 409 is effective to complete an energizing circuit for sending relay 400, which circuit extends from negative battery, over the winding of relay 400, contacts 460, contacts 423, conductor 394, wiper 350 and terminal #5 of the "code control" bank of switch 302 over the break contacts of the selection key for station #2 (not shown), conductor 257, contacts 418, and contacts 409 to ground.

In this fashion, sending relay 400 and line relay 407 are alternately operated and restored to initiate and terminate station check pulses as long as a circuit for sending relay 400 can be found over the "code control" bank of the thirty-point switch 302 and the contacts of the non-operated selection keys. The operation of sending relay 400 continues over the above described circuits until terminal #13 of switch 302 is reached. Upon the arrival of the wipers of switch 302 at terminal #13, sending relay 400 is operated over a circuit extending from negative battery, over the winding of relay 400, contacts 460, contacts 423, conductor 394, wiper 350 and terminal #13 of the "code control" bank of switch 302, conductor 372, contacts 441, contacts 418, and contacts 409 to ground.

Sending relay 400 operates and initiates a station check pulse on line conductors 485 and 486, thus operating line relay 407. In the manner previously described stepping magnet 380 is energized and de-energized upon the release of sending relay 400 to advance the wipers of thirty-point switch 302 to terminal #14.

Inasmuch as terminal #14 is connected to the open contacts of the check key 309 and the trip key 314, an operating circuit for sending relay 400 is not established over terminal #14 and sending relay 400 does not reoperate.

Sending relay 400 remains open and at its contacts 404 interrupts the operating circuit for marking relay 415 which after an interval determined by its slow-to-release characteristics restores and terminates the sending condition. Since the reporting substation is substation #2, and had originally sent four pulses (two transient protection pulses, plus two station identification pulses) the control station has transmitted ten station check pulses to advance the wipers of the thirty-point switches at the control station and at the reporting substation to terminal #14 thereof.

E. *Concurrent operation at reporting substation*

At the selected substation, substation #2, the station check pulses placed on the line by sending relay 400 of the control station cause line relay 500 at the substation to pulse.

Line relay 500 operates and at its contacts 501 completes an energizing circuit for the receiving control relay, which circuit extends from negative battery, over the winding of relay 510, contacts 521, contacts 532, conductor 560, wiper 650 and terminal #2 of the bank of the manual switch 611 associated with the "stepping" bank of switch 604, terminal #4 and wiper 610 of the "stepping" bank of switch 604, conductor 569, and contacts 501 to ground.

Receiving control relay 510 operates and at its contacts 511 completes an alternate energizing path for the stepping magnet 608, which path extends from negative ground, over the winding of relay 608, conductor 563, contacts 541, contacts 511, and contacts 501 to ground.

Stepping magnet 608 is energized and prepares itself to advance the wipers of the thirty-point switch 604 to terminal #5.

Inasmuch as line relay 500 pulses in response to the station check pulses applied to line conductors 485 and 486 by the control station, it is effective at its contacts 501 to complete and interrupt the energizing circuit for stepping magnet 608 to advance the wipers of switch 604 to terminal #14.

After its response to the last of the station check pulses, line relay 500 releases and at its contacts 501 interrupts the operating circuit for the receiving control relay 510 and for the stepping magnet 608.

After an interval determined by its slow-to-release characteristics, receiving control relay 510 releases and at its contacts 512 completes the energizing circuit for code checking relay 690, which circuit extends from negative battery, over the winding of relay 690, terminal #14 and wiper 620 of the control bank of switch 604, conductor 566, contacts 512, contacts 534, contacts 524, contacts 543, and contacts 502 to ground.

Code checking relay 690 operates and at its contacts 693 completes its own holding circuit extending from negative battery, over the winding of relay 690, contacts 693, and contacts 602 to ground, and at its contacts 692 completes an energizing circuit for sending relay 580 which circuit extends from negative battery, over the winding of relay 580, contacts 513, conductor 568, contacts 725, conductor 672, terminal #14 and wiper 640 of the "code start" bank of switch 604, wiper 630 and terminal #14 of the "code stop" bank thereof, strapping between terminal #14 and terminal #16, contacts 692, conductor 565, contacts 543, and contacts 502 to ground.

1. TRIP SUPERVISION (a) *First trip supervision pulse.*—Sending relay 580 operates and initiates the first trip supervision pulse on line conductors 485 and 486, and at its contacts 584 completes an obvious energizing circuit for the auxiliary sending relay 520 which operates and in turn completes an energizing circuit for the outgoing code marking relay 530.

Line relay 500 operates and completes the energizing circuit for stepping magnet 608 and interrupts the operating circuit for sending relay 580. Sending relay 580 releases and terminates the first trip supervision pulse thus releasing line relay 500.

Upon its release line relay 500 interrupts the energizing circuit for stepping magnet 608 which advances the wipers of switch 604 to terminal #15.

It will be recalled that sending relay 580 operated over a circuit including terminal #14 of the "code stop" bank of switch 604. In this regard terminals #14–#19 thereof are permanently strapped together and an operating circuit for sending relay 580 can be traced from negative battery over the winding of relay 580 and through the above-described strapping circuit and finally over contacts 502 to ground. From this it may be seen that each time line relay 500 releases it completes at its contacts 502 an energizing circuit for sending relay 580. Alternately sending relay 580 interrupts the energizing circuit for line relay 500 which restores and in turn releases sending relay 580. Such operation continues until the wipers of switch 604 arrive at terminal #20 whereat the energizing circuit for sending relay 580 is no longer completed.

In the present example it is assumed that circuit breaker 709 has tripped and that the controlled device indication relay 700 is not operated. In this case contacts 706 are open and the energizing circuit for sending relay 580, which must pass over these contacts when the wipers of switch 604 are on terminal #20 is held open.

As a result of the restoration of sending relay 580, it is effective at its contacts 584 to interrupt the operating circuit for the auxiliary sending relay 520 and the outgoing code marking relay 530 both of which release in the order previously described. Upon the release of auxiliary sending relay 520 and outgoing code marking relay 530 the sending condition is terminated.

In summary the wipers of switch 604 at substation #2 are now on terminals #20, the sending relay 580 and line relay 500 have restored; and six impulses have been transmitted to the control station to indicate automatic tripping of the circuit breaker.

F. *Concurrent operation at the control station*

As a result of the six supervision pulses placed on line conductors 485 and 486 through the operation of sending relay 580 of substation #2, line relay 407 at the control station responds and in the manner previously described completes and interrupts the energizing circuit for stepping magnet 380 which advances the wipers of the thirty-point switch 302 to terminal #20.

In addition receiving control relay 420 and auxiliary test relay 425 have been operated and a separate holding circuit has been established for the auxiliary test relay 425.

Upon the completion of the sixth or last trip supervision pulse, line relay 407 restores and at its contacts 408 interrupts the energizing circuit for the receiving control relay 420.

Receiving control relay 420 restores and at its contacts 422 completes an operating circuit for indication control relay 470 which circuit extends from negative battery, over the winding of relay 470, conductor 374, terminal #20 and wiper 340 of the "selection" bank of switch 302, conductor 395, contacts 428, and contacts 422 to ground.

Indication control relay 470 operates and at its contacts 484 interrupts the energizing circuit for indication control relay 480.

Indication control relay 480 releases and at its contacts 483 completes a shunting circuit for the controlled device indication relay (not shown) associated with substation #2, which circuit extends from ground, over terminal #20, and wiper 370 of the indication bank of switch 302, conductor 377, contacts 483, contacts 471, conductor 264, the contacts of the substation selection relay which was previously operated, and over the winding of the controlled device indication relay (not shown) to ground.

The controlled device indication relay associated with substation #2 is released and interrupts the holding circuit for the auxiliary test relay 425.

It will be recalled that indication control relay 480 was released upon the operation of indication control relay 475, and at its contacts 481 completed an energizing circuit for the alarm relay 330, which circuit extends from negative battery, over the winding of relay 330, over conductor 326, contacts 481, contacts 472, and contacts 450 to ground.

Alarm relay 330 operates and its contacts 331 completes its own holding circuit extending from negative battery, over the winding of relay 330, resistor 334, contacts 331, contacts 308 and contacts 306 to ground, and at its contacts 332 and 333 completes an energizing circuit for the alarm bell 319.

Alarm bell 319 is energized and continues to ring until the release of alarm relay 330 by the depression of either the reset key 305 or alarm key 307 thus interrupting the energizing circuit for alarm relay 330.

Indication control relay 480 at its contacts 482 completes an energizing circuit for the controlled device lamp flashing relay (not shown) associated with substation #2, which circuit extends from negative battery, over the winding of the control device lamp flashing relay, over the contacts (not shown) of the substation selection relay associated with substation #2, conductor 263, contacts 473, contacts 482, and contacts 451 to ground.

It will be recalled that controlled device indication relay associated with substation #2 was released, and at its contacts, it is effective to interrupt the energizing circuit for the red (closed) lamp and complete the energizing circuit for the green (tripped) lamp which then lights.

The controlled device lamp flashing relay is effective at its contacts to complete a circuit over the contacts of flashing lamp alarm relays 320 and 322 to cause the green (tripped) lamp to flash and indicate to the dispatcher that the circuit breaker at substation #2 has tripped. If the reset key 305 is operated it is effective at its contacts 306 to interrupt the holding circuit for the controlled device lamp flashing relay.

The controlled device lamp flashing relay releases and at its contacts (not shown) is effective to complete an operating circuit for the green (tripped) lamp independent of the flashing lamp alarm relays 320 and 322. As a result upon the operation of the reset key 305 by the dispatcher the green (tripped) lamp no longer flashes but is now lighted in a steady manner.

In summary, the dispatcher at the control station has been alerted to the fact that the circuit breaker at substation #2 has tripped and he has through the operation of the reset key 305 extinguished the alarm bell 319 and re-established the energizing circuit for the green (tripped) lamp associated with the escutcheon corresponding to substation #2 to a steady condition.

G. *"Trip supervision check pulses"*

1. FIRST TRIP SUPERVISION CHECK PULSE

It will be recalled that the auxiliary test relay 425 restored and at its contacts 423 completed an energizing circuit for sending relay 400, which circuit extends from negative battery, over the winding of relay 400, contacts 460, contacts 423, conductor 394, wiper 350 and terminal #20 of the "code control" bank, conductor 398, contacts 440, and contacts 409 to ground.

Sending relay 400 operates and in the manner previously described initiates a pulse, in this case the first trip supervision check pulse, on line conductors 485 and 486.

In response to the initiation of this pulse, line relay 407 operates and in the manner previously described completes an operating circuit 380' for stepping magnet 380 and interrupts the energizing circuit for sending relay 400.

Sending relay 400 releases and terminates the first trip supervision check pulse, which action releases line relay 407 and in turn stepping magnet 380.

Upon the restoration of line relay 407, it is effective at its contacts 408 to interrupt the energizing circuit for the stepping magnet 380 which operates and advances the wipers of switch 302 to terminal #21.

Upon the advancement of the wipers of switch 302 to terminal #21, an energizing circuit for sending relay 400 is completed over terminal #21 and wiper 350 of the "code control" bank of switch 302, which circuit extends from negative battery, over the winding of sending relay 400, contacts 460, contacts 423, contacts 394, wiper 350 and terminal #21 of the "code control" bank of switch 302, the strapping between terminal #21 and terminal #20, conductor 398, contacts 440, and contacts 409 to ground.

2. SECOND TRIP SUPERVISION CHECK PULSE

Sending relay 400 operates and energizes line relay 407 by the initiation of a second trip supervision check pulse on line conductors 485 and 486. Line relay 407 operates and at its contacts 408 completes an energizing circuit 380' for stepping magnet 380, and at its contacts 409 interrupts the energizing circuit for sending relay 400.

Sending relay 400 releases and terminates the second trip supervision check pulse, thus interrupting the energizing circuit for line relay 407, which releases.

Line relay 407 releases and at its contacts 408 interrupts the energizing circuit for stepping magnet 380 which releases and advances the wipers of the thirty-point switch 302 to terminals #22.

It will be recalled that the controlled device indication relay associated with substation #2 was released in response to the sixth trip supervision pulse which completed a shunting circuit for this relay over terminal #20 and wiper 370 of the indication bank of switch 302. As a result of the release of the controlled device indication relay, it was effective at its contacts to complete a circuit for sending relay 400, which circuit extends from negative battery, over the winding of relay 400, contacts 460, contacts 423, conductor 394, wiper 350 and terminal #22 of the "code control" bank of switch 302, conductor 276, the contacts (not shown) of the controlled device indication relay associated with substation #2, the contacts of the substation selection relay associated therewith, conductor 257, contacts 418, and contacts 409 to ground.

3. THIRD TRIP SUPERVISION CHECK PULSE

Sending relay 400 operates and initiates the third trip supervision check pulse on line conductors 485 and 486 and completes an energizing path for line relay 407. Line relay 407 operates and completes the energizing path 380' for step magnet 380, and interrupts the energizing circuit for sending relay 400.

Sending relay 400 releases and terminates the third trip supervision check pulse which action interrupts the energizing circuit for line relay 407 which releases.

Upon its release line relay 407 at its contacts 408 interrupts the energizing circuit for stepping magnet 380 which releases and advances the wipers of switch 302 to terminals #23.

Inasmuch as the energizing circuit for sending relay 400 is completed across one of the terminals of the "code control" bank of switch 302, it is apparent that since terminal #23 is a blank such an energizing circuit cannot be completed when the wiper 350 of the code control bank advances to terminal #23.

Sending relay 400 releases and at its contacts 404 interrupts the energizing circuit for the outgoing code marking relay 415 for a period longer than its slow-to-release characteristics and relay 415 releases.

Upon the release of the outgoing code marking relay 415 the sending condition of the control station is terminated, with the wipers of switch 302 on terminal #23.

H. *Concurrent operation at selected substation*

In the manner previously described line relay 500 at the substation follows the pulses placed on line conductors 485 and 486 by the control station.

In response to the first trip supervision check pulse, line relay 500 operates and completes an energizing circuit for the receiving control relay 510, which circuit extends from negative battery, over the winding of relay 510, contacts 521, contacts 532, conductor 560, terminal #30 of the "stepping" bank of switch 604, over the strapping between terminal #30 and terminal #20 thereof, wiper 610, conductor 569, and contacts 501 to ground. In addition line relay 500 is effective at its contacts 501 to complete the known operating circuit for the stepping relay 608. In its response to the trip supervision check pulses applied to line conductors 485 and 486 by the control station, line relay 500 is effective at its contacts 501 to complete and interrupt the energizing circuit for stepping magnet 608 so that the wipers of the substation thirty-point switch 604 advance to terminal #23. Upon the cessation of the trip supervision check pulses, receiving control relay 510 releases and at its contacts 512 completes an energizing circuit for the controlled device change of indication relay 720, which circuit extends from negative battery, over the winding of relay 720, contacts 703, contacts 705, conductor 683, terminal #23 and wiper 620 of the control bank of switch 604, conductor 566, contacts 512, contacts 534, contacts 524, contacts 543, and contacts 502 to ground.

Controlled device change of indication relay 720 at its contacts 723 completes its own hold circuit extending from negative battery, over the lower winding of relay 720, resistor 718, and contacts 723 to ground.

Upon the advancement of the wipers of switch 604 to terminal #23 thereof, an energizing circuit for sending relay 580 is established extending from negative battery, over the winding of relay 580, contacts 513, conductor 568, terminal #22 of the "code start" bank of switch 604, the strapping between terminals #22 and #23, wiper 640 of the "code start" bank, wiper 630 and terminal #23 of the "code stop" bank, the strapping between terminal #23 and terminal #22, conductor 565, contacts 543, and contacts 502 to ground.

I. *Normal supervision pulses*

1. FIRST NORMAL SUPERVISION PULSE

The substation transmits pulses to the control station indicative of the operated condition of the monitored device. Since, in the assumed example, the monitored device is in its "normal" condition, only two normal supervision pulses are transmitted by the reporting substation. It will be recalled that sending relay 580 operates and initiates the first normal supervision pulse on line conductors 485 and 486, and at its contacts 584 completes an obvious energizing circuit for the auxiliary sending relay 520.

Auxiliary sending relay 520 operates and at its contacts 522 completes an obvious operating circuit for the outgoing code marking relay 530, and at its contacts 525 prepares a point in the energizing circuit for sending relay 580.

Line relay 500 operates in response to the application of the first normal supervision pulse to line conductors 485 and 486, and at its contacts 501 completes an energizing circuit for the stepping magnet 608, and at its contacts 502 interrupts the energizing circuit for sending relay 580.

Sending relay 580 restores and terminates the first normal supervision pulse which action releases line relay 500.

Line relay 500 restores and at its contacts 501 interrupts the energizing circuit for stepping magnet 608, and at its contacts 502 completes a point in the energizing circuit for sending relay 580.

Stepping relay 608 restores and advances the wipers of switch 604 to terminal #24 whereat an energizing circuit for sending relay 580 is completed, which circuit extends from negative battery, over the winding of relay 580, contacts 513, contacts 525, conductor 567, wiper 630 and terminal #24 of the "code stop" bank of switch 604, the strapping between terminals #24 and terminals #22 thereof, conductor 565, contacts 543, and contacts 502 to ground.

2. SECOND NORMAL SUPERVISION PULSE

Sending relay 580 operates and initiates the second normal supervision pulse on the line conductors 485 and 486 and completes an energizing circuit for line relay 500.

Line relay 500 operates and in the manner previously described establishes an energizing circuit for stepping magnet 608 and interrupts the energizing circuit for sending relay 580.

Sending relay 580 restores and terminates the second normal supervision pulse, thus interrupting the energizing circuit for line relay 500.

Line relay 500 restores and interrupts the energizing circuit for stepping magnet 608 which, in accordance with its nature, operates and advances the wipers of switch 604 to terminal #25.

Inasmuch as contacts 716 of the monitored device indication relay 710 are open, a re-energizing circuit for sending relay 580 will not be found at terminals #25 and as a result sending relay 580 will not reoperate.

Sending relay 580 remains inoperative a period of time sufficient to allow the auxiliary sending relay 520 and the outgoing code marking relay 530 to restore, thus terminating the sending condition.

J. *Concurrent operation at the control station*

The wipers of the thirty point switch 302 at the control station advance to terminal #25 in response to the two normal supervision pulses applied to line conductors 485 and 486.

In response to the pulses placed on the line by sending relay 580 at substation #2, line relay 407 at the control station is energized and at its contacts 408 completes an energizing circuit for the receiving control relay 420.

Receiving control relay 420 operates and at its contacts 421 completes an obvious energizing circuit for the auxiliary test relay 425.

Furthermore, through the operation of stepping magnet 380 in response to the completion and interruption of its operating circuit through the instrumentality of line relay 407, the wipers of switch 302 are advanced to terminal #25.

Upon a completion of the last normal supervision pulse, line relay 407 restores and at its contacts 408 interrupts the operating circuit for the receiving control relay 420 which releases after an interval determined by its slow-to-release characteristics. Receiving control relay 420 restores and at its contacts 421 interrupts the operating circuit for the auxiliary test relay 425.

It will be recalled that the monitored device indication relay corresponding to substation #2 in the control panel of the control station has been released and in the manner discussed in the previous example in which a monitored device was in its normal condition, the holding circuit for the auxiliary test relay 425 is interrupted at its contacts. Auxiliary test relay 425 releases and at its contacts 423 completes an energizing circuit for sending relay 400, which circuit extends from negative battery, over the winding of relay 400, conductor 460, contacts 423, contacts 394, wiper 350 and terminal #25 of the "code control" bank of switch 302, conductor 398, contacts 440 and contacts 409 to ground.

K. *Normal supervision check pulses*

1. FIRST NORMAL SUPERVISION CHECK PULSE

Sending relay 400 operates and initiates the first normal supervision check pulse on line conductors 485 and 486 and in this manner completes the energizing circuit for line relay 407. Sending relay 400 at its contacts 404 is effective to complete an obvious energizing circuit for the outgoing code marking relay 415.

Line relay 407 operates and at its contacts 408 completes the energizing circuit 380' for switch magnet 380, and at its contacts 409 interrupts the energizing circuit for sending relay 400 which restores and terminates the first normal supervision check pulse.

In response to the termination of the first normal supervision check pulse line relay 407 releases, and at its contacts 408 interrupts the energizing circuit for stepping magnet 380, and at its contacts 409 prepares a point in the energizing circuit for sending relay 400.

In accordance with its nature stepping magnet 380 restores and advances the wipers of switch 302 to terminal #26 whereat a circuit is completed for the reoperation of sending relay 400, which circuit extends from negative battery, over the winding of relay 400, contacts 460, contacts 423, conductor 394, wiper 350 and terminal #26 of the "code control" bank of switch 302, the strapping between terminal #26 and terminal #25, conductor 398, contacts 440, and contacts 409 to ground.

2. SECOND NORMAL SUPERVISION CHECK PULSE

Sending relay 400 reoperates and initiates the second normal supervision check pulse on line conductors 485 and 486 and completes the operating circuit for line relay 407.

Line relay 407 operates and at its contacts 408 completes the energizing circuit 380' for stepping magnet 380 and at its contacts 409 interrupts the energizing circuit for sending relay 400.

Sending relay 400 releases and terminates the second normal supervision check pulse, thus releasing line relay 407.

Line relay 407 restores and at its contacts 408 interrupts the energizing circuit for stepping magnet 380 which, in accordance with its nature, steps the wipers of switch 302 to terminal #27, and at its contacts 409 prepares a point in the re-operating circuit for sending relay 400.

The wipers of switch 302 advance to terminal #27 and thereat complete an energizing circuit for the sending relay 400, which circuit extends from negative battery, over the winding of relay 400, contacts 460, contacts 423, conductor 394, wiper 350 and terminal #27 of the "code control" bank of switch 302, conductor 252, the contacts (not shown) of the monitored device indication relay, the contacts (not shown) of the substation selection relay, conductor 257, contacts 418, and contacts 409 to ground.

3. THIRD NORMAL SUPERVISION CHECK PULSE

Sending relay 400 operates and initiates the third normal supervision check pulse on line conductors 485 and 486 and completes the energizing circuit for line relay 407.

Line relay 407 operates and completes the energizing circuit 380' for stepping magnet 380 and interrupts the energizing circuit for sending relay 400 in the manner previously described.

Sending relay 400 releases and terminates the third normal supervision check pulse and interrupts the energizing circuit for line relay 407.

Line relay 407 releases and interrupts the energizing circuit for stepping magnet 380 which in accordance with its nature steps the wipers of switch 302 to terminal #28.

Inasmuch as terminal #28 of the "code control" bank of switch 302 is terminated on an open circuit, there will be found no re-energizing circuit for sending relay 400.

As a result sending relay 400 remains at its restored condition for a period of time sufficient to allow the outgoing code marking relay 415 to restore in accordance with its slow-to-release characteristics.

The outgoing code marking relay 415 restores and terminates the sending condition.

L. *Concurrent operation at the selected substation*

The normal supervision check pulses placed on the line by sending relay 400 at the control station, result in the operation of the line relays in all the substations, and in particular, line relay 500 at substation #2.

In the manner previously described, the stepping magnet 608 is energized and restored three times corresponding to the number of normal supervision check pulses and advances the wipers of switch 604 to terminal #28. After the termination of the third normal check pulse, line relay 500 restores and at its contacts 502 interrupts the operating circuit for the receiving control relay 510 which after a period determined by its slow-to-release characteristic releases.

Receiving control relay 510 restores and at its contacts 513 completes an energizing circuit for the sending relay 580, which circuit extends from negative battery, over the winding of relay 580, contacts 513, conductor 568, terminal #28 and wiper 640 of the "code start" bank of switch 604, wiper 630 and terminal #28 of the "code stop" bank of switch 604, strapping between terminal #28 and terminal #27, conductor 565, contacts 543, and contacts 502 to ground.

Sending relay 580 operates and initiates a pulse on line conductors 485 and 486 and at its contacts 584 completes an energizing circuit for auxiliary sending relay 520.

Auxiliary sending relay 520 operates and at its contacts 522 completes an obvious energizing circuit for the outgoing code marking relay 530.

Outgoing code marking relay 530 operates and at its contacts 531 prepares a point in the energizing circuit for sending relay 580.

Line relay 500 operates in response to the pulse applied to line conductors 485 and 486 and at its contacts 501 completes an energizing circuit for stepping magnet 608 which circuit extends from negative battery, over the winding of stepping magnet 608, conductor 563, contacts 541, contacts 531, and contacts 501 to ground. Line relay 500 at its contacts 502 is effective to interrupt the energizing circuit for sending relay 580.

Sending relay 580 restores and terminates the pulse applied to line conductors 485 and 486 and interrupts the energizing circuit for line relay 500. Line relay 500 restores and at its contacts 501 interrupts the energizing circuit for stepping magnet 608.

Stepping magnet 608 restores and in accordance with its nature steps the wipers of the four banks of switch 604 to terminal #29.

Inasmuch as terminal #29 on the code start bank and code stop bank are open, no energizing circuit is completed for sending relay 580 upon the advancement of the wipers to this terminal. As a result sending relay 580 remains unoperated and at its contacts 584 interrupts the operating circuit for the auxiliary sending relay 520 and the outgoing code marking relay 530 which release in that order.

M. *Operation at the control station (reset)*

Upon the initiation of the pulse by sending relay 580, line relay 407 at the control station operates and in the manner previously described completes the energizing circuits for stepping magnet 380 and the energizing circuit for the receiving control relay 420.

Upon the termination of the pulse, line relay 407 releases and in the manner previously described interrupts the energizing circuit for the stepping magnet 380 which operates and advances the wipers of the thirty point switch 302 to terminal #29.

In addition line relay 407 at its contacts 408 interrupts the energizing circuit for the receiving control relay 420. Receiving control relay 420 releases and at its contacts 422 prepares a point in an operating circuit for the reset control relay 455.

Upon the advancement of the wipers of switch 302 to terminal #29 a holding circuit for the auxiliary test relay 425 will be found over terminal #29 of the "hold" bank thereof, which circuit extends from negative battery, over the winding of relay 425, contacts 426, conductor 396, wiper 360 and terminal #29 of the "hold" bank, and thence to ground.

In addition upon the advancement of wiper 340 of the selection bank of switch 302 to terminal #29, an operating circuit for reset control relay 455 is completed, which circuit extends from negative battery, over the winding of relay 455, contacts 456, conductor 392, terminal #29 and wiper 340 of the "selection" bank of switch 302, conductor 395, contacts 428 and contacts 422 to ground.

Reset control relay 455 operates and at its contacts 457 completes a holding circuit which extends from negative battery, over the winding of relay 455, contacts 457 and contacts 466 to ground, and at its contacts 458 completes an obvious energizing circuit for reset control relay 465, and at its contacts 459 completes an obvious energizing circuit for sending relay 400.

In the five second interval prior to the operation of reset control relay 465, sending relay 400 operates and at its contacts 401 and 403 completes a circuit for the initiation of the long reset pulse, which in this case will be five seconds, and completes the energizing circuit for the line relays at the control station and at the substations.

It will be recalled that reset control relay 410 is normally operated and because of its slow-to-release characteristics does not release during the pulsing of line relay 407. However, since a long reset pulse, approximately five seconds in duration, is applied to line conductors 485 and 486, line relay 407 is held operative for this period. Therefore, line relay 407 at its contacts 409 interrupts the operating circuit for reset control relay 410 for a period longer than its slow-to-release characteristics and relay 410 releases.

Reset control relay 410 restores and at its contacts 411 interrupts the ground circuit for the control station resulting in the interruption of the energizing circuits for the auxiliary test relay 425, the station selector interlock relay 435, and the substation selection relay associated with substation #2. Reset 25 control relay 410 at its contacts 412 interrupts the energizing circuit for stepping magnet 380.

Stepping magnet 380 restores and in accordance with its nature advances the wipers of switch 302 to terminal #30.

The substation selection relay associated with substation #2 releases and at its contacts (not shown) interrupts the energizing circuit for the white selection lamp associated therewith, which lamp then extinguishes.

Upon the restoration of station selector interlock relay 435, it is effective at its contacts 438 to interrupt the energizing circuit for indication control relay 480, which restores.

After the five second interval which commenced with the energization of reset control relay 465, this reset control relay operates and at its contacts 466 interrupts the holding circuit for the reset control relay 455.

Reset control relay 455 releases after an interval determined by its slow-to-release characteristics and at its contacts 458 interrupts the operating circuit for reset control relay 465 and at its contacts 459 interrupts the operating circuit for sending relay 400.

Sending relay 400 releases and terminates the five second reset pulse and interrupts the energizing circuit for line relay 407.

Line relay 407 restores and at its contacts 409 completes the obvious energizing circuit for reset control relay 410.

Reset control relay 410 operates and at its contacts 411 prepares for the application of ground to the various circuits hereinbefore described.

It will thus be seen that the wipers of the thirty point switch 302 at the control station are now resting on terminal #30, that all the common relays with the exception of reset control relay 410 are released and that the green (tripped) lamp and green (normal) lamp are lighted indicative of the tripped condition of circuit breaker 709.

N. *Concurrent operation at the selected substation (reset)*

It will be recalled that a five second reset pulse was placed on the line by sending relay 400 of the control station, and line relay 500 at substation #2 is energized in response thereto.

Line relay 500 operates and at its contacts 501 completes an energizing circuit for the stepping magnet 608 in the manner previously described and completes the previously described energizing circuit for receiving control relay 510.

Receiving control relay 510 operates and at its contacts 511 completes a holding circuit for stepping relay 608 independent of the wipers of the thirty point switch 604.

The five second reset pulse holds line relay 500 operated a sufficient length of time to exceed the hold time of reset control relay 540.

Reset control relay 540 releases and at its contacts 541 interrupts the energizing circuit for stepping relay 608 which restores and in accordance with its nature steps the wipers of switch 604 to terminal #30 and operates the off-normal contacts of switch 600 through the operation of cam 603.

The off-normal contacts are effective at contacts 602 to interrupt the operating circuit for code checking relay 690 which restores.

As a result all the relays at the substations are restored except for the reset control relay 540, the controlled device change of indication relay 720 and the monitored device change of indication relay 730. The wipers of the thirty point switch rest on terminal #30 thereof.

O. *Concurrent operation at other substations (reset)*

The line relays at each of the other substations operate in response to the long reset pulse placed on the line by sending relay 400 at the control station, and in a manner similar to that described with reference to substation #2 the reset control relays at the other substations are released inasmuch as their operating circuits are interrupted for a period longer than their slow-to-release characteristics.

In a manner similar to that previously described, the stepping magnet at each of the substations advances the wipers of their thirty-point switches to terminal #30 and the off-normal cam is rotated to a point whereat the contacts of the off-normal switch are operated to stop the switch.

At the termination of the long reset signal, the line relays at the substations release and the reset control relay at each substation is reoperated in preparation for another cycle of operation.

VI. SELECTION OF SUBSTATION #1 AND CHECKING THE INDICATIONS THEREAT

A. *Selection of substation #1*

Previously the operation of the supervisory equipment of the present invention was described with respect to its operation in closing a circuit breaker at a desired substation, after having first selected that substation from the number of substations accessible to the control station.

In the following discussion it is assumed that the dispatcher at the control station desires merely to check the condition of operation of the circuit breaker at a particular substation to determine whether it is closed or tripped and whether the monitored device is in its normal or alarm condition.

The selection of the desired substation is accomplished in a manner identical to that discussed with respect to the selection of substation #1 in the case where it was desired to close the circuit breaker.

In general, the dispatcher depresses the selection key in the escutcheon associated with the desired substation and holds it in that condition until the white selection lamp associated therewith illuminates. In response to the depression of the selection key, the equipment at the control station is effective to transmit sufficient pulses including transient protection pulses and station selection pulses to effect selection of the desired substation advancing the thirty point switches at the control station and all substations. In response to its selection, the desired substation transmits sufficient station check pulses to advance the wipers of the rotary switches at the control station and at the selected substation to terminal #14.

In a manner similar to that described previously, the non-selected substations are locked out of the supervisory system and only their line relays respond to further pulsing.

Upon the receipt of sufficient station selection check pulses from the selected substation to advance the wipers of its thirty point switch 302 to terminal #14, the equipment at the control station completes a previously described circuit to light the white selection lamp 242. The dispatcher upon receiving this indication, releases the non-locking station selection key and depresses the check key 309.

B. *Checking indications at substation #1*

1. FIRST CHECK INDICATION PULSE

It will be recalled that in the operation of the equipment at the control station in response to the pulses transmitted to advance the wipers of its rotary switch to terminal #14, the station selection code stop relay 430, the station selection interlock relay 435, and the indication control relay 480 were operated.

Upon the depression of check key 309, it is effective at its contacts 310 to complete an operating circuit for sending relay 400, which circuit extends from negative battery, over the winding of relay 400, contacts 460, contacts 423, conductor 394, wiper 350 and terminal #14 of the "code control" bank of switch 302, contacts 310, conductor 390, contacts 433, contacts 440 and contacts 409, to ground.

Sending relay 400 operates and as previously discussed applies negative battery and ground to line conductors 485 and 486 to initiate the first check pulse, and at its contacts 404 completes an operating circuit for outgoing code marking relay 415.

Outgoing code marking relay 415 operates and at its contacts 418 prepares a point in the reoperating circuit for sending relay 400.

Line relay 407 operates in response to the application of the first check pulse, and at its contacts 408 completes an energizing circuit for stepping magnet 380, and at its contacts 409 interrupts the energizing circuit for sending relay 400.

Stepping magnet 380 operates and prepares itself to advance the wipers of the thirty-point switch 302 to terminal #15.

Sending relay 400 restores and terminates the first check pulse. Upon the termination of the first check pulse line relay 407 restores and at its contacts 408 interrupts the energizing circuit for stepping magnet 380, and at its contacts 409 prepares a point in the reoperating circuit for sending relay 400.

Stepping magnet 380 restores and in accordance with its nature advances the wipers of the thirty-point switch 302 to terminal #15.

2. SECOND CHECK INDICATION PULSE

Upon the advancement of the wipers of switch 302 to terminal #15, there is completed an energizing circuit for sending relay 400, which circuit extends from negative battery, over the winding of relay 400, contacts 460, contacts 423, conductor 394, wiper 350 and terminal #15 of the "code control" bank of switch 302, conductor 371, contacts 461, conductor 372, contacts 441, contacts 418, and contacts 409 to ground.

Sending relay 400 operates and initiates the second check pulse on line conductors 485 and 486, in response to which line relay 407 operates.

Line relay 407 operates and at its contacts 408 completes an energizing circuit for stepping magnet 380 and at its contacts 409 interrupts the energizing circuit for sending relay 400.

Stepping magnet 380 operates and prepares to advance the wipers of the thirty-point switch 302 to terminal #16.

Sending relay 400 restores and terminates the second check pulse and interrupts the energizing circuit for line relay 407.

Line relay 407 restores and at its contacts 408 interrupts the energizing circuit for stepping magnet 380 and at its contacts 409 prepares a point in the re-energizing circuit for sending relay 400.

Stepping relay 380 restores and advances the wipers of the thirty-point switch 302 to terminal #16.

Inasmuch as the re-energizing circuit for sending relay 400 is normally completed over the terminals of the "code control" bank of switch 302, when the wiper 350 thereof rests on terminal #16, no such re-energizing circuit is completed inasmuch as the connection from terminal #16 is held open at the contacts 313 of the non-operated close key. As a result therefore the sending relay 400 is not re-energized and the transmission of check indication pulses from the control station is completed. As in the previous discussion the outgoing code marking relay 415 restores to complete the sending condition at the control station.

C. Concurrent operation at the selected substation

It has been assumed that the illustrated substation, substation #1, has been selected and it is further assumed that the circuit breaker 709 thereat is in its closed condition.

Under these circumstances circuit breaker 709 is effective at its contacts 760 to complete an operating circuit for the controlled device indication relay 700 over an obvious circuit.

It will also be recalled that the code checking relay 690 operates when the wipers of the thirty-point switch 604 and in particular the wiper of the "code control" bank of this switch had advanced to terminal #14 thereof.

In response to the two check indication pulses transmitted by the control station, the stepping magnet 608 of the selected substation operates in response to the selective operation of the line relay 500, to advance the wipers of switch 604 from terminal #14 to terminal #16.

Upon the arrival of the wipers of switch 604 at terminal #16, there is completed thereover an energizing circuit for sending relay 580, which circuit extends from negative battery, over the winding of relay 580, contacts 513, conductor 568, terminal #16 and wiper 640 of the "code stop" bank of switch 604, wiper 630 and terminal #16 of the "code stop" bank of switch 604, contacts 692, conductor 565, contacts 543, and contacts 502 to ground.

1. CHECK SUPERVISION PULSES

Sending relay 580 operates and in a manner previously described completes an energizing circuit for line relay 500, which then operates. Upon operation of line relay 500 a cycle for advancing the wipers of switch 604 to terminal #17 is completed in the previously described manner and the wipers come to rest at this terminal.

Inasmuch as terminals #19, #18, #17 and #16 of the "code stop" bank of switch 604 are strapped together, the energizing circuit for sending relay 580 is completed a sufficient number of times to advance the wipers of switch 604 to terminal #19 in an obvious manner similar to that previously described with respect to their advancement to terminals #17.

Upon the arrival of the wipers of switch 604 at terminal #19, an energizing circuit for sending relay 580 is completed, which circuit extends from negative battery, over the winding of relay 580, contacts 513, contacts 525, conductor 567, wiper 630 and terminal #19 of the "code stop" bank of switch 604, contacts 692, conductor 565, contacts 543, and contacts 502 to ground.

In an obvious manner the wipers of switch 604 advance to terminal #20.

It will be remember that the controlled device indication relay 700 was operated inasmuch as the circuit breaker 709 is in its closed condition, and at its contacts 706 completes an energizing circuit for sending relay 580, which circuit extends from negative battery, over the winding of relay 580, contacts 513, contacts 525, conductor 567, wiper 630 and terminal #20 of the "code stop" bank of switch 604, conductor 671, contacts 706, conductor 688, conductor 565, contacts 543, and contacts 502 to ground.

As a result of the operation of sending relay 580, the wipers of switch 604 advance to terminal #21.

Inasmuch as terminal #21 of the "code stop" bank is open, there is no further re-energizing circuit completed for the sending relay 580 and no further close supervision pulse is initiated.

Sending relay 580 remains released, and at its contacts 584 interrupts the energizing circuit for the auxiliary sending relay 520 and the outgoing code marking relay 530 which release in that order to complete the sending condition at the substation.

D. Concurrent operation at the control station

In an obvious manner, the wipers of the thirty-point switch 302 at the control station advance to terminal #21 in response to the five close supervision pulses transmitted by the selected substation.

Upon the arrival of the wipers of the thirty-point switch 302 at terminal #21, a previously described circuit for the operation of the control device indication relay 220a is completed.

Upon the operation of the controlled device indication relay 220a it is effective at its contacts 225 to complete an energizing circuit for the red (closed) lamp which circuit extends from negative battery, over resistor 207, the filament of lamp 244, contacts 225, contacts 216, and conductor 272 to ground, and at its contacts 224 interrupts the energizing circuit for the green (tripped) lamp 243.

The dispatcher at the control station then is informed that the circuit breaker at the selected substation is in its closed condition.

1. CLOSE SUPERVISION CHECK PULSE

In the previously described manner the equipment at the control station is effective to transmit one close supervision check pulse to advance the wipers of the thirty-point switches at the control station and at the selected substation to terminal #22. Referring now to Chart III the subsequent operation of the supervisory system becomes apparent.

In the assumed example the monitored device 717 was assumed to be in its normal condition and in accordance with the previous discussion, the selected substation transmits three normal supervision pulses to advance the wipers of the thirty-point switches at the control station and the selected substation to terminal #25.

Upon the arrival of its wipers at terminal #25 the thirty-point switch 302 at the control station completes an operating circuit for sending relay 400 and is effective to transmit three normal supervision check pulses to advance the wipers of the thirty-point switches to terminal #28. Upon the advancement of the wipers of the thirty-point switch of the substation to terminal #28, a circuit is completed for the sending relay 580 at this station to transmit a single reset pulse to advance the thirty-point switches to terminal #29.

At the control station the previously described reset circuit is energized to transmit the five second reset pulse over line conductors 485 and 486 to effectuate reset of the equipment at the control station and at all the substations to its normal or unoperated condition in preparation for further control operations.

In case the control station and one or more substations or two or more substations begin sending simultaneously, there must be some arrangement whereby the signals thus sent are prevented from disrupting the operation of the supervisory control system. The following paragraphs are devoted to a discussion of the arrangement for preventing such disruption.

VII. CONTROL STATION AND SUBSTATION START SENDING SIMULTANEOUSLY

A. *Control station sends higher number*

When the substation ceases sending and relay 520 releases, before relay 530 can release, an additional pulse or pulses arrive from the control station, to which pulses line relay 500 responds. Relay 530 holds over a circuit extending from negative battery, over the winding of relay 530, contacts 523, 533, 531, and 501 to ground. Relay 530 at its contacts 532 interrupts the circuit of relay 510. Stepping magnet 608 follows the pulses over the following circuit: negative battery, over the winding of magnet 608, conductor 563, contacts 541, 531, and 501 to ground. Accordingly switch 604 is led to a "lock-out position" (i.e., it does not have a start-up circuit for sending relay 580 since the wipers of switch 604 are connected to an open circuit at the terminals of switch 611.)

B. *Substation sends higher number*

When the control station ceases sending, and relay 400 releases, before relay 415 can release, an additional pulse or pulses arrive from the substation, pulsing relay 407. Relay 415 is held as follows: negative battery, over the winding of relay 415, contacts 405, 416, 412 and 408 to ground. Relay 415 at its contacts 417 interrupts the circuit of relay 420. Switch magnet 380 follows the pulses over the following circuit: negative battery, over the winding of relay 380, conductor 378, contacts 412, and 408 to ground. Accordingly switch 302 is led to the correct reporting point corresponding to the sending substation.

At this time sending relay 400 is operated over a circuit extending from negative battery, over the winding of relay 400, contacts 460, contacts 423, conductor 394, wiper 350 and the terminal of the "code control" bank corresponding to the reporting substation, the contacts of the various selection keys, conductor 257, contacts 418, and contacts 409 to ground. Sending relay 400 finds operating circuits over each succeeding selection key contacts in parallel, over conductor 257, contacts 418 and contacts 409 to ground. The switch therefore advances to terminal #13. Since a point selection relay was not operated, the station selection interlock relay 435 was not operated, and at its contacts 441 interrupted the re-energizing circuit for sending relay 400. Sending relay 400 restores and at its contacts 404 interrupts the holding circuit for the outgoing code marking relay 415. Outgoing code marking relay 415 restores and at its contacts 419 completes an energizing circuit for the reset control relay 455 over a path extending from negative battery, over the winding of relay 455, contacts 456, conductor 392, terminal #13 and wiper 340 of the "selection" bank of switch 302, conductor 395, contacts 429, contacts 448, contacts 419, and contacts 439 to ground. Reset control relay 455 operates and in the manner previously described effects a long reset signal to reset the equipment at the control station and at all the substations including the sending substation to its normal condition.

C. *Two substations start sending simultaneously*

The substation sending the lower number of pulses is led to a lock-out position by the additional pulse or pulses received from the other substation in the same fashion as though they were received from the control station as described above.

VIII. OPERATION IN ACCORDANCE WITH SWITCH BANK FUNCTION

While the supervisory control system of the present invention has been discussed with reference to the control or indication function performed by the supervisory control system, there are numerous possible variations of its operation which serve to reset or stall the equipment if it malfunctions. To clarify the operation of the equipment as the wipers of each bank of the thirty-point switches move from terminal to terminal, the following discussion is predicated upon a consideration of each switch bank and its function as its wiper moves from terminal to terminal.

A. *Control station switch "selection" bank*

1. OPERATIONS INITIATED AT CONTROL STATION

The operation of a point selection key operates relay 445 which connects ground, over contacts 439, 419, 448 and 429 to wiper 340 of the "selection bank" of switch 302. When the control station starts sending, outgoing code marking relay 415 operates and does not release until the cessation of pulses, holding ground off wiper 340 until the cessation of pulsing. These pulses operate the switch magnet 380 which advances the wiper. If the selection key 248a for station #1 is operated, three pulses drive the wiper 340 to terminal #3.

When relay 415 releases according to its slow-to-release characteristics, being sleeved and slugged, this ground operates the station selection relay 230a at the control station. Had a station selection key for a station other than station #1 been operated the switch would have been driven to a terminal #4-#12 instead, operating a corresponding station selection relay.

Relay 230a operates station selection interlock relay 435 which removes this selection ground. (Incidentally, should the switch not make station selection and overstep to terminal #13 and stop there, upon the cessation of pulsing, reset relay 455 would operate. It is presumed in general, however that when the control station is sending the switch will not stop on the wrong point).

Assuming the switch to be stopped on a station selection terminal, such as terminal #3 for example, the selected substation should return enough pulses to drive the switch to terminal #14. When these pulses are received at the control station receiving control relay 420 operates and remains operated during pulsing, releasing an interval thereafter according to its slow-to-release characteristics. Relay 420 operates auxiliary test relay 425. If the switch should understep and come to rest on terminal #13, reset relay 455 would be operated over a circuit extending from negative battery, over the winding of relay 455, contacts 456, conductor 392, terminal #13 and wiper 340 of the "selection" bank of switch 302, conductor 395, contacts 428, and contacts 422 to ground. A holding circuit for relay 425 is provided on point #13 of the "hold" bank, so that reset relay 455 can be operated.

Assuming that the switch successfully stops on terminal #14 however, auxiliary test relay 425 locks over contacts 431 to ground. Station selection code stop relay 430 operates over a circuit extending from negative battery over the winding of relay 430, contacts 437, conductor 399, terminal #14 and wiper 340 of the "selection" bank, conductor 395, contacts 428, and contacts 422 to ground, indicating that station check has been successfully made. Note that if relay 435 had not been operated, this ground would have operated the reset relay 455 instead of relay 430.

Thereupon the control station sends pulses to control the selected substation for indication checking, tripping or closing, which advances the switch to terminal #16, #18, or #19 respectively. Station selection interlock relay 435 holds ground off the wiper so that the reset relay 455 does not operate when the switch comes to rest on one of these points.

Thereupon the selected substation sends pulses which advances the switch to terminal #20 or #21 according as trip or close supervision is returned. Receiving control relay 420 releases, and at its contacts 422 completes an operating circuit for indication control relay 470 which circuit extends from negative battery, over the winding of relay 470, conductor 374, terminal #20 or #21 of the "selection" bank of switch 302, the wiper 340 thereof, conductor 395, contacts 428 and contacts 422 to ground. Relay 470 operates if a disagreement exists between the position of relay 220a relative to the position of the controlled device to provide a path from the controlled device indication relay such as 220a to the wiper of the "indication" bank of the switch which selectively controls relay 220a.

Thereupon the control station sends pulses which advances the switch to terminal #22 or #23. Relay 435 holds ground off the wiper arm to prevent the operation of reset relay 455.

Thereupon the selected substation sends pulses which advance the switch to terminal #25 or #26. When relay 420 releases, ground is applied over its contacts 422 to operate relay 475 if a disagreement exists between the position of relay 200a relative to the condition of the monitored device to provide a path from the monitored device indication relay such as 200a to the wiper of the "indication" bank of the switch which selectively controls relay 200a.

Thereupon the control station sends pulses which advance the switch to terminal #27 or #28. Relay 435 holds ground off the wiper arm to prevent the operation of reset relay 455.

The selected substation then sends one or two pulses, advancing the switch to terminal #29. When relay 420 releases, it is effective at its contacts 422 to complete an energizing circuit for reset relay 455. Relay 455 operates and causes the control station to send a long reset signal advancing the thirty-point switches at the control station and all substations to position #30.

2. OPERATIONS INITIATED BY SUBSTATION

The change of condition of a controlled or monitored device at a substation causes the substation to send pulses to select the said substation at the control station. For example, if the change occurs at substation #1, the substation sends three pulses causing the switch to advance to terminal #3. Relays 420 and 425 are operated with relay 425 locked to ground.

When relay 420 releases, it is effective at its contacts 422 to complete an energizing circuit for the substation selection relay 230a which circuit extends from negative battery, over the winding of relay 230a, conductor 260, terminal #3 and wiper 340 of the "selection" bank of switch 302, conductor 395, contacts 428 and 422 to ground. If the switch is overstepped to terminal #13 without a selection being made, when pulsing ceases and relay 420 releases, it is effective at its contacts 422 to complete an energizing circuit for reset relay 455 which circuit extends from negative battery, over the winding of relay 455, contacts 456, conductor 392, terminal #13 and wiper 340 of the "selection" bank of switch 302, conductor 395, contacts 428, and contacts 422 to ground. Reset relay 455 operates for reset.

After selection has been made, the control station sends pulses which advance the switch to terminal #14. Relays 435 and 445 hold selection ground off the wiper so that when relay 415 releases, relay 430 will not operate.

Thereupon the reporting substation sends pulses which advances the switch to terminal #20 or #21. If the switch should stop for any reason on terminals #15–#19, the reset relay would be operated, but if the switch stops on terminal #20 or #21, relay 430 would be operated to provide a path for selectively controlling relay 220a, for example, as a disagreement between relay 220a and the position of the controlled device is encountered. Also it can be seen that if the switch oversteps into terminal #22, #23 or #24, the reset relay 455 will be operated.

The control station then sends pulses which advance the switch to terminal #22 or #23. Relays 435 and 445 hold selection ground off the wiper to prevent the operation of reset control relay 455. The reporting substation sends pulses which advance the switch to terminal #25 or #26. If the switch understeps and stops on terminal #23 or #24, the release of receiving control relay 420 operates the reset relay 455. However, if the switch stops on terminal #25 or #26, the release of relay 420 operates indication control relay 475 to provide a circuit for selectively operating relay 200a, for example, if a disagreement between relay 200a and the condition of the monitored device is encountered. If the switch oversteps to terminals #27, #28, or #29, reset relay 455 will be operated when relay 420 releases.

Thereupon the control station sends pulses which advance the switch to terminal #27 or #28, and relays 435 and 445 prevent the operation of reset relay 455.

Thereupon the reporting substation sends one or two pulses, advancing the switch to terminal #29. When relay 420 releases, it is effective at its contacts 422 to complete an energizing circuit for reset control relay 455 which extends from negative battery, over the winding of relay 455, contacts 456, conductor 392, terminal #29 and wiper 340 of the "selection" bank, conductor 395, contacts 428 and contacts 422 to ground. Reset control relay 455 operates and causes the control station to send a long reset signal advancing the thirty-point switches at the control station and all substations to position #30.

3. RESPONSE TO TRANSIENTS

If one or two transients are received causing the switch to advance and stop on terminal #1 or #2, relay 420 will have operated in turn operating relay 425 which will be found locked through another bank (the hold bank) of the switch to ground.

When relay 420 releases, it completes an energizing circuit for reset control relay 455 from negative battery, over the winding of relay 455, contacts 456, conductor 392, terminal #1 or #2 and wiper 340 of the "selection" bank of switch 302, conductor 395, contacts 428 and 422 to ground.

4. SUMMARIZING

The sending selection ground is connected to the wiper at the end of sending pulsing only if the control station initiates station selection and is removed after station selection, it being assumed that the switch at the control station will respond correctly to local pulsing.

The receiving selection ground is connected to the wiper at the end of receipt of pulses. When the switch stops, this ground is used for station selection, station sending code stop signal, trip or close supervision signalling, and normal or alarm supervision signalling. In general, if the switch stops on the wrong terminal following the receipt of pulsing, this ground operates the reset control relay 455. This ground also effects operation of reset control relay 455 over terminals #1 and #2 if one or two transient pulses are received.

B. *Control station switch "code control" bank*

1. OPERATION INITIATED FROM CONTROL STATION

The "code control" bank and its associated circuitry provides means for the control station to: (a) start the system to step from normal rest position, (b) to start the system after coming to rest on a switch terminal, and (c) to maintain the system stepping over certain terminals.

This is accomplished by controlling circuits to sending relay 400 which when operated, places a pulse on the line, operating line relay 407 which releases relay 400, which in turn releases relay 407, the functioning of relay 407 causing the switch to step. Accordingly the circuit of relay 400 can be traced to the switch wiper as follows: negative battery, over the winding of relay 400, contacts 460, contacts 423 and conductor 394 to wiper 350. When the switch is on certain terminals a circuit is completed to relay 400. On certain other terminals a circuit is not completed to relay 400.

When a station selection key (key 248a for station #1 for example) is depressed, relay 445 is operated and at its contacts 447 completes an operating circuit for sending relay 400 as follows: negative battery, over the windings of relay 400, contacts 460, contacts 423, conductor 394, wiper 350 and terminal #30 of the "code control" bank, conductor 373, contacts 447 and 409 to ground.

Relay 400 which is sleeved operates, in turn operating line relay 407 which at its contacts 409 interrupts the circuit of relay 400 and operates the switch magnet 380 over circuit 380'. Relay 400 also operates slugged and sleeved outgoing code marking relay 415 (which does not release during series of pulsing of 400 but releases an interval thereafter).

When sending relay 400 releases after an interval as determined by its slow-to-release characteristics, it opens the circuit of line relay 407 which releases. The release of line relay 407 opens the circuit of the switch magnet 380, causing the switch to step. This occurs with sufficient speed so that relay 400 does not reoperate with the wiper on terminal #30 when the contacts 409 of relay 407 close.

After the wiper has been stepped to terminal #1, the following circuit is completed to operate sending relay 400: negative battery, over the winding of relay 400, contacts 460, contacts 423, conductor 394, wiper 350 and terminal #1 of the "code control" bank, strapping to terminal #30 thereof, conductor 373, contacts 447, and 409 to ground. Thereupon relay 400 effects the previously described relay and switch functioning for stepping, causing the switch to step to terminal #2.

After the wiper has been stepped to terminal #2, a circuit for sending relay 400 is completed comprising terminals #2, #1, and #30 and interconnecting strapping. Relay 400 operates and the switch is stepped to terminal #3.

If the selection key 248a for station #1 has been depressed, the circuit of relay 400 is open at terminal #3 and the system comes to rest on terminal #3. If the selection key for some station other than station #1 had been depressed, a circuit for relay 400 may be traced as follows: negative battery, over the winding of relay 400, contacts 460, contacts 423, conductor 394, wiper 350 and terminal #3 of the "code control" bank of switch 302, conductor 255, contacts 247, conductor 257, contacts 418 and 409 to ground. Relay 400 operates under this circumstance, advancing the switch. Accordingly the switch keeps advancing until an open contact associated with a depressed key is found in terminals #3–#12 corresponding to stations #1–#10. Assuming that the selection key for station #1 is depressed, the switch comes to rest with the wiper on terminal #3. Station selection relay 230 operates over the selection bank, in turn operating relay 435 which locks. Relay 400 and in turn relay 415 release.

Thereupon the selected substation (assume substation #1) places pulses on the line, pulsing line relay 407, to drive the switch to station check terminal #14.

If the switch should understep, coming to rest on terminal #13, the non-operated contacts 418 of relay 415 hold the circuit open, and the reset relay 455 is operated over the "selection" bank.

Assuming however that the switch comes to rest on terminal #14, station selection code stop relay 430 is operated over the "selection" bank. A "start up" circuit is completed to relay 400 only after one of the keys "check key 309," "close key 311," or "trip key 314" is depressed. This start circuit is as follows: negative battery, over the winding of relay 400, contacts 460, contacts 423, conductor 394, wiper 350 and terminal #14 of the "code control" bank, the contacts of the depressed one of these keys, conductor 390, contacts 433, contacts 440, and contacts 409 to ground. The switch 302 advances to terminal #15 in the previously discussed manner.

If the close key 311 is depressed circuits will be found to keep relay 400 pulsing to advance the switch to terminal #19. If the trip key 314 is depressed circuits will be found to keep sending relay 400 pulsing to advance the switch only as far as terminal #18. If the check key 309 is depressed, a circuit will be found to keep sending relay 400 pulsing to advance the switch to terminal #16. Perhaps this is best understood by assuming first that the close key 311 is depressed.

Relay 400 is energized over a circuit from negative battery, over the winding of relay 400, contacts 460, contacts 423, conductor 394, wiper 350 and terminal #15 of the "code control" bank, conductor 371, contacts 461, contacts 441, contacts 418 and contacts 409 to ground. The switch advances in its usual manner to terminal #16. Relay 400 is energized over the following circuit: negative battery, over the winding of relay 400, contacts 460, contacts 423, conductor 394, wiper 350 and terminal #16 of the "code control" bank, contacts 316, contacts 313, conductor 371, contacts 461, conductor 372, contacts 441, contacts 418 and 409 to ground.

Sending relay 400 operates and advances the switch to terminal #17. Sending relay 400 operates over the same circuit except that the circuit comprises terminal #17 and a strap between terminals #17 and #16. This circuit is not a "start from stop" circuit but is a continuing stepping circuit only, being over contacts 418. The switch advances to terminal #18.

Sending relay 400 operates over the following circuit: negative battery, over the winding of relay 400, contacts 460, contacts 423, conductor 394, wiper 350 and terminal #18 of the "code control" bank, contacts 313, conductor 371, contacts 461, conductor 372, contacts 441, contacts 418 and contacts 409 to ground. Sending relay 400 operates and the switch advances to terminal #19 in the usual manner, whereupon, no further circuit to sending relay 400 is found and relays 400 and 415 release.

Reviewing, it can be seen that if the trip key 314 had been operated, circuits for relay 400 would have been found to advance the switch as far as terminal #18, which is disconnected by the trip key 314. Also, if the check key 309 had been operated, circuits for sending relay 400 would have been found to advance the switch as far as terminal #16 which is disconnected by open contacts 313 and 316 of the close and trip keys respectively. It may be assumed that the switch has been advanced to terminal #16, #18 or #19 according to which key had been depressed.

If the trip key 314 or close key 311 has been operated, the associated device at the selected substation is operated accordingly.

When the check key 309, trip key 314, or close key 311 was operated and the system switch advanced to terminal #16, #18, or #19, the substation thereafter places pulses on the line, operating and releasing line relay 407 which operates the switch magnet 380. The switch is driven to either terminal #20 or #21 depending upon whether controlled device 709 is in the tripped or closed condition.

If the switch is stopped on terminal #20 to report trip supervision, the control station can start return pulsing by completing an energizing circuit for relay 400 from negative battery, over the winding of relay 400, contacts 460, contacts 423, conductor 394, wiper 350 and terminal #20 of the "code control" bank, conductor 398, contacts 440 and 409 to ground. Sending relay 400 operates and the switch then steps to terminal #21, whereupon a circuit for sending relay 400 over terminal #21 and strapping to terminal #20 is completed. If the switch had stopped on terminal #21, the same circuit would energize the winding of sending relay 400. Accordingly, the control station drives the switch to terminal #22. If controlled device indication relay 220a is operated (indicating that the controlled device is closed), no circuit for sending relay 400 is found and the switch stops, relay 400 having placed pulses on the line to indicate close supervision check to the selected substation.

However, if controlled device indication relay 220a is released (indicating that the controlled device is tripped) sending relay 400 is energized over a circuit extending from negative battery, over the winding of relay 400, contacts 460, contacts 423, conductor 394, wiper 350 and terminal #22 of the "code control" bank, conductor 276, contacts 223, contacts 236, conductor 257, contacts 418 and contacts 409 to ground. Sending relay 400 operates and effects advancement of the switch to terminal #23 whereupon it stops with no circuit to sending relay 400, which has placed pulses on the line to indicate trip supervision check to the selected substation.

The selected substation then places pulses on the line to drive the control station switch to terminal #25 or #26 depending upon whether or not the monitored device is in the normal or alarm condition.

If the switch had landed on terminal #25, indicating normal supervision, an energizing circuit for sending relay 400 extends from negative battery, over the winding of relay 400, contacts 460, contacts 423, conductor 394, wiper 350 and terminal #25 of the "code control" bank, conductor 398, contacts 440 and 409 to ground. Sending relay 400 operates and effects advancement of the wipers of switch 302 to terminal #26.

Thereupon a circuit for sending relay 400 involving terminal #26 and #25 is found and relay 400 operates, driving the switch to terminal #27. If monitored device indication relay 200a is up indicating alarm, no circuit is found for relay 400, and the switch stops on terminal #27, relay 400 having pulsed the line to indicate alarm supervision check to the selected substation.

If relay 200a is down indicating normal supervision, sending relay 400 is energized over a circuit extending from negative battery, over the winding of relay 400, contacts 460, contacts 423, conductor 394, wiper 350 and terminal #27 of the "code control" bank, conductor 252, contacts 206, contacts 237, conductor 257, contacts 418 and contacts 409 to ground. Sending relay 400 operates and effects stepping of the switch wipers to terminal #28 where they then stop, no re-energizing circuit for relay 400 being found. Sending relay 400 has pulsed the line to indicate to the substation normal supervision check.

Thereupon whether the switch stopped on terminal #27 or #28 the selected substation pulses the line to drive the switch to terminal #29.

Reset control relay 455 is operated over the "selection" bank, and locks to ground over an obvious circuit. Reset control relay 455 at its contacts 458 completes an obvious energizing circuit for reset control relay 465. Relay 455 at its contacts 459 completes an energizing circuit for sending relay 400 extending from negative battery, over the winding of relay 400, and contacts 459 to ground. Relay 400 effects operation of line relay 407 which is operated long enough to effect release of relay 410 and hold it de-energized. The switch magnet 380 and self-interrupting contacts 381 functions from ground over the off-normal contacts 387, contacts 381, conductor 379, contacts 413 and stepping magnet circuit 380' to drive the switch to terminal #30, whereupon it stops, where the off-normal contacts 387 interrupts the self-interrupting circuit.

C. *Control station switch "hold" bank*

By reference to the "selection" bank, it can be seen that when a substation initiates reporting and sends pulses to select a substation selection relay (230a–230j) at the control station, receiving control relay 420 operates auxiliary test relay 425 which is locked to ground over contacts 439. An interval after the cessation of pulses, relay 420 releases and at its contact 422 completes an operating circuit for the substation selection relay (230a–230j) which operates.

Thereupon station selection interlock relay 435 operates and at its contacts 439 interrupts the holding circuit for relay 425 which releases. It should be noted that relay 425 releases rapidly. Accordingly, if the station selection pulses received from the substation should be off in time for any reason such as a defective transmission line so as to allow receiving control relay 420 to follow the pulses rather than remain operated during pulsing, substation selection relay 230a–230j and station selection interlock relay 435 are operated, no further holding circuit for relay 425 is available and the quick release of relay 425 prevents any further selection of another substation selection relay 230a–230j. It should be noted that unless relay 425 were fast releasing, plural selections of relays 230a–230j might occur under certain circumstances. Accordingly, since auxiliary test relay 425 is a fast releasing relay it is necessary to hold relay 425 locked on any point where selection occurs. The "hold" band of switch 302 is for this purpose.

Referring now to the "hold" bank of switch 302 it should be noted that the circuit for operating control station initiating marking relay 445 through contacts of selection keys 248a–248j over bank terminal #30 passes over contacts 427, the circuit extending from negative battery, over the winding of relay 445, conductor 256, contacts 245, (any other contacts of selection keys in accordance with the desired substation) conductor 258, terminal #30 and wiper 360 of the "hold" bank, conductor 396 and contacts 427 to ground. Accordingly if a selection key is operated, the control station cannot initiate sending if a substation has begun to send and the auxiliary test relay 425 is operated.

Terminals #1 and #2 of the "hold" bank provide a holding circuit for relay 425 so that reset control relay 455 can be operated for reset over terminals #1 and #2 of the "selection" bank when the substation is the initiating station or if one or two transients are received. This holding circuit is as follows: from negative battery, over the winding of relay 425, contacts 426, conductor 396, wiper 360 and terminal #1 or #2 of the "hold" bank, strapping to terminal #12 thereof, conductor 375, contacts 449, contacts 419, and contacts 439 to ground.

If the wiper of the "selection" bank stops on terminal #13 or #15 a circuit is completed over contacts 428 of relay 425 for reset control relay 455 which circuit extends from negative battery, over the winding of relay 455, contacts 456, conductor 392, terminals #13 or #15 and wiper 340 of the "selection" bank, conductor 395, contacts 428 and contacts 422 to ground.

Reset control relay 455 operates and effects reset of the auxiliary test relay 425.

Terminals #3–#12 of the "hold" bank provide the above described holding circuit for relay 425 to allow substation selection relay 230a–230j to be operated over a terminal #3–#12 of the "selection" bank when a substation is the initiating station. When relay 435 operates, it is effective at its contacts 439 to interrupt the holding circuit for the auxiliary test relay 425 which restores.

If the system should stop on terminal #13 when the substation is sending for any reason or under any circumstance relay 425 is held from positive potential over terminal #13 of the "hold" bank so that reset control relay 455 can be operated over terminal #13 of the "selection" bank. Reset control relay 455 operates and effects restoration of relay 425.

Terminal #14 of the "hold" bank provides a holding circuit for relay 425 from negative battery, over the winding of relay 425, contacts 426, conductor 396, wiper 360 and terminal #14 of the hold bank conductor 376 and contacts 431 to ground. Relay 425 holds and at its contacts 428 and completes an operating circuit for the station selection code stop relay 430 which can be operated over terminal #14 of the "selection" bank to indicate that the substation has successfully transmitted station check pulses when the control station is the initiating station. After relay 430 operates, relay 425 is released when the substation is the initiating station, and the control station sends station check pulses to advance the wipers of switch 302 to terminal #14.

There is no occasion for a substation to be sending to drive the control station switch to terminals #15–#19 (this being a range distinctly under control of the control station). Accordingly ground strapped to these terminals of the "hold" bank provides a holding circuit for relay 425 so that reset control relay 455 can be operated via the "selection" bank should a receiving condition drive the control station switch to one of these points.

Normally a substation drives the control station switch to point #20 to report that the controlled device is in the tripped condition. If controlled device indication relay 220a is non-operated (indicating trip with green lamp lighted) there is no need for releasing relay 220a (by operating indication control relay 470 over "selection" bank and applying ground to the circuit of relay 220a over the "indication" bank), and accordingly the holding circuit of auxiliary test relay 425 will be open at the open contacts 222. However, if relay 220a is operated (indicating close with red lamp lighted), relay 220a must be shunted down. Accordingly a holding circuit is provided for relay 425 so that indication control relay 470 can be operated over the "selection" bank. The holding circuit of relay 425 is as follow: from negative battery, over the winding of relay 425, contacts 426, conductor 396, wiper 360 and terminal #20 of the hold bank, conductor 275, contacts 222 and contacts 233 to ground.

Similarly, a holding circuit for auxiliary test relay 425 is provided over "hold" bank terminal #21 so that indication control relay 470 can be operated over the "selection" bank and negative battery applied to relay 220a to operate same for close indication if relay 220a is found non-operated upon stopping on terminal #21. The holding circuit of relay 425 is as follows: negative battery, over the winding of relay 425, contacts 426, conductor 396, wiper 360 and terminal #21 of the "hold" bank, conductor 274, contacts 221 and contacts 233 to ground.

The control station switch does not stop on terminal #22, #23, or #24 as a result of received pulses. Accordingly, a holding circuit for relay 425 enables the "selection" bank to operate reset relay 455, if the switch stops on any of these points as a result of substation sending (or transients).

A holding circuit for relay 425 is provided over "hold" terminal #25 if the monitored device indication relay 200a is found operated (indicating alarm) so that indication control relay 475 can be operated over the "selection" bank terminal #25 and ground can be applied over "indication" bank terminal #25 to shunt relay 200a causing it to release to indicate "normal."

Similarly, a holding circuit for relay 425 is provided over "hold" terminal #26 if the monitored device indication relay 200a is found non-operated (indicating normal) so that indication control relay 425 can be operated over terminal #26 of the "selection" bank and negative battery can be applied over terminal #26 of the "indication" bank to operate relay 200a causing it to indicate "alarm."

The control station switch does not stop on terminals #27 or #28 as a result of receiving and accordingly these terminals are strapped to ground to provide a holding circuit for relay 425 so that reset control relay 455 may be operated if such condition arises. It should be remembered that the control station drives the switches to terminal #27 or #28.

The substation in signaling communication with the control station, sends a reset pulse to drive the wipers of the thirty-point switches to terminal #29. A holding circuit for relay 425 is provided so that reset control relay 455 can be operated over the "selection" bank.

Thereupon the long reset signal causes the wipers of the thirty-point switches at the control station and all substations to advance to terminal #30.

D. *Control station switch "indication" bank*

If a substation drives the control station switch to terminal #20, stopping thereon, ground over terminal #20 and wiper 370 of the "indication" bank, conductor 377, and contacts 483 is applied to the contacts 471 of indication control relay 470. If relay 470 is operated over the "selection" bank as a result of the holding of auxiliary test relay 425 over the "hold" bank when relay 220a is in the operated position (indicating close), this ground over contacts 228 of substation selection relay 230a at the control office, shunts relay 220a which releases to indicate "trip."

If a substation drives the control station switch to terminal #21, stopping thereon, negative battery over resistor 326, terminal #21 and wiper 370 of the "indication" bank, conductor 377, and contacts 483 is applied to contacts 471 of relay 470. If relay 470 is operated over the "selection" bank when relay 420 is held over the "hold" bank when controlled device indication relay 220a is in the non-operated position (indicating trip), this negative potential over contacts 228 of the substation selection relay 230a at the control office, operates relay 220a, which then indicates "close."

If a substation drives the control station switch to terminal #25, stopping thereon, ground over terminal #25 and wiper 370 of the "indication" bank, and contacts 483 is applied to contacts 476 of indication control relay 475. If relay 475 is operated over the "selection" bank as a result of the holding of auxiliary test relay 425 over the "hold" bank when monitored device indication relay 200a is in the operated position (indicating alarm), this ground through contacts 231 of the substation selection relay 230a at the control office, shunts relay 200a associated with relay 230a. Relay 200a releases to indicate "normal."

If a substation drives the control station switch to terminal #26, stopping thereon, negative battery, over a resistor 326, terminal #26 and wiper 370 of the "indication" bank and contacts 483 is applied to contacts 476. If relay 470 is operated over the "selection" bank when relay 425 is held over the "hold" bank while relay 200a is in the non-operated position (indicating normal), this negative potential over contacts 231 of the station selection relay 230a at the control office, operates relay 200a associated with relay 230a. Relay 200a in the operated position then indicates "alarm."

E. *Substation switch "stepping" bank*

The substation switch may be driven initially by:
(a) The control station
(b) The same substation
(c) Another substation If the substation switch is driven initially by the same substation in reporting a change of indication, the setting of the ten-point manual switch corresponds to the position to which the wipers of thirty-point switch are driven (for example, if the substation is substation #1 with the ten-point manual switch 611 set on terminal #1, the thirty-point switch 604 is driven to terminal #3). In this case the operation of line relay 500 when the control station sends station check pulses, provides a circuit to operate receiving control relay 510 which circuit extends from negative battery, over the winding of relay 510, contacts 521, contacts 532, conductor 560, wiper 650 and terminal #1 of the manual switch, strapping to terminal #3 of the "stepping" bank of switch 604, wiper 610 thereof, conductor 569, and contacts 501 to ground. Also a circuit is completed for the switch magnet 608 extending from negative battery, over the winding of switch magnet 608, conductor 563, contacts 541, conductor 560, wiper 650 and terminal #1 of the manual switch 611, strapping to terminal #3 and wiper 610 of the "stepping" bank of switch 604, conductor 569 and contacts 501 to ground.

Receiving control relay 510 operates and at its contacts 511 completes a circuit for itself and switch magnet 608, independent of the switch banks. Accordingly, the switch is responsive to station check pulses received by the control station to drive the thirty-point switch to terminal #14.

However, if the substation switch is driven initially by another substation in reporting a change of indication a lack of correspondence results between the setting of the ten-point switch and the position to which the thirty-point switch is driven. For example, the substation is substation #1, but substation #2 is reporting and drives the thirty-point switch to terminal #4. If we now trace the circuit of relay 510 and the switch magnet 608, we will find the circuit interrupted at terminal #3 of the thirty-point switch (the wiper being on terminal #4). Accordingly, the switch is non-responsive to station check pulses received from the control station and remains on terminal #4, locked out.

If the substation is driven initially by the control station to a position which corresponds to the setting of the manual switch 611, the rotary switch 604 is responsive to further received pulsing as the said substation is the selected substation and starts sending station check pulses. This is apparent if one assumes manual switch setting #1 and rotary switch 604 terminal #3, for example, for selecting station #1.

However if the substation is driven initially by the control station to a position which does not correspond to the setting of the manual switch 611 (assume manual switch 611 setting #1 and rotary switch 604 terminal #4, for example, with the control station having selected station #2), the switch is not responsive to station check pulses sent by substation #2.

As station selection and lock-out is accomplished on terminals #3-#12 of the "selection" bank, the remaining points #13-#29 are strapped together and to terminal #30 to provide a bridging circuit for contacts 511 to allow receiving control relay 510 and the switch magnet 608 of the selected substation to operate on incoming pulses as further operations require. It should be noted that the "stepping" bank of the thirty-point switch is a means of selectively bridging contacts 511 of receiving control relay 510 to make itself and the switch magnet 608 receptive to incoming pulses.

F. *Substation switch control bank*

If the substation thirty-point switch ever rests on point #1 or #2, reset control relay 540 is shunted down to reset the substation.

Assuming that the thirty-point switch has been driven to terminals #14 by the selected substation, or by the control station with relays 510 and 530 released, a circuit is completed to operate code checking relay 690 which prepares for the control station to advance the wipers of the rotary switch to terminals #16, #18 or #19 or for the substation to advance the thirty-point switch to terminals #20 or #21.

If the control station drives the switch to terminal #18, a circuit is completed to the trip magnet when relay 510 releases: the circuit extending from negative battery, over the winding of trip coil 740, conductor 686, terminal #18 and wiper 620 of the "control" bank of switch 604, conductor 566, contacts 512, contacts 534, contacts 524, contacts 543, and contacts 502 to ground.

If the control station drives the switch to terminal #19 instead of #18, a circuit is completed to the close magnet when relay 510 releases, the circuit extending from negative battery, over the winding of close coil 750, conductor 685, terminal #19 and wiper 620 of the "control" bank, conductor 566, contacts 512, contacts 534, contacts 524, contacts 543, and contacts 502 to ground.

If the control station drives the switch to terminal #22, for close supervision check after a close operation or a close reporting, when receiving control relay 510 releases, a circuit is completed to reoperate controlled device change of indication relay 720 as follows: from negative battery, over the upper winding of relay 720, contacts 702, contacts 704, conductor 684, terminal #22 and wiper 620 of the "control" bank, conductor 566, contacts 512, contacts 534, contacts 524, contacts 543, and contacts 502 to ground.

However, if the control station drives the switch to terminal #23 instead of #22 for trip supervision check after a trip operation or a trip reporting, when relay 510 releases, a circuit is completed to reoperate controlled device change of indication relay 720 as follows: negative battery, over the lower winding of relay 720, contacts 703, contacts 705, conductor 683, terminal #23 and wiper 620 of the "control" bank, conductor 566, contacts 512, contacts 534, contacts 524, contacts 543 and contacts 502 to ground.

If the control station drives the switch to terminal #27 for alarm supervision check after a check operation or an alarm reporting. When relay 510 releases, a circuit is completed to reoperate monitored device change of indication relay 770 as follows: negative battery over the upper winding of relay 730, contacts 714, contacts 712, conductor 682, terminal #27 and wiper 620 of the control bank, conductor 566, contacts 512, contacts 534, contacts 524, contacts 543 and contacts 502 to ground.

However if the control station drives the switch to terminal #28 instead of #27 for normal supervision check after a check operation or a normal reporting, when relay 510 releases, a circuit is completed to operate monitored device change of indication relay 730 as follows: negative battery, over the lower winding of relay 730, contacts 715, contacts 713, conductor 681, terminal #28 and wiper 620 of the "control" bank, conductor 566, contacts 512, contacts 534, contacts 524, contacts 543 and contacts 502 to ground.

G. *Substation switch "code start" bank and "code stop" bank circuits of sending relay 580*

The "code start" bank and "code stop" bank are concerned with the substation operation of the sending relay 580 to place pulses on the line. The "code start" bank is concerned with the initial operating of sending relay 580 to start a series of pulses and the "code stop" bank is concerned with maintaining relay 580 pulsing until the end of the series of pulses. Reset control relay 540 and relays 720 and 730 are normally operated. Also relays 700 and 710 may be operated or non-operated according to the position or condition of the controlled and monitored devices.

Assuming that the substation shown is substation #1, the ten-point manual switch is set to position #1 the terminals of which are strapped to the corresponding #3 terminals of the thirty-point switch in the various banks. With the thirty-point switch normally resting on terminal #30, the circuit of relay 580 is open.

However, if either relay 720 or relay 730 releases due to a functioning of relay 700 or 710 as a result of the change of position or condition of the controlled or monitored device respectively, a circuit is established for sending relay 580. The circuit for relay 580 over contacts of 720 extends from negative battery, over the winding of relay 580, contacts 513, conductor 568, contacts 725, conductor 672, terminal #30 and wiper 640 of the "code start" bank, wiper 630 and terminal #30 of the "code stop" bank, strapping to terminal #1 thereof, conductor 565, contacts 543, and contacts 502 to ground. The circuit for relay 580 over contacts of relay 730 extends from negative battery, over the winding of relay 580, contacts 513, conductor 568, contacts 724, contacts 735, conductor 672, terminal #30 and wiper 640 of the "code start" bank, wiper 630 and terminal #30 of the "code stop" bank, strapping to terminal #1 thereof, conductor 565, contacts 543, and contacts 502 to ground.

Sending relay 580 operates and effects advancement of the wipers of switch 604 to terminal #1 and at its contacts 584 completes an energizing circuit for the auxiliary sending relay 520. Relay 520 operates and at its contacts 511 completes an obvious energizing circuit for the outgoing code marking relay 530. On terminals #1 a circuit is found to pulse relay 580 extending from negative battery, over the winding of relay 580, contacts 513, contacts 525, conductor 567, wiper 630 and terminal #1 of the "code stop" bank, conductor 565, contacts 543 and contacts 502 to ground.

Sending relay 580 operates and effects the advancement of the wipers of switch 604 to terminal #2. On terminal #2 the following circuit is found to operate relay 580: negative battery, over the winding of relay 580, contacts 513, contacts 525, conductor 567, wiper 630 and terminal #2 of the "code stop" bank, strapping to terminal #1, conductor 565, contacts 543, and contacts 502 to ground.

Sending relay 580 operates and effects the advancement of the wipers of switch 604 to terminal #3.

The switch may have been advanced to terminals #3 as described above or it may have been advanced to terminals #3 by pulses originating at the control station to select station #1.

However, the only situation in which the substation is capable of stepping the switch from terminal #3 (assuming the substation to be substation #1) is following a station selection from the main station, and not a substation reporting of a change of indication. Accordingly, with relays 720 and 730 in the operated position, a circuit is established for sending relay 580 extending from negative battery, over the winding of relay 580, contacts 513, conductor 568, contacts 724, contacts 734, conductor 676, wiper 680 and terminal #1 of the manual switch 611, terminal #3 and wiper 640 of the "code start" bank, wiper 630 and terminal #3 of the "code stop" bank, terminal #1 and wiper 670 of the ten-point manual switch 611, conductor 566, contacts 512, contacts 534, contacts 524, contacts 543 and contacts 502 to ground.

Sending relay 580 operates and effects advancement of the wipers of switch 604 to terminal #4.

A circuit is then found to cause sending relay 580 to continue pulsing, such circuit extending from negative battery, over the winding of relay 580, contacts 513, contacts 525, conductor 567, wiper 630 and terminal #4 of the "code stop" bank, terminal #2 and the slip ring 677 of switch 611, conductor 565, contacts 543 and contacts 502 to ground.

Sending relay 580 operates and effects advancement of the wipers of switch 604 to terminal #5.

Similarly, circuits are found to pulse relay 580 over each of the succeeding terminals #5–#12 of switch 604, which lands the switch on terminal #13. It should be observed that if the substation is substation #1 but the control station sends enough station control pulses to select another substation, for example substation #2, no start up circuit for relay 580 will be established because of the interruption of the following circuit: negative battery, over the winding of relay 580, contacts 513, conductor 568, contacts 724, contacts 734, conductor 676, wiper 680 and terminal #1 of the switch 611, terminal #3 of the "code start" bank to an open circuit.

Accordingly, station #1 would remain locked-out until reset. Also it should be observed that if the station shown were substation #2, and the control station had advanced the thirty-point switch to terminal #4 with the ten-point manual switch set to terminal #2, the start-up circuit for relay 580 extends from negative battery, over the winding of relay 580, contacts 513, conductor 568, contacts 724, contacts 734, conductor 676, wiper 680 and terminal #2 of the ten-point switch 611, terminal #4 and wiper 640 of the "code start" bank of switch 604, wiper 630 and terminal #4 of the "code stop" bank, terminal #2 and wiper 670 of switch 611, conductor 566, contacts 512, contacts 534, contacts 524, contacts 543 and contacts 502 to ground. The thirty-point switch steps to terminal #5. A "keep-pulsing" circuit for relay 580 would then be found as follows: negative battery, over the winding of relay 580, contacts 513, contacts 525, conductor 567, wiper 630 and terminal #5 of the "code stop" bank, terminal #3 and slip ring 677 of switch 611, conductor 565, contacts 543 and contacts 502 to ground. Similar keep-pulsing circuits would be found for relay 580 on terminals #6–#12, landing the switch on terminal #13. In the latter case one less pulse would be sent.

On terminal #13 a keep-pulsing circuit is found for relay 580 as follows: negative battery, over the winding of relay 580, contacts 513, contacts 525, conductor 567, conductor 630 and terminal #13 of the "code stop" bank, conductor 565, contacts 543 and contacts 502 to ground. The thirty-point switch steps to terminal #14 under the influence of sending relay 580. On terminal #14 the keep-pulsing circuit of relay 580 is open so that relays 520 and 530 may release to operate code checking relay 690 (see substation switch "control" bank), when the switch is being driven by the substation. Relay 690 operates similarly upon the release of relay 510 if the switch is being driven by the control station.

If the substation is reporting an automatic change, relay 580 has a start-up circuit on terminal #14 extending from negative battery, over the winding of relay 580, contacts 513, conductor 568, contacts 725 (assuming the controlled device changed) or contacts 724 and contacts 735 (assuming the monitored device changed), conductor 672, terminal #14 and wiper 640 of the "code start" bank, wiper 630 and terminal #14 of the "code stop" bank, strapping to terminal #15 thereof, contacts 692, conductor 565, contacts 543 and contacts 502 to ground.

If the substation starts up from terminal #14 (or #16, #18 or #19) it should not stop until the switch arrives at least on terminal #20. Accordingly, relay 580 can find a keep-pulsing circuit on each terminal #15, #16, #17, #18 and #19 extending from negative battery, over the winding of relay 580, contacts 513, contacts 525, conductor 567, wiper 630 and terminal #14, #15, #16, #17, #18 or #19, contacts 692, conductor 565, contacts 543, and contacts 502 to ground.

However if the control station advances the switch from terminal #14 to terminal #16 for indication checking, the substation must have the ability to start up on terminal #16 and a start-up circuit for relay 580 extends from negative battery, over the winding of relay 580, contacts 513, conductor 568, terminal #16 and wiper 640 of the "code start" bank, wiper 630 and terminal #16 of the "code stop" bank, contacts 692, conductor 565, contacts 543 and contacts 502 to ground.

Also if the control station advances the switch to terminals #18 for trip, the substation must have the ability to start-up from terminal #18 after trip has occurred. Accordingly, sending relay 580 has a start-up circuit as follows: negative battery, over the winding of relay 580, contacts 513, conductor 568, conductor 687, contacts 708, conductor 675, terminal #18 and wiper 640 of the "code start" bank, wiper 630 and terminal #18 of the "code stop" bank, contacts 692, conductor 565, contacts 543, and contacts 502 to ground.

If the control station advances the switch to terminals

19 for close, the substation must have the ability to start-up from terminal #19 after close has occurred. Accordingly, relay 580 has a start-up circuit as follows: negative battery, over the winding of relay 580, contacts 513, conductor 568, conductor 687, contacts 707, conductor 674, terminal #19 and wiper 640 of the "code start" bank, wiper 630 and terminal #19 of the "code stop" bank, contacts 692, conductor 565, contacts 543 and contacts 502 to ground.

Sending relay 580 operates and effects advancement of switch 604 to terminal #20. The switch must be arranged so that it cannot start up from point #20 by means of pulses from sending relay 580. If, however, relay 700 is in the operated position, the switch should be able to pass over terminals #20 to land on terminals #21 for close supervision. Accordingly with relay 700 operated a keep-pulsing circuit for relay 580 extends from negative battery, over the windings of relay 580, contacts 513, contacts 525, conductor 567, wiper 640 and terminal #20 of the "code stop" bank, conductor 671, contacts 706, conductor 688, conductor 565, contacts 543, and contacts 502 to ground.

The switch must be arranged so that it does not start up or keep going by means of pulses from sending relay 580 as the control station advances it beyond or off these terminals for close supervision check or trip supervision check as the case may be.

The switch should be arranged to start up from terminals #22 or #23 after close supervision check or trip supervision check and should keep going at least to terminals #25. Accordingly relay 580 has the following start-up circuit: negative battery, over the winding of relay 580, contacts 513, conductor 568, terminal #22 and wiper 640 of the "code start" bank, wiper 630 and terminal #22 of the "code stop" bank, conductor 565, contacts 543 and contacts 502 to ground. The keep-pulsing circuit is as follows: negative battery, over the winding of relay 580, contacts 513, contacts 525, conductor 567, wiper 630 and terminal #23 of the "code stop" bank, strapping to terminal #22, conductor 565, contacts 543 and contacts 502 to ground. Accordingly the switch will advance to at least terminal #25.

If the monitored device is in the normal condition (relay 710 in the non-operated position), sending relay 580 has no keep-pulsing circuit as its circuit is open at contacts 716. However, if the monitored device is in the alarm condition (relay 710 in the operated position), relay 580 has a keep-pulsing circuit as follows: negative battery, over the winding of relay 580, contacts 513, contacts 525, wiper 630 and terminal #25 of the "code stop" bank, conductor 689, contacts 716, conductor 673, conductor 565, contacts 543 and contacts 502 to ground. The switch then steps to terminals #26.

The control station steps the switch to either terminal #27 or #28 as the case may be for alarm supervision check or normal supervision check.

The substation should be able to start up from either terminal #27 or terminal #28 after relay 510 releases and keep going to terminal #29. Accordingly relay 580 has a start-up circuit as follows: negative battery, over the winding of relay 580, contacts 513, conductor 568, terminal #28 and strapping to terminal #27 of the "code start" bank, wiper 640 thereof, wiper 630 and terminal #27 of the "code stop" bank, conductor 565, contacts 543 and contacts 502 to ground. Relay 580 also has a keep-pulsing circuit as follows: negative battery, over the winding of relay 580, contacts 513, contacts 525, conductor 567, wiper 630 and terminal #27 of the "code stop" bank, conductor 565, contacts 543 and contacts 502 to ground. Accordingly the switch advances to terminals #29 where the start-up or keep-pulsing circuit for relay 580 is interrupted. The control station drives the switch to terminals #30. At this time relays 720 and 730 will be in the operated position (assuming no change of condition has occurred) and no further circuit for relay 580 obtains.

Reset

1. CONTROLLED BY CONTROL STATION

Reset relay 455 at the control station can be operated by depressing the reset key, or over certain terminals of the "selection" bank. Relay 455, when operated, locks over make-before-break contacts 457 and 466 to ground. Relay 455 also completes the obvious circuit to energize relay 465 which is of the "five seconds to operate" type. Relay 455 transfers the control of sending relay 400 directly to itself at contacts 459, operating relay 400 over an obvious circuit.

Relay 400 connects ground over contacts 401 and resistor 489 to line conductor 485, and connects negative battery over contacts 403 to line conductor 486, operating line relay 407 at the control station and the corresponding line relay at each substation.

At the control station, line relay 407 operates and at its contacts 409 interrupts the circuit of reset relay 410 which releases after an interval, removing ground from all connections at contacts 411, thus causing the de-energization of all circuits connected to ⊕ and the release of any relays as connected. At contacts 412, switch magnet 380 is energized (assuming the switch off-normal with the off-normal contacts connecting ground to the switch contacts lever), over a circuit extending over stepping magnet circuit 380', contacts 413, conductor 379, contacts 381, and contacts 387 to ground. The switch magnet 380 operates, in turn opening its contacts 381 which releases the switch manget 380, advancing the switch. The release of the switch contacts re-energizes step magnet 380. Accordingly the switch drives itself to terminals #30 at which the off-normal contacts 387 open, removing ground and stopping the switch 302. After the five second interval has expired, relay 465 operates, and at its contacts 466 interrupts the holding circuit of relay 455. After an interval, relay 455 releases, in turn releasing relay 465 and opening the circuit of sending relay 400. After an interval relay 400 releases, in turn releasing line relay 407. The release of relay 407 re-establishes the circuit of reset relay 410 which further opens the self-energizing circuit for the switch magnet 380 and re-establishes operating positive potential ⊕ at contacts 411.

At each substation line relay 500 (for a typical substation) operates and at its contacts 502 interrupts the holding circuit of reset control relay 540. After an interval relay 540 releases, and at its contacts 543 interrupts its own holding circuit. Relay 540 at its contacts 542 connects the switch magnet 608 in a self-energizing circuit extending from negative battery, over the winding of relay 608, conductor 563, contacts 542, conductor 562, contacts 609 and contacts 602 to ground, which causes the switch to advance to terminals #30 in the previously discussed manner. When the switch arrives at terminals #30 and the off-normal contacts 602 open and contacts 601 close, a circuit is prepared to reoperate relay 540. When the long reset pulse is terminated, relay 500 releases and at its contacts 502 completes an energizing circuit for reset control relay 540 extending from negative battery, over resistor 503, the winding of relay 540, conductor 565, contacts 601, conductor 561, and contacts 502 to ground.

Reset relay 540 operates and at its contacts 543 completes a locking circuit unresponsive to fast pulses but responsive to the next reset pulse.

2. CONTROLLED BY SUBSTATION

If the thirty-point switch stops on terminal #1 or #2, a circuit is completed to shunt relay 540 as follows: one end of the winding of relay 540, contacts 524, contacts 534, contacts 512, conductor 566, wiper 620 and terminal #1 or #2 of the "control" bank, and conductor 564 to the other end of the winding of relay 540. Relay 540 releases, causing the switch to advance to terminal #30. After the switch leaves points #1 and #2 and the shunt is removed, relay 540 cannot reoperate until terminal #30 is reached because its holding circuit is opened at contacts 543 and the operating circuit is not closed until terminal #30 is reached. When reset is originated at a substation, sending relay 580 is not operated and no reset signal is placed on the line and accordingly the reset is just local.

3. RESET UPON RECEIPT OF TRANSIENTS

If the control station receives one or two transients stopping on terminals #1 or #2, when relay 420 releases (relay 425 is held over the "hold" bank), reset control relay 455 is energized over a circuit extending from negative battery, over the winding of relay 455, contacts 456, conductor 392, terminal #1 or #2 and wiper 340 of the "selection" bank, conductor 395, contacts 428, and contacts 422 to ground.

Reset control relay 455 operates and effects reset of the control station and all the substations.

If the substation receives one or two transients, stopping on terminals #1 or #2, relay 540 is shunted and the substation resets itself.

If both control station and substation receive 1 or 2 transients, the control station resets itself and places a reset pulse on the line which operates the line relay at each substation. Any substation which did not receive a transient or transients is thus reset. The substation which received the transient or transients along with the control station is in the process of resetting itself when its line relay receives the reset signal from the control station and relay 540 must await the end of the reset signal before it operates.

CONCLUSION

The present invention is directed to the provision of a new and novel supervisory control system in which the operating condition of a number of remotely located substations is made manifest at a control station. The control station equipment not only indicates the condition of operation of the equipment at the control station, but also provides means for controlling or changing the condition of the equipment at each substation. The controlling functions as they are being performed are evidenced by means of indicating lights which show the completion of each step thereof.

Consequently, the dispatcher at the control station is kept constantly informed as to the progress of each control step and is in a position to refrain from further control functions upon the failure of the equipment at a substation to properly perform its desired function. In this way compounding of errors is avoided.

Additionally a more positive control over the operation of the equipment at each substation is afforded by the effective lock-out features of the supervisory system of the present invention in which the equipment at a non-selected or non-reporting substation is unaffected by pulsations indicative of control functions. While only the equipment at a given substation is being affected by the control functions of the control station, the selective equipment at each of the other substations is made non-responsive to the signals utilized and communication for control and supervision is effective at only the selected substation.

The obvious advantages which flow from the ease with which substation equipment may be replaced in case of operational difficulties or for any other reason make the use of the supervisory system of the present invention particularly desirable.

Various rearrangements, modifications and changes may be made in the preferred embodiment of the invention herein disclosed without departing from the scope thereof as defined by the appended claims.

I claim:

1. In a supervisory system having a control station and a number of substations positioned in numerically ascending order, a communication channel for extending groups of impulse sets between the stations, each impulse group having the same number of impulses and including a station selection set; a plurality of selection circuits at each station, certain of which are station selection circuits; switching means at each station having access to said selection circuits over a plurality of sequentially arranged steps and operative to advance over each of said steps in a single cycle responsive to receipt of a group of impulse sets on said channel; impulse responsive means comprising means at the control station and at each substation including a stepping circuit for operating said switching means responsive to the station selection impulse set of a group of said channel to select corresponding ones of said circuits at each station, means at each station operative responsive to the termination of receipt of the station selection impulse set to display the stepping means thereat, means at only the selected station and the control station operative to re-enable said stepping means, whereby said switching means at each substation at which the selection of station selection circuits other than its assigned station selection circuits is made are stopped at its point of advancement during the period of receipt of the remaining impulse sets of the group prior to reset; at least one controlled device at each substation, means at each substation for reporting a change of condition of said controlled device to the control station, and means including said impulse responsive means operative responsive to an attempt by more than one substation to simultaneously report a change-of-condition of its associated device to control the switching means at its substation to select the station selection circuit associated with the one of the reporting substations having the highest order position, whereby the other reporting substations are temporarily locked out.

2. A supervisory control system as set forth in claim 1 in which each substation includes memory means operative during lockout thereof to retain said change-of-position information, and means controlled by said memory means to reinstate the reporting thereof following lockout.

3. In a supervisory control system comprising a control station interconnected by a communication channel with a plurality of substation positions, each of which positions has a different station selection and identification code signal preassigned thereto, a plurality of substation units adapted for use at the various positions in said system including signal means for receiving and transmitting impulse signals including selection and identification code signals, switch means in each substation unit adjustable to each of a number of settings, and means controlled by said switch means in each of its different settings to adapt said unit for use at a correspondingly different position in the system including means for controlling said signal means to respond to a correspondingly different station selection code signal on each different setting, and to transmit a correspondingly different code identification signal at each different setting.

4. In a supervisory control system comprising a control station interconnected by a communication channel with a plurality of substation positions, each of which positions has a different station selection and identification code signal preassigned thereto, a plurality of substation units adapted for use at the various substation positions in said system including signal means for receiving and transmitting impulse signals, manually operable switch means in each substation unit adjustable to each of a number of settings, means controlled by said manually operable switch means in each of its different settings to adapt said unit for use at a correspondingly different position in the system including means for controlling said signal means to respond to a correspondingly different code signal at each different setting and to transmit a correspondingly different code identification signal at each different setting, and switch connecting means for detachably connecting each substation unit to the line.

5. In a supervisory control system comprising a control station and a plurality of substation positions connected by a communication channel, a plurality of substation units adapted for use at the various positions in said system, each of which includes a number of station selection circuits arranged in a given order of succession; position assignment switch means in each substation unit adjustable to each of a number of settings, means controlled by said switch in each of its different settings to preassign a correspondingly different one of said station selection circuits as the access circuit for said unit, sequence-operating means controlled with occurrence of a set of station selection impulses on said channel to advance over the circuits in succession to the circuit indicated by the number of impulses in the set, signal transmitting means in each unit for effecting the transmission of a station identification impulse set over said channel including the station selection circuits which are prior in succession to its preassigned access circuit and said sequence-operating means, and means on said position-assignment switch operable in its adjustment to any one of its positions to multiple for connection to said transmitting means those station selection circuits which are prior in succession to the one of the circuits preassigned thereby for the associated unit, whereby the advancement of the sequence-operating means to its preassigned circuit and the proper station identification is accomplished by the substation set in its reporting operation.

6. In a supervisory control system comprising a control station and a plurality of substation positions connected by a communication channel, a plurality of substation units adapted for use at the various positions in said system, each of which includes a number of station selection circuits arranged in a given order of succession, position-assignment switch means in each substation unit adjustable to each of a number of settings, means controlled by said switch in each of its different settings to preassign a correspondingly different one of said station selection circuits as the access circuit for said unit, sequence-operating means controlled with receipt of a set of station selection impulses to advance over the circuits in succession to the circuit indicated by the number of impulses in the set, sending means in each substation unit for effecting the return of a number of impulses which complements the number of impulses in its assigned station selection set including the selection circuits which are subsequent in succession to its preassigned access circuit and said sequence operating means whereby the total impulses transmitted by the control station and substation in the selection of any of the substations is the same, and means on said position-assignment switch operable in its adjustment to any of its positions to multiple for connection to said sending means the circuits which are subsequent in succession to the one of the circuits preassigned thereby to the unit, whereby the transmission of the proper complementary impulses is accomplished by the substation set.

7. In a supervisory control system comprising a control station and a plurality of substation positions connected by a communication channel, a plurality of substation units adapted for use at the various positions in said system, each of which includes a number of station selection circuits arranged in a given order of succession, position-assignment switch means in each substation unit adjustable to each of a number of settings, means controlled by said switch in each of its different settings to preassign a correspondingly different one of said station selection circuits as the access circuit for said unit, sequence operating means controlled with receipt of a station selection impulse set to advance over the circuits in succession to the circuit indicated by the number of impulses in the set, and means in said position-assignment switch operable in each of its positions to connect in multiple all of the selection circuits exclusive of the circuit preassigned thereby for the associated unit.

8. In a supervisory control system comprising a control station and a plurality of substations linked by a common path, selection means at said control station for transmitting different station selecting impulse sets over said path for selecting the different substations, each set comprising a plurality of transient protection impulses and station selection impulses, the total number of impulses for accessing the different substations being of a different value; and means at each substation for returning a number of impulses which is complementary to the impulses of its assigned access number, whereby the total number of the the transient protection impulses, access impulses and complementary impulses utilized in each station selecting operation is the same.

9. In a supervisory control system comprising a control station and a plurality of substations linked by a common path, selection means at said control station for transmitting different station selecting signal sets over said path for selecting the different substations, each set comprising a plurality of transient protection impulses and station selection impulses, the total number of impulses for accessing the different substations being of a different value; means at each substation for returning a number of impulses which is complementary to the impulses of its assigned access number, the total number of the transient protection impulses, access impulses and complementary impulses utilized in each station selecting operation being the same, and means for resetting the system responsive to occurrence of a set of transient protection impulses included in the signal sets.

10. In a supervisory control system comprising a control station and a plurality of substations linked by a common path, means at the control station for transmitting signals over said path to each of the substations to select the same, the number of impulses for selecting each of the different substations being different, supervisory means at each substation having a normal condition including means at each substation for responding to the signals received from the control station over said path, means in each of the substations for transmitting signals over said path to said control station including a reverting check signal responsive to seizure of the substation, at least the first set of signals transmitted by the control station to the substation and the reverting check signals transmitted from the substation to the control station in each station selection being complementary and self-checking, the total number of impulses in the station selection and checking operations being the same for each of the different substations, and means in each substation operative to reset said supervisory means to its normal condition responsive to the receipt of a number of transient impulses which is within a given predetermined range.

11. In a supervisory control system comprising a control station and a plurality of substations linked by a common path, means at each substation for transmitting station identifying signals sets over said path comprising a set of transient protection impulses and a set of station selection impulses, the total number of impulses for identifying the various substations being of a different value; means at the control station for returning a number of impulses which is complementary to the received identification number, the total number of transient protection impulses, station selection impulses and complementary impulses utilized in each station identifying operation being the same, and means at each substation for resetting the equipment at the substation responsive to the receipt of a number of transient pulses within the range of the number of transient protection impulses included in said signal sets.

12. In a supervisory control system comprising a control station and a plurality of substations interconnected by a communication channel, signalling means for extending information between the control station and said substations, including means for transmitting impulse sets of different values in groups, the number of impulses in each group being the same, at least a controlled device and a monitored device at each substation, cyclically-operated sequence means comprising a rotary switch operative in synchronism at each of the stations through one complete cycle in response to the transmission of a group of impulse sets over said channel, said sequence means being operative responsive to the transmission of a given impulse set over said channel to condition only the indicated substation and control station for further selective operations thereafter; control means at each substation for controlling the position of the controlled device, a first supervisory means at each substation for reporting the condition of the controlled device, a second supervisory means at each substation for reporting the condition of the monitored device, and means controlled by said sequence operating means in a cycle at the conditioned substation to enable operation of said first and second supervisory means and said control means.

13. In a supervisory control system comprising a control station and a plurality of substations interconnected by a communication channel, signalling means for extending information between the control station and said substations, including means for transmitting impulse sets of different values in groups, the number of impulses in each group being the same, at least a controlled device and monitored device at each substation, cyclically operated sequence means comprising a rotary switch operated in synchronism at each of the stations through one complete cycle in response to the transmission of a group of impulse sets over said channel, said sequence means being operative responsive to the transmission of a given impulse set over said channel to condition only the indicated substation and control station for further selective operations thereafter, means at each substation for identifying the substation position in the system, a first supervisory means at the substation for reporting the condition of the controlled device, a second supervisory means for reporting the condition of the monitored device, and means controlled by said sequence operating means in a cycle at the conditioned substation to enable operation of said station identifying means and said first and said second supervisory means.

14. An arrangement as set forth in claim 13 in which said communication channel comprises only a two-conductor channel extending between the control station and the substations in said system.

15. In a supervisory control system, a control station, a number of substations interconnected by a communication channel, signalling means at the control station and the substations for extending information over said channel between the stations, including means for transmitting impulse sets of different values in groups, the number of impulses in each group being the same, each group including at least a station selection set and a station identification set, a plurality of selection circuits at each station, cyclic switching means at each station having access to said selection circuits connected to operate in a single complete cycle responsive to receipt of each group of impulses, switch means at each substation adjustable to different positions for preassigning correspondingly different ones of said circuits as the selection circuit for enabling its associated substation and for preassigning a correspondingly different station identification code for transmission by the transmitting means thereat, means at each station for operating said cyclic switching means thereat responsive to the receipt of the station selection impulse set which is preassigned to such station by its associated switch means, to select the corresponding one of the circuits at the indicated station, and means at each substation operative responsive to selection of a station selection circuit other than its preassigned station selection circuit to render the circuit means thereat non-responsive to the remaining impulse sets of the group.

16. In a supervisory system having a main station and a plurality of substations interconnected by a communication channel over which a group of impulses comprised of discrete sets are transmitted, stepping means at each station operable to each of a number of sequentially arranged steps to effect functional operations with the selection thereof, preset selection means for each stepping means including means for connecting same to at least one step of its associated stepping means, the preset means for a different stepping means being connected to a different step; means for synchronously advancing said stepping means to successive ones of said steps at each of said stations responsive to the coupling of a first predetermined set of said impulses to said channel, means operative responsive to the termination of receipt of said one impulse set to interrupt the enabling circuits for said stepping means at each station, means controlled only by the one of said preset selection means which is connected to the step of advancement of the switches to enable an operating circuit for advancing its stepping means over successive steps of the sequence in response to the receipt of further impulse sets in said group, said other stepping means remaining at the step of advancement during the further operation of the selected stepping means, and reset means operative to return the stepping means to normal at each station responsive to advancement of the selected switch through its functional operations.

17. In a supervisory system as set forth in claim 16 in which reset means includes means at the main station for transmitting a reset signal over said channel as the last impulse of each group to restore the stepping means at each station.

18. In a supervisory system having a main station and a plurality of substations interconnected by a communication channel over which a group of impulses comprised of discrete sets are transmitted, the total number of impulses in each group being the same, stepping means at each station operable to a number of steps in a given sequence for selection purposes, switch means at each substation preset to assign a predetermined one of said steps as the selection step for its associated substation, different substations having a different step assigned as its selection step; stepping control means at each station for advancing said stepping means responsive to the receipt of the first impulse set of said group over said channel to select the indicated one of said steps; means operative responsive to the termination of receipt of said one impulse set to disable said stepping control means at each station, and sender means at each station operative only in response to the selection of its assigned step to control advancement of said stepping means over successive steps with the receipt of further impulse sets of the group, said stepping means having holding means for maintaining same at its point of advance during receipt of further impulse sets in the group whenever a step other than the assigned station step is selected in response to the first impulse set.

19. A supervisory system as set forth in claim 18 in which said switch means comprises a manually operable switch having a plurality of positions, each of said positions being connected to different ones of said steps, whereby operation of said manually operable switch to a different position adapts the substation for response to correspondingly different station selection impulse sets.

20. In a supervisory control system comprising a main station and a plurality of substations connected by a communication channel, each of which substations is assigned a predetermined different selection and identification code, a substation unit which is adapted for use at the various positions in the system including signalling means for receiving and transmitting impulse signals over said channel whenever said unit is connected thereto, and switch means at said substation unit adjustable to different settings to adapt said substation unit for use at a correspondingly different position in the system including means operative responsive to adjustment of said switch means to a different position to control the signalling means thereof to respond to a correspondingly different code and to transmit a correspondingly different identification code.

References Cited in the file of this patent
UNITED STATES PATENTS

| Re. 17,797 | Chase et al. | Sept. 16, 1930 |
| Re. 21,284 | Boswau | Dec. 5, 1939 |
| 1,814,524 | Nelson | July 14, 1931 |
| 2,148,430 | Benjamin | Feb. 28, 1939 |
| 2,152,010 | Zenner | Mar. 28, 1939 |
| 2,336,064 | Burns et al. | Dec. 7, 1943 |
| 2,409,229 | Smith et al. | Oct. 15, 1946 |
| 2,512,038 | Potts | June 20, 1950 |
| 2,677,814 | Miller | May 4, 1954 |
| 2,679,034 | Albrighton | May 18, 1954 |
| 2,698,425 | Miller | Dec. 28, 1954 |
| 2,717,986 | Dimmer | Sept. 13, 1955 |
| 2,719,960 | Bachelet | Oct. 4, 1955 |